(12) United States Patent
Tanaka et al.

(10) Patent No.: US 8,110,038 B2
(45) Date of Patent: Feb. 7, 2012

(54) MIXED CRYSTAL AND COLORED PIGMENT DISPERSION COMPOSITION

(75) Inventors: Shigeaki Tanaka, Ashigarakami-gun (JP); Keiichi Tateishi, Ashigarakami-gun (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/934,972

(22) PCT Filed: Mar. 27, 2009

(86) PCT No.: PCT/JP2009/056913
§ 371 (c)(1),
(2), (4) Date: Sep. 27, 2010

(87) PCT Pub. No.: WO2009/119909
PCT Pub. Date: Oct. 1, 2009

(65) Prior Publication Data
US 2011/0023752 A1   Feb. 3, 2011

(30) Foreign Application Priority Data
Mar. 28, 2008   (JP) .................. 2008-088764

(51) Int. Cl.
*C09B 67/50* (2006.01)
*C09B 47/04* (2006.01)
*C09B 67/00* (2006.01)
*C09D 17/00* (2006.01)

(52) U.S. Cl. ........ 106/411; 106/410; 106/413; 540/122; 540/136; 540/139; 540/140; 540/141

(58) Field of Classification Search .................. 106/410, 106/411, 413; 540/122, 136, 139, 140, 141
See application file for complete search history.

(56) References Cited

U.S. PATENT DOCUMENTS

| | | | |
|---|---|---|---|
| 3,458,517 A | 7/1969 | Stepp | |
| 4,981,767 A * | 1/1991 | Tokura et al. | 430/59.4 |
| 5,292,604 A * | 3/1994 | Nukada et al. | 430/78 |
| 5,302,710 A * | 4/1994 | Nukada et al. | 540/140 |
| 5,336,578 A * | 8/1994 | Nukada et al. | 430/78 |
| 5,354,635 A * | 10/1994 | Itami et al. | 430/59.5 |
| 5,362,589 A * | 11/1994 | Nukada et al. | 430/78 |
| 5,449,581 A * | 9/1995 | Matsui et al. | 430/58.8 |
| 5,595,846 A * | 1/1997 | Shigematsu et al. | 430/59.4 |
| 5,721,080 A * | 2/1998 | Terrell et al. | 430/59.4 |
| 6,174,638 B1 * | 1/2001 | Ishigami et al. | 430/78 |
| 7,745,617 B2 * | 6/2010 | Kimura | 540/145 |
| 2005/0092208 A1 * | 5/2005 | Kimura | 106/411 |

FOREIGN PATENT DOCUMENTS
EP          661353 A2 *    7/1995
(Continued)

OTHER PUBLICATIONS

Derwent-Acc-No. 2002-302011, abstract of Korean Patent Specification No. KR2001-102686A (Nov. 2001).*

Derwent-Acc-No. 2004-437360, abstract of Korean Patent Specification No. KR2002-096603A (Dec. 2002).*

*Primary Examiner* — Anthony Green
(74) *Attorney, Agent, or Firm* — Sughrue Mion, PLLC

(57) ABSTRACT

The present invention provides a mixed crystal having absorption properties that are excellent for color reproducibility as a blue pigment, and including a compound represented by the following Formula (I) and a compound represented by the following Formula (II), and a colored pigment dispersion composition including the mixed crystal and a medium.

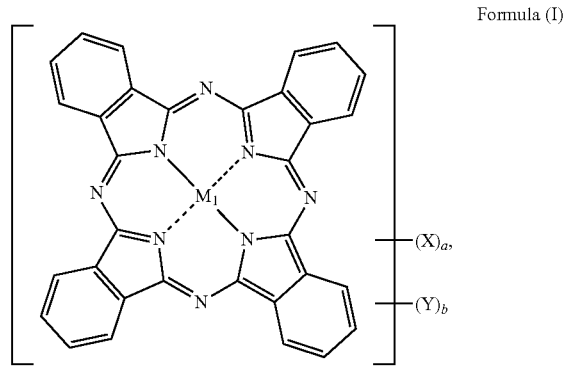

Formula (I)

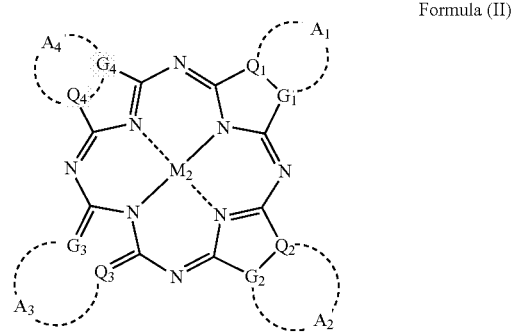

Formula (II)

In Formula (I), X represents —SO—Z, —SO$_2$—Z, —SO$_2$NR$_1$R$_2$, —SO$_3$R$_1$, —CONR$_1$R$_2$ or —CO$_2$R$_1$; Z, R$_1$ and R$_2$ each independently represent an alkyl group, an aryl group, a heterocyclic group or the like; Y represents a monovalent substituent; M$_1$ represents a hydrogen atom, a metal element or the like; and a and b are integers from 0 to 16 and satisfy the relationship of $0 \leq a+b \leq 16$. In Formula (II), G$_1$ to G$_4$ and Q$_1$ to Q$_4$ each independently represent a carbon atom or a nitrogen atom, and A$_1$ to A$_4$ each independently represent a group of atoms necessary for forming an aromatic ring or heterocycle with the respective G$_1$ to G$_4$ and Q$_1$ to Q$_4$. Here, at least one ring among the four rings to be formed is a heterocycle. Each aromatic ring or heterocycle may have a substituent; M$_2$ represents a hydrogen atom, a metal element or the like.

11 Claims, 10 Drawing Sheets

FOREIGN PATENT DOCUMENTS

| | | | |
|---|---|---|---|
| JP | 02-084661 A | | 3/1990 |
| JP | 5-11471 A | * | 1/1993 |
| JP | 5-11476 A | * | 1/1993 |
| JP | 5-346672 A | * | 12/1993 |
| JP | 8-067829 A | | 3/1996 |
| JP | 9-143386 A | * | 6/1997 |
| JP | 11-302548 A | | 11/1999 |
| JP | 2002-12790 A | * | 1/2002 |
| JP | 2002-251027 A | | 9/2002 |
| JP | 2004-075986 A | | 3/2004 |
| JP | 2005-133023 A | | 5/2005 |
| JP | 2005-134781 A | | 5/2005 |

* cited by examiner

MIXED CRYSTAL AND COLORED PIGMENT DISPERSION COMPOSITION

BACKGROUND OF THE INVENTION

1. Technical Field

The present invention relates to a mixed crystal and a colored pigment dispersion composition.

2. Background Art

Phthalocyanine pigments have the greatest production volume among organic pigments, have a broad range of hues from blue to green, are very vivid, have great tinting strength, and have various high fastnesses. In addition, since they are produced with relatively low cost, they are important pigments widely used in coloring fields. Among the phthalocyanine pigments, a copper phthalocyanine pigment is characterized by hue and vividness, and is most suitable for obtaining the color of cyan, which is one of three primary colors in color printing.

The copper phthalocyanine pigment is known to be classified into three types of crystal forms of δ and ε, α and γ, and β, wherein the hue shifts to greenish blue in this order. As described, there is correlation between the crystal form and the hue, and, therefore, the copper phthalocyanine has different applications depending on the crystal form. For example, the ε type is used for color filters and the like, the α type is used for cotton prints, inks, paints and the like, and the β type is used for toners, gravure printing and the like (see, for example, Organic Pigment Handbook, edited by Color Office).

However, as the result of the diversification of technologies, the current circumstances are such that the required hue as a blue pigment can not be expressed by one kind of copper phthalocyanine pigment. For example, the ε type copper phthalocyanine for use in color filters has slightly insufficient reddish hue, and, therefore, it is currently used with Pigment Violet 23 in combination. As described above, some methods for producing a colored composition are known, in which two or more kinds of pigments are mixed to adjust a hue to a preferable region.

For mixing two or more kinds of pigments, mixing of different kinds of pigment dispersions, mixing by sublimation, mixing by reprecipitation, and the like are generally known.

As a technique of mixing different kinds of pigment dispersions, there is mentioned a method of mixing a copper phthalocyanine pigment dispersion and a copper azaphthalocyanine pigment dispersion (see, for example, Japanese Patent Application Laid-Open (JP-A) No. 11-302548). This is a method for improving the transmittance in high quality color filters, particularly, in blue image portions, and is a favorable technique for forming blue image portions suitable for three wavelength fluorescent lamps, that is, highly transparent in three wavelength fluorescent lamps, by mixing both pigment dispersions to control a wavelength that gives the maximum transmittance.

As a method for improving various performances of a dispersion in addition to improving the agglomeration property, a technique of obtaining a mixed crystal by a reprecipitation method is known. For example, a technique is known for improving light durability and weather resistance by an acid pasting method for a quinacridone-based mixed crystal pigment as an automotive paint (see, for example, JP-A No. 62-62867). Further, for a mixed crystal of a quinacridone-based pigment obtained by neutralizing a pigment solution dissolved in a base and an organic solvent with an acid, a technique of controlling the particle size of the pigment is known (see, for example, JP-A No. 60-35055).

Furthermore, a method is known for manufacturing a phthalocyanine mixed crystal body by dissolving a phthalocyanine-based compound selected from hydrogen phthalocyanine, copper phthalocyanine, titanyl phthalocyanine and vanadyl phthalocyanine in an inorganic acid or an alkylsulfonic acid and by allowing the same to precipitate (see, for example, JP-A No. 8-67829). It is said that, by using this mixed crystal body as a photosensitive material, such improvement of a property is achieved that current flows at once down to the ground potential (residual potential) relative to a prescribed input light quantity (referred to as a high γ property) in digital recording with a laser.

Furthermore, such an example as applying a mixed crystal of titanyl phthalocyanine, halogenated metal phthalocyanine having a trivalent metal as the central metal, and a metal-less phthalocyanine as a phthalocyanine compound to an electrophotographic photosensitive material is known (see, for example, JP-A No. 2002-251027). It is said that the use of this mixed crystal body achieves high sensitivity as an electrophotographic photosensitive material.

Furthermore, an example of applying a phthalocyanine mixed crystal of a phthalocyanine having a trifluoromethyl group and including cobalt, nickel or copper as the central metal, and a phthalocyanine that may have a substituent other than a trifluoromethyl group and includes cobalt, nickel or copper as the central metal is known (see, for example, JP-A Nos. 2005-133023 and 2005-134781). It is said that, as the result of this technique, vividness in color filters, that is, the light selectivity of blue filter segments in a photolithographic method, is enhanced.

On the other hand, a method is known for producing a mixed crystal by a sublimation method of different kinds of phthalocyanine derivatives, which is a technique for obtaining an inductive photoconductor for a semiconductor laser (see, for example, JR-A No. 2-84661). In more detail, this is a method in which a copper phthalocyanine pigment and a metal-less phthalocyanine pigment are once foamed into a molecular-state mixture by a sulfuric acid pasting method, and this is heated to the sublimation temperature in a vacuum and deposited onto an aluminum plate. This is an effective method for forming one crystalline body (pigment body) by mixing two or more kinds of phthalocyanines at a molecular level.

The pigment mixtures and pigment mixed crystal bodies described above need, in general, to be treated as a pigment dispersion, and, for the pigment dispersion, for example, such properties are required as (1) expressing intensively reddish blue, (2) being dispersed easily, (3) having good storage stability of the dispersion, and the like.

SUMMARY OF THE INVENTION

An aspect of the present invention provides a mixed crystal including a compound represented by the following Formula (I) and a compound represented by the following Formula (II), the crystal having an absorption property excellent in color reproducibility as a blue pigment. Another embodiment of the invention provides a colored pigment dispersion composition including the mixed crystal and a medium:

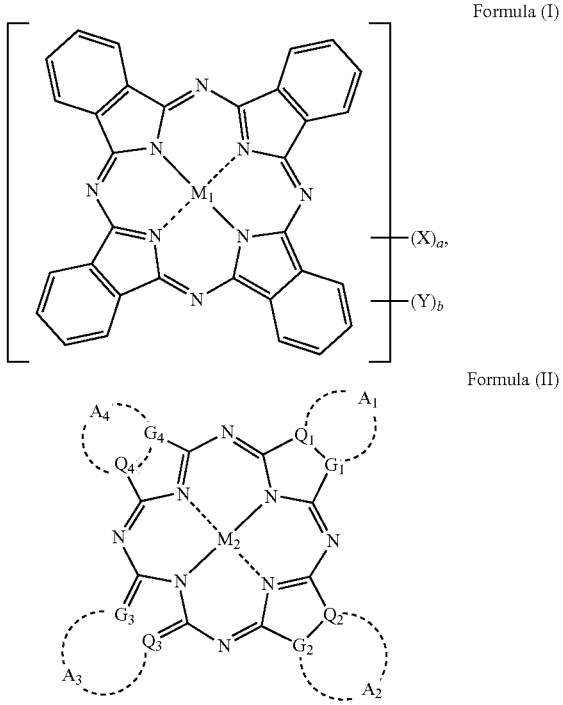

Formula (I)

Formula (II)

wherein, in Formula (I), X represents —SO—Z, —SO$_2$—Z, —SO$_2$NR$_1$R$_2$, —SO$_3$R$_1$, —CONR$_1$R$_2$ or —CO$_2$R$_1$, in which Z, R$_1$ and R$_2$ each independently represent an alkyl group, an aryl group, a heterocyclic group or the like, Y represents a monovalent substituent; M$_1$ represents a hydrogen atom, a metal element or the like; a and b are integers from 0 to 16 respectively, and satisfy the relationship of 0≦a+b≦16;

in Formula (II), G$_1$ to G$_4$ and Q$_1$ to Q$_4$ each independently represent a carbon atom or a nitrogen atom, and A$_1$ to A$_4$ each independently represent a group of atoms necessary for forming an aromatic ring or a heterocycle with the respective G$_1$ to G$_4$ and Q$_1$ to Q$_4$. Here, at least one ring among the four rings to be formed is a heterocycle. The aromatic ring or the heterocycle may have a substituent; M$_2$ represents a hydrogen atom, a metal element or the like.

DETAILED DESCRIPTION OF THE INVENTION

Figure 1:
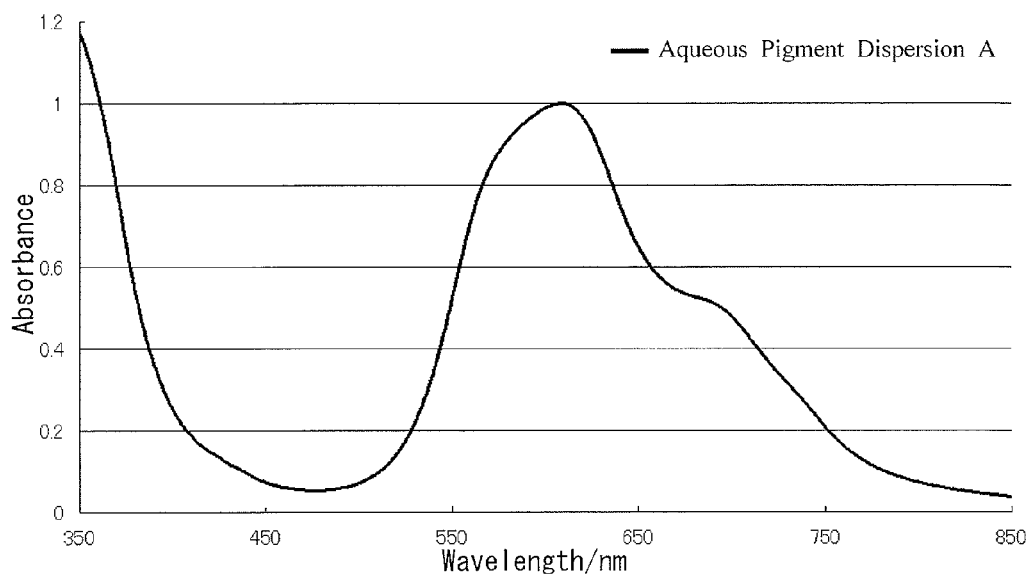
FIG. 1 is a UV-Vis absorption spectrum of an aqueous pigment dispersion A.

Problems to be Solved by the Invention

Conventional pigment dispersions, however, have satisfied not all these properties.

For example, the method described in JP-A No. 11-302548 can not be said that it sufficiently answers the requirement from such standpoints as the broadening of hue and agglomeration of the dispersion by the mixing, and the requirement for an excess pigment mixture dispersion due to the lowering of concentration by the mixing. Methods described in JP-A Nos. 62-62867 and 60-35055 are not preferable because they result in hue of short wavelength for producing a blue pigment.

Methods described in JP-A Nos. 8-67829, 2002-251027, 2005-133023, 2005-134781 and 2-84661 can not give a phthalocyanine-based compound as an intended blue pigment rich in reddish hue. Further, the method described in JP-A No. 2-84661 includes such problem that it necessitates a sublimation equipment to make the manufacturing process complicate.

Objects of the invention are to provide a mixed crystal having an absorption property excellent in color reproducibility as a blue pigment, and to provide a colored pigment dispersion composition including the mixed crystal and having excellent dispersion stability.

Means for Solving the Problem

In order to achieve the above objects, as the result of hard works, the present inventors found that the objects can be achieved by a mixed crystal body with a novel phthalocyanine having a specified structure that expresses non-conventional blue rich in reddish hue, to complete the invention. The problem to be solved may be solved by the following items <1> to <12>.

<1>. A mixed crystal comprising a compound represented by the following Formula (I) and a compound represented by the following Formula (II):

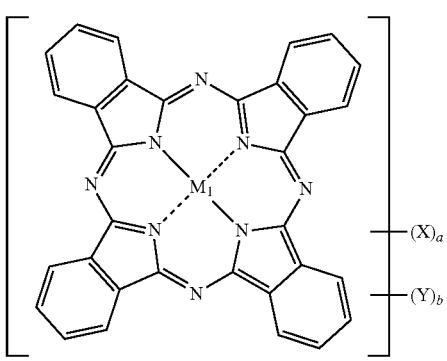

Formula (I)

wherein, in Formula (I), X represents —SO—Z, —SO$_2$—Z, —SO$_2$NR$_1$R$_2$, —SO$_3$R$_1$, —CONR$_1$R$_2$ or —CO$_2$R$_1$, in which Z is a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; R$_1$ and R$_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; Y represents a monovalent substituent; a and b represent the number of substituents of X and Y, respectively, wherein a represents an integer from 0 to 16, b represents an integer from 0 to 16, while satisfying the relationship of 0≦a+b≦16, and, when a or b is 2 or greater, two or more Xs or Ys may be the same as or different from each other; and M$_1$ represents a hydrogen atom, a metal element, a metal oxide, a metal hydroxide or a metal halide;

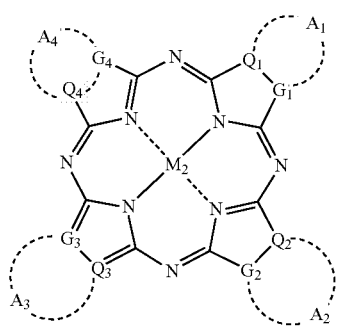

Formula (II)

wherein, in Formula (II), G$_1$ to G$_4$ and Q$_1$ to Q$_4$ each independently represent a carbon atom or a nitrogen atom; and A$_1$ to A$_4$ each independently represent a group of atoms necessary for forming an aromatic ring or a heterocycle with the respective G1 to G$_4$ and Q$_1$ to Q$_4$ to which A$_1$ to A$_4$ are bonded, wherein at least one of the four rings to be formed is a heterocycle, and each aromatic ring or heterocycle may have a substituent selected from a halogen atom, an alkyl group, a cycloalkyl group, an alkenyl group, an alkynyl group, an aralkyl group, an aryl group, a heterocyclic group, a cyano group, a hydroxy group, a nitro group, an amino group, an alkylamino group, an alkyloxy group, an aryloxy group, an acylamino group, an arylamino group, a ureido group, a sulfamoylamino group, an alkylthio group, an arylthio group, an alkyloxycarbonylamino group, an alkylsulfonamido group, an arylsulfonamido group, a carbamoyl group, a sulfamoyl group, an alkylsulfonyl group, an arylsulfonyl group, an alkyloxycarbonyl group, a heterocyclic oxy group, an alkylazo group, an arylazo group, an acyloxy group, a carbamoyloxy group, a silyloxy group, an aryloxycarbonyl group, an aryloxycarbonylamino group, an imido group, a heterocyclic thio group, an alkylsulfinyl group, an arylsulfinyl group, a phosphoryl group, an acyl group, or an ionic hydrophilic group; and M$_2$ represents a hydrogen atom, a metal element, a metal oxide, a metal hydroxide or a metal halide.

<2>. The mixed crystal according to item <1>, wherein X represents —SO$_2$—Z, —SO$_2$NR$_1$R$_2$ or —SO$_3$R$_1$, in which Z, R$_1$ and R$_2$ have the same meaning as those in Formula (I).

<3>. The mixed crystal according to item <2>, wherein Z is a substituted or unsubstituted alkyl group, a substituted or unsubstituted aryl group, or a substituted or unsubstituted heterocyclic group; and R$_1$ and R$_2$ are each independently a hydrogen atom, a substituted or unsubstituted alkyl group, a substituted or unsubstituted aryl group, or a substituted or unsubstituted heterocyclic group.

<4>. The mixed crystal according to any one of items <1> to <3>, wherein Y is a halogen atom, an alkyl group, an aryl group, a cyano group, an alkyloxy group, an acylamino group, a ureido group or an alkyloxycarbonyl group.

<5>. The mixed crystal according to any one of items <1> to <4>, wherein M$_1$ is Fe, Cu, Ni, Zn, Al or Si.

<6>. The mixed crystal according to any one of items <1> to <5>, wherein the groups of atoms represented by A$_1$ to A$_4$ each independently comprise at least one atom selected from a carbon atom, a nitrogen atom, an oxygen atom or a sulfur atom.

<7>. The mixed crystal according to any one of items <1> to <6>, wherein all of G$_1$ to G$_4$ and Q$_1$ to Q$_4$ are carbon atoms.

<8>. The mixed crystal according to any one of items <1> to <7>, wherein M$_2$ is a copper atom, an iron atom, a zinc atom, a nickel atom or a cobalt atom.

<9>. The mixed crystal according to any one of items <1> to <8>, wherein a mixing ratio of the compound represented by Formula (II) relative to the compound represented by Formula (I) is from 0.1% to 50% by mass.

<10>. The mixed crystal according to any one of items <1> to <9>, having 4 or more diffraction peaks that give a diffraction peak intensity of 10% or greater of a maximum diffraction peak intensity in the range of a Bragg angle (2θ±0.2°) of from 23.5° to 29.0° in an X-ray diffraction spectrum by the CuKα line.

<11>. The mixed crystal according to any one of items <1> to <10>, wherein an absorption spectrum in a dispersion state gives a maximum absorption wavelength of 630 nm or less in a region of 400 nm or more, and an absorption wavelength that is shorter than the maximum absorption wavelength and gives half-absorbance of the absorbance at the maximum absorption wavelength is 560 nm or less.

<12>. A colored pigment dispersion composition comprising the mixed crystal according to any one of items <1> to <11>, and a medium.

BEST MODE FOR CARRYING OUT THE INVENTION

Mixed Crystal

The mixed crystal in the present invention means a state, in which each single molecule of two or more of different kinds of compounds are arranged with a certain regularity to constitute a crystal, or a state in which two or more of different kinds of compounds interact at a molecular level to constitute a crystal having a certain regularity. The crystalline state can easily be confirmed by measuring X-ray diffraction patterns and observing the change from each of the X-ray diffraction pattern of the single compound. That is, the X-ray diffraction pattern of a mixed crystal shows a different pattern from each of the X-ray diffraction pattern of single pigment constituting the mixed crystal.

As a method for producing the mixed crystal, for example, a reprecipitation method can be employed, as a general method. Hereinafter, the method will be described in detail.

The reprecipitation method is a method, in which at least a part of a pigment or a mixture containing the pigment is dissolved in a solvent that may include an acid or a base, or in a liquid compound such as a macromolecular compound, and, then, the pigment or the pigment mixture is transferred from the dissolved state to a precipitated state by an external factor. As the external factor, for example, there can be mentioned adding a solvent that does not dissolve the pigment (hereinafter, occasionally referred to as a "poor solvent"), a reagent for neutralizing a part of a compound constituting the pigment or modifying a part of compound constituting the pigment by substitution or decomposition, light, heat, and the like.

Hereinafter, the pigment formation by the reprecipitation method will be described in detail.

There is a method, in which a compound constituting a pigment is dissolved in an acid such as concentrated sulfuric acid, which is thrown into water with ice to crystallize the pigment, and, then, the organic pigment is purified and finely divided by dispersing the precipitate with stirring. This method is generally known as an acid pasting method.

As another example of the reprecipitation method, there is a method, in which a pigment is dissolved in a base and then precipitated. Specifically, for example, it is a method, in which an organic pigment is dissolved in a polar organic solvent such as dimethyl sulfoxide in the presence of a base such as sodium hydroxide to form a homogeneous mixed solution, and then the pigment is crystallized again by performing neutralization and reprecipitation using an acid.

In addition, there is mentioned a method, in which, when a compound constituting a pigment has an acid group such as a carboxylic acid group, a sulfonic acid group or a phosphoric acid group, the compound constituting the pigment is dissolved in a solvent, and, then, is neutralized by adding an inorganic base such as sodium hydroxide or an organic base such as sodium acetate to result in a reduced solubility to be precipitated.

Further, there is mentioned a method, in which a solvent-soluble pigment derivative (pigment precursor) formed by introducing a protective group for accelerating the solvent-solubility into the mother skeleton of a compound constituting a pigment is completely dissolved in a solvent, and, then, the introduced protective group is eliminated by a chemical treatment, a photodecomposition treatment, a heat treatment or the like to crystallize a pigment constituted of the mother skeleton. The method is generally referred to as a latent pigment method.

In addition, although there is a little difference from the reprecipitation method, a method, in which a pigment is precipitated in the way of synthesizing a compound, is mentioned. Specifically, for example, a phthalonitrile derivative as a starting material of a phthalocyanine derivative is completely dissolved in a reaction solvent. In a process of synthesizing a phthalocyanine derivative from that state, a low solubility of the generating phthalocyanine derivative into the reaction solvent is utilized to precipitate the same from the reaction system. The method can be performed not only for synthesizing phthalocyanine, but also for synthesizing azo pigments and chelate pigments.

The method in the invention for producing a mixed crystal can be constituted by including a dissolution step of dissolving at least a part of a pigment or a mixture including a pigment to give a pigment solution, a precipitation step of precipitating a mixed crystal from the pigment solution, and other steps according to need.

In the dissolution step, it is sufficient that at least a part of the pigment or the mixture including the pigment is dissolved. That is, the step may be either a step in which a pigment solution completely dissolving a pigment or a mixture including the pigment is obtained, or a step in which a pigment suspension dissolving only a part of a pigment or a mixture including the pigment is obtained.

The solvent for use in the dissolution may be any of acid, base and neutral solvent.

No particular limitation is imposed in the invention on acid usable for dissolving a pigment or a mixture including the pigment, so long as it dissolves the pigment. In the invention, the acid may be an acid capable of completely dissolving a pigment, or an acid capable of dissolving a part of the pigment. Preferably, it is an acid capable of completely dissolving the pigment. As the acid, inorganic acids (also referred to as mineral acid) and organic acids can be used. Examples of the inorganic acid include hydrochloric acid, phosphoric acid and sulfuric acid, wherein phosphoric acid and sulfuric acid are preferable, and sulfuric acid is further preferable. Examples of the organic acid include formic acid, acetic acid, propionic acid and methanesulfonic acid, wherein acetic acid, propionic acid and methanesulfonic acid are preferable, and methanesulfonic acid is further preferable.

These acids may be used alone, or in two or more in mixture.

In the invention, the use amount of the acid relative to the total amount of the pigment is preferably from 1 time to 500 times by mass, more preferably from 1 time to 200 times by mass, furthermore preferably from 1 time to 100 times by mass. One time by mass or greater results in good solubility of the pigment. On the other hand, 500 times by mass or less results in good workability and advantageous cost, too.

Again, no particular limitation is imposed on the base capable of employing for dissolving a pigment and a mixture including the pigment, so long as it dissolves the pigment. Examples of the usable base include triethylamine, tributylamine, diisopropylethylamine, pyridine and sodium methoxide.

These bases may be used alone, or in two or more in mixture.

The use amount of the base relative to the total amount of the pigment is preferably from 1 time to 500 times by mass, more preferably from 1 time to 200 times by mass, further preferably from 1 time to 100 times by mass. One time by mass or more results in good solubility of the pigment. On the other hand, 500 times by mass or less results in good workability and advantageous cost, too.

No particular limitation is imposed on a neutral solvent usable for dissolving a pigment and a mixture including the pigment, so long as it dissolves the pigment. Examples of the neutral solvents include polar solvents (specifically, such as acetonitrile, formamide, N,N-dimethylformamide, N,N-dimethylacetamide, dimethylsulfoxide, sulfolane, propylene carbonate, N-methyl-2-pyrrolidone, N-vinyl-2-pyrrolidone, N,N-diethyldodecaneamide and water), alcohol-based solvents, ester-based solvents, ketone-based solvents, halogen-containing solvents and ether-based solvents.

Examples of alcohol-based solvent include monoalcohols such as methanol, ethanol, pentanol, heptanol, octanol, cyclohexanol, benzyl alcohol, phenethyl alcohol, phenylpropyl alcohol, furfuryl alcohol, and anise alcohol.

In addition, there are mentioned "glycols" such as mono-, oligo- (particularly di- and tri-) and poly-alkylene glycol in which the alkylene unit has 2 to 4 carbon atoms, and "glycol monoethers" such as an ether thereof having monoalkyl group having 1 to 8 carbon atoms and monoaryl ether thereof, and sugar alcohols such as glycerin.

Examples of glycols include ethylene glycol, 1,2-propylene glycol, 1,3-propylene glycol, diethylene glycol, butylene glycol, triethylene glycol, tetraethylene glycol, dipropylene glycol, tripropylene glycol, tetrapropylene glycol, polyethylene glycol, polypropylene glycol.

Examples of glycol monoethers include ethylene glycol monomethyl ether, ethylene glycol monoethyl ether, ethylene glycol monopropyl ether, ethylene glycol monobutyl ether, ethylene glycol monohexyl ether, propylene glycol monomethyl ether, propylene glycol monoethyl ether, propylene glycol monopropyl ether, propylene glycol monobutyl ether, propylene glycol monohexyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, dipropylene glycol monomethyl ether, dipropylene glycol monoethyl ether, dipropylene glycol monobutyl ether, tripropylene glycol monomethyl ether, tripropylene glycol monoethyl ether, tripropylene glycol monobutyl ether, tetrapropylene glycol monomethyl ether, tetrapropylene glycol monoethyl ether, tetrapropylene glycol monobutyl ether, ethylene glycol monophenyl ether, propylene glycol monophenyl ether, and the like.

Examples of ester-based solvents include ethyl acetate, butyl acetate, methyl propionate and propylene glycol monomethyl ether acetate. Examples of ketone-based solvents include acetone, methyl ethyl ketone and cyclohexanone. Examples of halogen-containing solvents include carbon tetrachloride, chloroform, dichloromethane, trichloroethane and chlorobenzene. Examples of ether-based solvents include diethyl ether, tetrahydrofuran and dioxane.

Further, in the invention, industrially used inactive solvents can also be used. Examples thereof include nitrobenzene, trichlorobenzene, chloronaphthalene, methylnaphthalene, naphthalene, alkyl benzene, paraffin, naphthene and kerosene.

Examples of neutral solvents in the invention include preferably formamide, N,N-dimethylformamide, N,N-dimethylacetamide, dimethylsulfoxide, sulfolane, N-methyl-2-pyrrolidone, water, ethylene glycol, diethylene glycol, glycerin, diethylene glycol monobutyl ether, triethylene glycol monobutyl ether, tetrahydrofuran, dioxane, chlorobenzene and chloronaphthalene, more preferably N,N-dimethylformamide, N,N-dimethylacetamide, dimethylsulfoxide, sulfolane, N-methyl-2-pyrrolidone, ethylene glycol, diethylene glycol, glycerin, tetrahydrofuran, dioxane, chlorobenzene and chloronaphthalene.

They may be used in alone, or in two or more in any mixture, so long as they do not have an influence with each other in the combination. The use amount of the solvent is preferably from 1 time to 500 times by mass relative to the total amount of the pigment, more preferably from 1 time to 200 times by mass, further preferably from 1 time to 100 times by mass. One time or more results in good solubility of a pigment. On the other hand, 1000 times or less results in good workability and advantageous cost, too.

The solvent usable in the invention may be a mixed solvent with an acid or a base shown below. Examples of the acid include hydrochloric acid, phosphoric acid, sulfuric acid, formic acid, acetic acid, propionic acid, methanesulfonic acid and the like, and examples of the base include lithium carbonate, sodium carbonate, potassium carbonate, sodium hydrogen carbonate, lithium hydroxide, sodium hydroxide, potassium hydroxide, sodium methoxide, triethylamine, pyridine, dimethylaminopyridine and the like.

Preferable examples include, as the acid, acetic acid, sulfuric acid, hydrochloric acid and methanesulfonic acid, and, as the base, lithium hydroxide, sodium hydroxide, potassium hydroxide and sodium methoxide. More preferable examples include, as the acid, sulfuric acid and methanesulfonic acid, and, as the base, lithium hydroxide, sodium hydroxide, potassium hydroxide and sodium methoxide. Furthermore preferable examples include, as the acid, sulfuric acid and methanesulfonic acid, and, as the base, lithium hydroxide, sodium hydroxide and potassium hydroxide.

Solvents usable in the invention are preferably a solvent containing an acid or a base, too. Examples of solvents containing an acid or a base include preferably sulfuric acid/methanol, hydrochloric acid/methanol, phosphoric acid/diethylene glycol, sulfuric acid/tetrahydrofuran, methanesulfonic acid/methanol, methanesulfonic acid/tetrahydrofuran, sodium methoxide/ethylene glycol, triethylamine/dimethylsulfoxide, pyridine/chloronaphthalene and pyridine/N-methyl-2-pyrrolidone, more preferably sulfuric acid/methanol, sulfuric acid/tetrahydrofuran, methanesulfonic acid/methanol, methanesulfonic acid/tetrahydrofuran, sodium methoxide/ethylene glycol, triethylamine/dimethylsulfoxide, pyridine/chloronaphthalene and pyridine/N-methyl-2-pyrrolidone, furthermore preferably sulfuric acid/methanol, sulfuric acid/tetrahydrofuran, methanesulfonic acid/methanol, methanesulfonic acid/tetrahydrofuran, sodium methoxide/ethylene glycol and pyridine/chloronaphthalene.

No particular limitation is imposed on a method for dissolving a pigment or a mixture containing the pigment, so long as it is an operation capable of dissolving the pigment. Specifically, for example, dissolving it is possible by gradually adding pigment powder having been pulverized to some degree (for example, powder pulverized with an agate mortar) to a neutral solvent, an acid, a base or a mixture thereof, and by stirring the same for several hours. Whether it is completely dissolved can be determined, for example, by observing whether a residue exists when the liquid is filtrated with a glass filter or the like.

No particular limitation is imposed on temperature at the dissolution, so long as the pigment dissolves, but, the temperature is preferably from −20° C. to 40° C., more preferably from −10° C. to 30° C., furthermore preferably from −5° C. to 25° C. A temperature of −20° C. or higher can reduce a load on manufacturing facilities, and 40° C. or lower can suppress the decomposition and the substitution reaction of the pigment compound.

No particular limitation is imposed on the precipitation process, so long as a pigment can be precipitated as a mixed crystal from a pigment solution dissolving at least a part of the pigment or a mixture containing the pigment. The precipitation of a pigment can be achieved, for example, by pouring a once dissolved pigment solution into another solvent being stirred. As the another solvent, a solvent that hardly dissolves a pigment (generally referred to as a poor solvent) is favorable.

As a usable solvent, there can be mentioned a poor solvent selected from solvents that have been exemplified as the solvent usable at the dissolution. Further, for a pigment solution dissolved in a mixed solution of an acid and a solvent, a mixed crystal can be precipitated by poring the solution into a base or a solvent containing a base. Inversely, for a pigment solution dissolved in a mixed solution of a base and a solvent, a mixed crystal can be precipitated by poring the solution into an acid or a solvent containing an acid.

The above-described method is a method in which two or more of different kinds of compounds to be constitutional components in a mixed crystal are dissolved at the same time and are precipitated at the same time. In contrast, it is also possible to obtain a mixed crystal by dissolving one compound by the above-described method to be poured into a mixed liquid in which the other compound has been dissolved or suspended.

For example, a method can be mentioned, in which a sulfuric acid solution of one compound is poured into an aqueous solution dissolving the other compound. In this process, for example, it is considered that the other compound in the solution covers the surface (interface) of the pigment while building a certain crystal form.

The mixed crystal of the invention contains at least one compound represented by Formula (I) and at least one compound represented by Formula (II).

As the method in the invention for producing the mixed crystal containing the compound represented by Formula (I) and the compound represented by Formula (II), either a method, which includes a dissolution step of dissolving at least a part of the compound represented by Formula (I) and a part of the compound represented by Formula (II), and a precipitation step of mixing the solution obtained in the aforementioned dissolution step with a poor solvent to precipitate a mixed crystal, or a method, which includes a dissolution step of dissolving at least a part of one compound from among the compound represented by Formula (I) and the compound represented by Formula (II), and a precipitation process of mixing the solution obtained in the aforementioned dissolution step with a solution dissolving the other compound to precipitate a mixed crystal.

In the invention, preferably, the production method includes the dissolution step of dissolving at least a part of the compound represented by Formula (I) and a part of the compound represented by Formula (II), and the precipitation step of mixing the solution obtained in the aforementioned dissolution step with a poor solvent to precipitate a mixed crystal, and, more preferably the production method uses a solvent including an acid in the aforementioned dissolution step.

The mixing ratio of the compound represented by Formula (II) relative to the compound represented by Formula (I), which is favorable in the mixed crystal of the invention, is from 0.1% to 50% by mass. More preferably, it is from 0.2% to 40%, and further preferably it is from 0.3% to 30%. The ratio within the range makes it possible to control the hue more easily and to obtain a mixed crystal having an intended hue.

No specific limitation is imposed on specific combinations of two or more of different kinds of compounds in a mixed crystal, so long as an intended hue is obtained. However, when supposing that a mixed crystal is formed through interaction through π-π stacking between different kinds of compounds, it is considered that the electronic difference between interacting parts serves as a driving force for an electron-lacking part and an electron-rich part to overlap and attract with each other. Accordingly, a combination that generates an electronic difference, even if it is slight, between different kinds of compounds is preferable. As an example, a method, in which an electron-attracting group or an electron-donating group is introduced to one compound, is considered.

Meanwhile, specific combinations of two or more of different kinds of compounds which are favorably used in producing the mixed crystal in the invention will be described later.

[Compound Represented by Formula (I)]

At least one of compound included in the mixed crystal of the invention is characterized by being the compound represented by the following Formula (I).

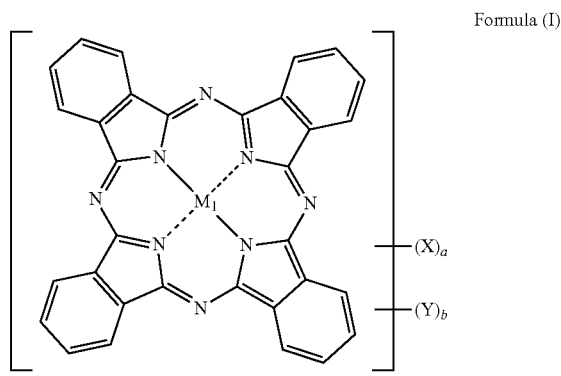

Formula (I)

In Formula (I), X represents —SO—Z, —SO$_2$—Z, —SO$_2$NR$_1$R$_2$, —SO$_3$R$_1$, —CONR$_1$R$_2$ or —CO$_2$R$_1$. Among these substituents, —SO—Z, —SO$_2$—Z, —SO$_2$NR$_1$R$_2$, —SO$_3$R$_1$, and —CO$_2$R$_1$ are preferable, —SO$_2$—Z, —SO$_2$NR$_1$R$_2$ and —SO$_3$R$_1$ and —CO$_2$H are more preferable, and —SO$_2$—Z, —SO$_2$NR$_1$R$_2$, —SO$_3$H and —CO$_2$H are furthermore preferable. In a case where X represents —SO$_3$H or —CO$_2$H, these substituents may be in a salt state, wherein a counter ion for forming the salt is preferably a lithium ion, a sodium ion, a potassium ion and an ammonium ion.

a represents an integer from 0 to 16, which represents the number of substituents of X. The relationship between a and b, which represents the number of substituents of Y described later, satisfies the relationship of $0 \leq a+b \leq 16$. Accordingly, a also represents 0, which means that the compound does not have a substituent represented by X.

When a representing the number of substituents of X is 2 or greater, two or more Xs may be the same as or different from each other. When two or more Xs are different from each other, two or more Xs each independently represent any of the aforementioned groups. Or, two or more Xs may be a substituent represented by the same formula. For example, all two or more Xs may be —SO$_2$—Z. In this case, each Z in the two or more Xs may be different from each other, or may be the same.

Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. It is preferably a substituted or unsubstituted alkyl group, a substituted or unsubstituted aryl group, or a substituted or unsubstituted heterocyclic group, and, among them, more preferably a substituted alkyl group, a substituted aryl group or a substituted heterocyclic group.

$R_1$ and $R_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group or a substituted or unsubstituted heterocyclic group. Among them, a hydrogen atom, a substituted or unsubstituted alkyl group, a substituted or unsubstituted aryl group, and a substituted or unsubstituted heterocyclic group are preferable, and, among them, a hydrogen atom, a substituted alkyl group, a substituted aryl group, and a substituted heterocyclic group are more preferable.

As the substituted or unsubstituted alkyl group represented by $R_1$, $R_2$ and Z, an alkyl group having from 1 to 30 carbon atoms is preferable. The alkyl group may be a straight-chain one or a branched one, and may be a group having an asymmetric carbon. It is preferably an alkyl group having from 1 to 20 carbon atoms, and more preferably an alkyl group having from 1 to 15 carbon atoms.

As examples of substituents of the alkyl group, there are mentioned the same substituents as substituents when Z, $R_1$, $R_2$ and Y can further have a substituent, described later. Among them, a hydroxy group, an ether group, an ester group, a cyano group, an amido group and a sulfonamido group are particularly preferable. In addition, a halogen atom or an ionic hydrophilic group may further be owned. Meanwhile, the number of carbon atoms of the alkyl group does not include the number of carbon atoms of substituents, which is the same in the description of other groups.

As the substituted or unsubstituted cycloalkyl group represented by $R_1$, $R_2$ and Z, a cycloalkyl group having from 5 to 30 carbon atoms is preferable. The cycloalkyl group may have an asymmetric carbon. It is preferably a cycloalkyl group having from 5 to 20 carbon atoms, and more preferably a cycloalkyl group having from 5 to 15 carbon atoms. As examples of substituents of the alkyl group, there are mentioned the same substituents as substituents when Z, $R_1$, $R_2$ and Y can further have a substituent, described later. Among them, a hydroxy group, an ether group, an ester group, a cyano group, an amido group, and a sulfonamido group are particularly preferable. In addition, a halogen atom or an ionic hydrophilic group may further be owned.

As the substituted or unsubstituted alkenyl group represented by $R_1$, $R_2$ and Z, an alkenyl group having from 2 to 30 carbon atoms is preferable. The alkenyl group may be a branched one, and may have an asymmetric carbon. It is preferably an alkenyl group having from 2 to 20 carbon atoms, and more preferably an alkenyl group having from 2 to 15 carbon atoms. As examples of substituents of the alkylene group, there are mentioned the same substituents as substituents when Z, $R_1$, $R_2$ and Y can further have a substituent, described later. Among them, a hydroxy group, an ether group, an ester group, a cyano group, an amido group and a sulfonamido group are particularly preferable. In addition, a halogen atom or an ionic hydrophilic group may further be owned.

As the substituted or unsubstituted aralkyl group represented by $R_1$, $R_2$ and Z, an aralkyl group having from 7 to 30 carbon atoms is preferable. The aralkyl group may be a branched one, and may have an asymmetric carbon. It is preferably an aralkyl group having from 7 to 20 carbon atoms, and more preferably an aralkyl group having from 7 to 15 carbon atoms. As examples of substituents, there are mentioned the same substituents as substituents when Z, $R_1$, $R_2$ and Y can further have a substituent, described later. Among them, a hydroxy group, an ether group, an ester group, a cyano group, an amido group and a sulfonamido group are particularly preferable. In addition, a halogen atom or an ionic hydrophilic group may further be owned.

As the substituted or unsubstituted aryl group represented by $R_1$, $R_2$ and Z, an aryl group having from 6 to 30 carbon atoms is preferable. It is more preferably an aryl group having from 6 to 25 carbon atoms, furthermore preferably an aryl group having 6 to 20 carbon atoms. As examples of substituents of the aryl group, there are mentioned the same substituents as substituents when Z, $R_1$, $R_2$ and Y can further have a substituent, described later. Examples of the substituents of the aryl group include preferably a halogen atom, a heterocyclic group, a cyano group, a carboxy group, an acylamino group, a sulfonamido group, a sulfamoyl group, a carbamoyl group, a sulfonyl group, an imido group, an acyl group, a sulfo group, and a quaternary ammonium group, more preferably a cyano group, a carboxy group, a sulfamoyl group, a carbamoyl group, a sulfonyl group, an imido group, an acyl group, a sulfo group, and a quaternary ammonium group, furthermore preferably a cyano group, a carboxy group, a sulfamoyl group, a carbamoyl group, a sulfonyl group, an imido group, a sulfo group, and a quaternary ammonium group.

As the heterocyclic group represented by $R_1$, $R_2$ and Z, ones of 5-membered or 6-membered ring are preferable, which may further form a condensed ring. Further, it may be an aromatic heterocycle or non-aromatic heterocycle. Hereinafter, the heterocyclic group represented by $R_1$, $R_2$ and Z is exemplified as a form of heterocyclic compound for which the substitution position is omitted. But, no limitation is imposed on the substitution position, and, for example, pyridine may be substituted at 2-, 3- or 4-position. Examples of the heterocyclic group include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like.

Among them, an aromatic heterocyclic group is preferable. Preferable examples thereof are exemplified as above, including pyridine, pyrazine, pyrimidine, pyridazine, triazine, pyrazole, imidazole, benzimidazole, triazole, thiazole, benzothiazole, isothiazole, benzisothiazole and thiadiazole. More preferable examples include pyridine, pyrazine, pyrimidine, pyridazine, triazine, pyrazole, imidazole, benzimidazole, thiazole, benzothiazole, isothiazole, benzisothiazole and thiadiazole.

In addition, the heterocyclic group may have a substituent. Examples of substituents include the same substituents as substituents when Z, $R_1$, $R_2$ and Y can further have a substituent described later. Preferable substituents are also similar to those of the aryl group.

Y represents a monovalent substituent. Examples of the monovalent substituent include a halogen atom, an alkyl group, a cycloalkyl group, an alkenyl group, an aralkyl group, an aryl group, a heterocyclic group, a cyano group, a hydroxy group, a nitro group, an amino group, alkylamino group, an alkyloxy group, an aryloxy group, an acylamino group, arylamino group, ureido group, a sulfamoylamino group, an alkylthio group, an arylthio group, an alkyloxycarbonylamino group, an alkyloxycarbonyl group, a heterocyclic oxy group, an alkylazo group, an arylazo group, an acyloxy group, a carbamoyloxy group, a silyloxy group, an aryloxycarbonyl group, an aryloxycarbonylamino group, an imido group, a heterocyclic thio group, a phosphoryl group, and an acyl group. Each group may further have a substituent.

Among them, preferable groups are a halogen atom, an alkyl group, an aryl group, a cyano group, an alkyloxy group, an acylamino group, a ureido group, and an alkyloxycarbonyl group. A halogen atom and a cyano group are particularly preferable.

Further, when Z, $R_1$, $R_2$ and Y are groups capable of further having a substituent, they may further have a substituent mentioned below:

a straight chain or branched alkyl group having from 1 to 12 carbon atoms, a straight chain or branched aralkyl group having from 7 to 18 carbon atoms, a straight chain or branched alkenyl group having from 2 to 12 carbon atoms, a straight chain or branched alkynyl group having from 2 to 12 carbon atoms, a straight chain or branched cycloalkyl group having from 3 to 12 carbon atoms, a straight chain or branched cycloalkenyl group having from 3 to 12 carbon atoms (specific examples of the aforementioned respective groups include a methyl group, an ethyl group, a propyl group, an isopropyl group, a sec-butyl group, a t-butyl group, a 2-ethylhexyl group, a 2-methylsulfonylethyl group, a 3-phenoxypropyl group, a trifluoromethyl group and a cyclopentyl group), a halogen atom (for example, a chlorine atom or a bromine atom), an aryl group (for example, a phenyl group, a 4-t-butylphenyl group or a 2,4-di-t-amylphenyl group), a heterocyclic group (for example, an imidazolyl group, a pyrazolyl group, a triazolyl group, a 2-furyl group, a 2-thienyl group, a 2-pyrimidinyl group or a 2-benzothiazolyl group), a cyano group, a hydroxy group, a nitro group, a carboxy group, an amino group, an alkyloxy group (for example, a methoxy group, an ethoxy group, a 2-methoxyethoxy group or a 2-methanesulfonylethoxy group), an aryloxy group (for example, a phenoxy group, a 2-methylphenoxy group, a 4-t-butylphenoxy group, a 3-nitrophenoxy group, a 3-t-butyloxycarbamoylphenoxy group or a 3-methoxycarbamoyl group), an acylamino group (for example, an acetamido group, a benzamido group or a 4-(3-t-butyl-4-hydroxyphenoxy)butaneamido group), an alkylamino group (for example, a methylamino group, a butylamino group, a diethylamino group or a methylbutylamino group), an anilino group (for example, a phenylamino group or a 2-chloroanilino group), a ureido group (for example, a phenylureido group, a methylureido group, or an N,N-dibutylureido group), a sulfamoylamino group (for example, an N,N-dipropylsulfamoylamino group), an alkylthio group (for example, a methylthio group, an octylthio group or a 2-phenoxyethylthio group), an arylthio group (for example, a phenylthio group, a 2-butoxy-5-t-octylphenylthio group or a 2-carboxyphenylthio group), an alkyloxycarbonylamino group (for example, a methoxycarbonylamino group), an alkylsulfonamido group or aryl sulfonamido group (for example, a methanesulfonamido group, a benzenesulfonamido group or a p-toluenesulfonamido group), a carbamoyl group (for example, an N-ethylcarbamoyl group and an N,N-dibutylcarbamoyl group), a sulfamoyl group (for example, an N-ethylsulfamoyl group, an N,N-dipropylsulfamoyl group or an N-phenylsulfamoyl group), an alkylsulfonyl group or arylsulfonyl group (for example, a methanesulfonyl group, an octanesulfonyl group, a benzenesulfonyl group or a toluenesulfonyl group), an alkyloxycarbonyl group (for example, a methoxycarbonyl group or a butyloxycarbonyl group), a heterocyclic oxy group (for example, a 1-phenyltetrazole-5-oxy group or a 2-tetrahydropyranyloxy group), an alkylazo group or arylazo group (for example, a phenylazo group, a 4-methoxyphenylazo group, a 4-pivaloylaminophenylazo group or a 2-hydroxy-4-propanoylphenylazo group), an acyloxy group (for example, an acetoxy group), a carbamoyloxy group (for example, an N-methylcarbamoyloxy group or an N-phenylcarbamoyloxy group), a silyloxy group (for example, a trimethylsilyloxy group or a dibutylmethylsilyloxy group), an aryloxycarbonylamino group (for example, a phenoxycarbonylamino group), an imido group (for example, an N-succinimido group or an N-phthalimido group), a heterocyclic thio group (for example, a 2-benzothiazolylthio group, a 2,4-di-phenoxy-1, 3,5-triazole-6-thio group or a 2-pyridylthio group), a sulfinyl group (for example, a 3-phenoxypropylsulfinyl group), a phosphonyl group (for example, a phenoxyphosphonyl group, an octyloxyphosphonyl group or a phenylphosphonyl group), an aryloxycarbonyl group (for example, a phenoxycarbonyl group), an acyl group (for example, an acetyl group, a 3-phenylpropanoyl group or a benzoyl group), or an ionic hydrophilic group (for example, a carboxy group, a sulfo group, a phosphono group or a quaternary ammonium group).

When Z, $R_1$, $R_2$ and Y are groups capable of further having a substituent, examples of the substituent groups include preferably a cyano group, a hydroxy group, an amino group, an alkyloxy group, an aryloxy group, an acylamino group, an alkylamino group, an anilino group, a ureido group, a sulfamoylamino group, an alkylthio group, an arylthio group, an alkyloxycarbonylamino group, an alkylsulfonamido group, an arylsulfonamido group, a carbamoyl group, a sulfamoyl group, an alkyl sulfonyl group, an arylsulfonyl group, an alkyloxycarbonyl group, a heterocyclic oxy group, an alkyl azo group, an arylazo group, an acyloxy group, a carbamoyloxy group, an aryloxycarbonylamino group, an imido group, a heterocyclic thio group, an alkyl sulfinyl group, an arylsulfinyl group, a phosphonyl group, an aryloxycarbonyl group, an acyl group and an ionic hydrophilic group, and more preferably a cyano group, a hydroxy group, an amino group, an acylamino group, an alkylamino group, an anilino group, a ureido group, a sulfamoylamino group, an alkyloxycarbonylamino group, an alkyl- or aryl-sulfonamido group, a carbamoyl group, a sulfamoyl group, an alkyl sulfonyl group, an arylsulfonyl group, an alkyloxycarbonyl group, a heterocyclic oxy group, an alkyl azo group, an arylazo group, an acyloxy group, a carbamoyloxy group, an aryloxycarbonylamino group, an imido group, a heterocyclic thio group, an alkyl sulfinyl group, an arylsulfinyl group, a phosphonyl group, an aryloxycarbonyl group and an ionic hydrophilic group.

When the phthalocyanine derivative represented by Formula (I) is water-soluble, it preferably has an ionic hydrophilic group. The ionic hydrophilic group includes anionic groups such as a sulfo group, a carboxy group and a phosphono group, a quaternary ammonium group and the like. Preferable ionic hydrophilic groups include a carboxy group, a phosphono group and a sulfo group. Particularly preferable are a carboxy group and a sulfo group. Here, the carboxy group, the phosphono group and the sulfo group may be in a salt state, wherein a counter ion for forming the salt is preferably an ammonium ion.

a and b each represent the number of substituents of X and Y, respectively. a represents an integer from 0 to 16, and b represents an integer from 0 to 16. Preferably a represents an integer from 0 to 8, and b represents an integer from 0 to 8. More preferably a represents an integer from 0 to 4, and b represents an integer from 0 to 4. Meanwhile, when either a or b is an integer of 2 or greater, plurality of either Xs or Ys exist, which may be the same as or different from each other.

$M_1$ in Formula (I) represents a hydrogen atom, a metal element, a metal oxide, a metal hydroxide, or a metal halide. In the invention, preferable examples of $M_1$ include, in addition to a hydrogen atom, as the metal element, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like. As the metal oxide, preferable examples of $M_1$ include VO, GeO, and the like. As the metal hydroxide, preferable examples of $M_1$ include $Si(OH)_2$, $Cr(OH)_2$, $Sn(OH)_2$, and the like. Further, as the metal halide, preferable examples of $M_1$ include AlCl, $SiCl_2$, VCl, $VCl_2$, VOCl, FeCl, GaCl, ZrCl, and the like. Among them, Fe, Cu, Ni, Zn, Al, and Si are preferable as $M_1$, and Fe, Cu, and Si are more preferable.

Further, two or more compounds represented by Formula (I) (hereinafter, occasionally abbreviated as "Pc-$M_1$") may form a polymer via L (divalent linking group) connecting to respective $M_1$s. For example, a Pc (phthalocyanine ring) may form a dimer (for example, Pc-$M_1$-L-$M_1$-Pc) or a trimer. $M_1$s on this occasion may be the same as or different from each other.

The divalent linking group represented by L is preferably an oxy group —O—, a thio group —S—, a carbonyl group —CO—, a sulfonyl group —$SO_2$—, an imino group —NH—, a methylene group —$CH_2$— or a divalent linking group foamed by combining them.

The above description is summarized as follows. In the invention, the embodiment of the compound represented by Formula (I) satisfies preferably at least two of the preferable embodiments described in (A) to (F) below, more preferably all of the preferable embodiments described in (A) to (F) below, furthermore preferably at least two of the more preferable embodiments or the furthermore preferable embodiments described in (A) to (F) below, still furthermore preferably all of the more preferable embodiments described in (A) to (F) below, and particularly preferably all of the more preferable embodiments and the furthermore preferable embodiments described in (A) to (F) below.

(A) X represents preferably —SO—Z, —$SO_2$—Z, —$SO_2NR_1R_2$, —$SO_3R_1$ or —$CO_2R_1$, more preferably —$SO_2$—Z, —$SO_2NR_1R_2$, —$SO_3R_1$ or —$CO_2R_1$, and furthermore preferably —$SO_2$—Z, —$SO_2NR_1R_2$, —$SO_3H$ or —$CO_2H$. In a case where X represents —$SO_3H$ or —$CO_2H$, these substituents may be in a salt state, wherein a counter ion for forming the salt is preferably a lithium ion, a sodium ion, a potassium ion and an ammonium ion.

(B) Z is preferably a substituted or unsubstituted alkyl group, a substituted or unsubstituted aryl group or a substituted or unsubstituted heterocyclic group, and more preferably, among them, a substituted alkyl group, a substituted aryl group or a substituted heterocyclic group.

(C) Y is preferably a halogen atom, an alkyl group, an aryl group, a cyano group, an alkyloxy group, an acylamino group, a ureido group, a carbamoyl group or an alkyloxycarbonyl group, and more preferably a halogen atom or a cyano group.

(D) When Z, $R_1$, $R_2$ and Y are groups capable of further having a substituent, examples of the substituent groups include preferably a cyano group, a hydroxy group, an amino group, an acylamino group, an alkylamino group, an anilino group, a ureido group, a sulfamoylamino group, an alkyloxycarbonylamino group, an alkylsulfonamido group, an arylsulfonamido group, a carbamoyl group, a sulfamoyl group, an alkylsulfonyl group, an arylsulfonyl group, an alkyloxycarbonyl group, a heterocyclic oxy group, an alkylazo group, an arylazo group, an acyloxy group, a carbamoyloxy group, an aryloxycarbonylamino group, an imido group, a heterocyclic thio group, a sulfinyl group, a phosphonyl group, an aryloxycarbonyl group and an ionic hydrophilic group, and more preferably a cyano group, a hydroxy group, an amino group, an alkylamino group, an anilino group, a sulfamoyl group, an alkylsulfonyl group, an arylsulfonyl group, an alkylsulfonamido group, an arylsulfonamido group, a carbamoyl group and an ionic hydrophilic group.

(E) Regarding a and b, preferably a represents an integer from 0 to 8 and b represents an integer from 0 to 8, and more preferably a represents an integer from 0 to 4 and b represents an integer from 0 to 4.

(F) Preferable examples of $M_1$ include, in addition to a hydrogen atom, as the metal element, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like. As the metal oxide, preferable examples include VO, GeO and the like. Further, as the hydroxide, preferable examples include $Si(OH)_2$, $Cr(OH)_2$, $Sn(OH)_2$ and the like. Furthermore, as the halide, preferable examples include AlCl, $SiCl_2$, VCl, $VCl_2$, VOCl, FeCl, GaCl, ZrCl and the like. Among them, Fe, Cu, Ni, Zn, Al and Si are more preferable, and Fe, Cu and Si are particularly preferable.

[Compound Represented by Formula (II)]

At least one kind of compound included in the mixed crystal of the invention is characterized by being the compound represented by the following Formula (II).

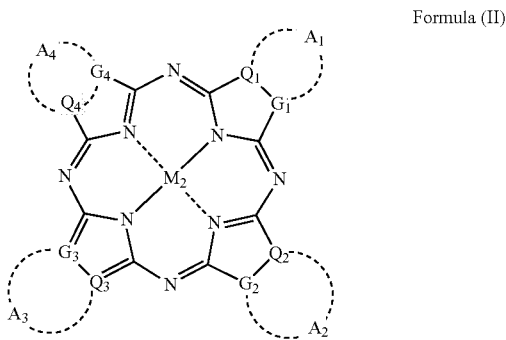

Formula (II)

In Formula (II), $G_1$ to $G_4$ and $Q_1$ to $Q_4$ each independently represent a carbon atom or a nitrogen atom, and a carbon atom is preferable. Each bond between $G_1$ and $Q_1$, between $G_2$ and $Q_2$, between $G_3$ and $Q_3$, and between $G_4$ and $Q_4$ represents a single bond or a double bond corresponding to respective atomic species and the respective heterocycles fainted with a group of atoms represented by $A_1$ to $A_4$.

In Formula (II) above, $A_1$ to $A_4$ each independently represent a group of atoms necessary for forming an aromatic ring or a heterocycle with the respective $G_1$ to $G_4$ and $Q_1$ to $Q_4$ (further, a condensed ring may be formed with another ring). But, at least one of the four rings to be formed is a heterocycle.

In addition, in the invention, the groups of atoms represented by $A_1$ to $A_4$ each independently include preferably at least one atom selected from a carbon atom, a nitrogen atom, an oxygen atom and a sulfur atom. And, the group of atoms forming the skeleton of the ring among the groups of atoms represented by $A_1$ to $A_4$ is more preferably consisting of three or four atoms selected from a carbon atom, a nitrogen atom, an oxygen atom or a sulfur atom.

The aforementioned aromatic ring denotes an aromatic ring including only carbon atoms as the atom constituting the ring, unless clearly specified particularly. Specific examples include a benzene ring. The aromatic ring may further form a condensed ring with another aromatic ring, a heterocycle or an aliphatic ring.

Further, when $A_1$ to $A_4$, $G_1$ to $G_4$ and $Q_1$ to $Q_4$ form a heterocycle, the group of atoms represented by $A_1$ to $A_4$ is preferably constituted of at least two atoms selected from a carbon atom, a nitrogen atom, an oxygen atom or a sulfur atom. More preferably, the group of atoms represented by $A_1$ to $A_4$ is preferably constituted of at least two atoms selected from a carbon atom, a nitrogen atom or a sulfur atom. As the heterocycle formed with $A_1$ to $A_4$, $G_1$ to $G_4$ and $Q_1$ to $Q_4$, a heterocycle of 5- or 6-membered ring is preferable.

Preferable examples of the heterocycle formed with $A_1$ to $A_4$, $G_1$ to $G_4$ and $Q_1$ to $Q_4$ include pyridine, pyrazine, imidazole, pyrazole, thiazole, isothiazole, oxazole, pyrrole, pyrazolone, indole, isoxazole, thiophene, furan, pyran, penthiophene, quinoline, isoquinoline, pyridazine, pyrimidine, pyridone and the like.

Further, the aromatic ring or the heterocycle formed with $A_1$ to $A_4$, $G_1$ to $G_4$ and $Q_1$ to $Q_4$ may have a substituent. Preferable examples of the substituent when the aromatic or heterocycle may have a substituent (hereinafter, occasionally referred to as "the substituent in Formula (II)") include a halogen atom, an alkyl group, a cycloalkyl group, an alkenyl group, an alkynyl group, an aralkyl group, an aryl group, a heterocyclic group, a cyano group, a hydroxy group, a nitro group, an amino group, an alkylamino group, an alkyloxy group, an aryloxy group, an acylamino group, an arylamino group, a ureido group, a sulfamoylamino group, an alkylthio group, an arylthio group, an alkyloxycarbonylamino group, an alkylsulfonamido group, an arylsulfonamido group, a carbamoyl group, a sulfamoyl group, an alkylsulfonyl group, an arylsulfonyl group, an alkyloxycarbonyl group, a heterocyclic oxy group, an alkylazo group, an arylazo group, an acyloxy group, a carbamoyloxy group, a silyloxy group, an aryloxycarbonyl group, an aryloxycarbonylamino group, an imido group, a heterocyclic thio group, an alkylsulfinyl group, an arylsulfinyl group, a phosphoryl group, an acyl group and an ionic hydrophilic group. These substituents may further have a substituent.

The substituent in Formula (II) is preferably a halogen atom, an alkyl group, a cycloalkyl group, an alkenyl group, an aralkyl group, an aryl group, a heterocyclic group, a cyano group, an alkyloxy group, an acylamino group, a ureido group, an alkylsulfonamido group, an arylsulfonamido group, a carbamoyl group, a sulfamoyl group, an alkylsulfonyl group, an arylsulfonyl group, an alkyloxycarbonyl group or an ionic hydrophilic group. As the substituent, a halogen atom, an alkyl group, a cycloalkyl group, an alkenyl group, an aralkyl group, an aryl group, a heterocyclic group, a cyano group, a carbamoyl group, a sulfamoyl group, an alkylsulfonyl group, an arylsulfonyl group, an alkyloxycarbonyl group or an ionic hydrophilic group is further preferable, and a substituted or unsubstituted sulfamoyl group, a substituted or unsubstituted alkylsulfonyl group, a substituted or unsubstituted arylsulfonyl group, or an ionic hydrophilic group is particularly preferable.

The ionic hydrophilic group as the substituent includes a sulfo group, a carboxy group, a phosphono group, and a quaternary ammonium group. As the ionic hydrophilic group, a carboxy group or a sulfo group is preferable, and a sulfo group is particularly preferable.

The carboxy group, phosphono group, or sulfo group may be in a salt form, and examples of the counter ion forming the salt include alkaline metal ions (e.g., lithium ion, sodium ion and potassium ion) and organic cations (e.g., tetramethylguanidinium ion).

The alkyl group as a substituent in Formula (II) includes an alkyl group having a substituent and an unsubstituted alkyl group. The alkyl group is preferably an alkyl group having 1 to 20 carbon atoms excluding the carbon atoms of the substituent, more preferably an alkyl group having 1 to 12 carbon atoms, and particularly preferably a straight chain or branched alkyl group having 1 to 8 carbon atoms. Examples of the substituent include a hydroxy group, an alkyloxy group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group as a substituent in Formula (II) includes a cycloalkyl group having a substituent and an unsubstituted cycloalkyl group. The cycloalkyl group is preferably a cycloalkyl group having 3 to 20 carbon atoms excluding the carbon atoms of the substituent, more preferably a cycloalkyl group having 5 to 12 carbon atoms, and particularly preferably a branched cycloalkyl group having 4 to 8 carbon atoms. Examples of the substituent include an ionic hydrophilic group. Examples of the cycloalkyl group include a cyclohexyl group.

The alkenyl group as a substituent Formula (II) includes an alkenyl group having a substituent and an unsubstituted alkenyl group. The alkenyl group is preferably an alkenyl group having 2 to 20 carbon atoms excluding the carbon atoms of the substituent, more preferably an alkenyl group having 2 to 12 carbon atoms, and particularly preferably a branched alkenyl group having 3 to 12 carbon atoms. Examples of the substituent include an ionic hydrophilic group. Examples of the alkenyl group include a vinyl group and an allyl group.

The alkynyl group as a substituent in Formula (II) includes an alkynyl group having a substituent and an unsubstituted alkynyl group. The alkynyl group is preferably an alkynyl group having 2 to 20 carbon atoms excluding the carbon atoms of the substituent, more preferably an alkynyl group having 2 to 12 carbon atoms, and particularly preferably a branched alkynyl group having 4 to 12 carbon atoms. Examples of the substituent include an ionic hydrophilic group.

The aralkyl group as a substituent in Formula (II) includes an aralkyl group having a substituent and an unsubstituted aralkyl group. The aralkyl group is preferably an aralkyl group having 7 to 20 carbon atoms excluding the carbon atoms of the substituent, more preferably an aralkyl group having 7 to 12 carbon atoms, and particularly preferably a branched aralkyl group having 9 to 12 carbon atoms. Examples of the substituent include an ionic hydrophilic group. Examples of the aralkyl group include a benzyl group and a 2-phenethyl group.

The aryl group as a substituent in Formula (II) includes an aryl group having a substituent and an unsubstituted aryl group. The aryl group is preferably an aryl group having 6 to 40 carbon atoms, and more preferably an aryl group having 6 to 12 carbon atoms. From the viewpoint of solubility, a branched alkyl group having 3 to 12 carbon atoms is particularly preferable as the substitutent of the aryl group. Examples of the substituent include an alkyl group, an alkyloxy group, a halogen atom, an alkylamino group, and an ionic hydrophilic group. Examples of the aryl group include phenyl, p-tolyl, p-methoxyphenyl, o-chlorophenyl, m-(3-sulfopropylamino)phenyl, and m-sulfophenyl.

The heterocyclic group as a substituent in Formula (II) includes a heterocyclic group having a substituent and an unsubstituted heterocyclic group. The heterocyclic group may further form a condensed ring with another ring. As the heterocyclic group, a 5-membered or 6-membered heterocyclic group is preferable. The heterocyclic group may be an aromatic heterocyclic group or a non-aromatic heterocyclic group.

The aforementioned heterocyclic groups are formed by removing at least one atom from a heterocyclic compound.

Examples of the heterocyclic compound include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline and the like. Meanwhile, no particular limitation is imposed on the substitution position of the heterocyclic group. For example, pyridine may be substituted at 2-, 3- or 4-position.

Among the aforementioned heterocyclic compounds, aromatic heterocyclic compounds are preferable, pyridine, pyrazine, pyrimidine, pyridazine, triazine, pyrazole, imidazole, benzimidazole, triazole, thiazole, benzothiazole, isothiazole, benzisothiazole and thiadiazole are more preferable, and pyridine, pyrazine, pyrimidine, pyridazine, triazine, pyrazole, imidazole, benzimidazole, thiazole, benzothiazole, isothiazole, benzisothiazole and thiadiazole are furthermore preferable.

The halogen atoms as a substituent in Formula (II) includes a fluorine atom, a chlorine atom and a bromine atom.

The alkylamino group as a substituent in Formula (II) includes an alkylamino group having a substituent and an unsubstituted alkylamino group. The alkylamino group is preferably an alkylamino group having 1 to 30 carbon atoms excluding the carbon atoms of the substituent, more preferably an alkylamino group having 1 to 20 carbon atoms, and further preferably an alkylamino group having 1 to 10 carbon atoms. Examples of the substituent include an ionic hydrophilic group. Examples of the alkylamino group include a methylaminol group and a diethylamino group.

The alkyloxy group as a substituent in Formula (II) includes an alkyloxy group having a substituent and an unsubstituted alkyloxy group. The alkyloxy group is preferably an alkyloxy group having 1 to 30 carbon atoms excluding the carbon atoms of the substituent, more preferably an alkyloxy group having 1 to 20 carbon atoms, and further preferably an alkyloxy group having 1 to 10 carbon atoms. Examples of the substituent include an alkyloxy group, a hydroxy group, and an ionic hydrophilic group. Examples of the alkyloxy group include a methoxy group, an ethoxy group, an isopropoxy group, a methoxyethoxy group, a hydroxyethoxy group, and a 3-carboxypropoxy group.

The aryloxy group as a substituent in Formula (II) includes an aryloxy group having a substituent and an unsubstituted aryloxy group. The aryloxy group is preferably an aryloxy group having 6 to 30 carbon atoms, more preferably an aryloxy group having 6 to 20 carbon atoms, further preferably an aryloxy group having 6 to 10 carbon atoms. Examples of the substituent include an alkyloxy group and an ionic hydrophilic group. Examples of the aryloxy group include a phenoxy group, a p-methoxyphenoxy group, and an o-methoxyphenoxy group.

The acylamino group as a substituent in Formula (II) includes an acylamino group having a substituent and an unsubstituted acylamino group. The acylamino group is preferably an acylamino group having 2 to 30 carbon atoms excluding the carbon atoms of the substituent, more preferably an acylamino group having 2 to 20 carbon atoms, and further preferably an acylamino group having 2 to 10 carbon atoms. Examples of the substituent include an ionic hydrophilic group. Examples of the acylamino group include an acetamido group, a propionamido group, a benzamido group, and a 3,5-disulfobenzamido group.

The arylamino group as a substituent in Formula (II) includes an arylamino group having a substituent and an unsubstituted arylamino group. The arylamino group is preferably an arylamino group having 6 to 30 carbon atoms, more preferably an arylamino group having 6 to 20 carbon atoms, and further preferably an arylamino group having 2 to 15 carbon atoms. Examples of the substituent include a halogen atom and an ionic hydrophilic group. Examples of the arylamino group include an anilino group and a 2-chloroanilino group.

The ureido group as a substituent in Formula (II) includes a ureido group having a substituent and an unsubstituted ureido group. The ureido group having a substituent is preferably a ureido group having 1 to 30 carbon atoms of the substituent, more preferably a ureido group having 1 to 20 carbon atoms of the substituent, and further preferably a ureido group having 1 to 10 carbon atoms of the substituent. Examples of the substituent include an alkyl group and an aryl group. Examples of the ureido group include a 3-methylureido group, a 3,3-dimethylureido group, and a 3-phenylureido group.

The sulfamoylamino group as a substituent in Formula (II) includes a sulfamoylamino group having a substituent and an unsubstituted sulfamoylamino group. The sulfamoylamino group having a substituent is preferably a sulfamoylamino group having 1 to 30 carbon atoms of the substituent, more preferably a sulfamoylamino group having 1 to 20 carbon atoms of the substituent, and further preferably a sulfamoylamino group having 1 to 10 carbon atoms of the substituent. Examples of the substituent include an alkyl group. Examples of the sulfamoylamino group include a N,N-dipropylsulfamoylamino group.

The alkylthio group as a substituent in Formula (II) includes an alkylthio group having a substituent and an unsubstituted alkylthio group. The alkylthio group is preferably an alkylthio group having 1 to 30 carbon atoms excluding the carbon atoms of the substituent, more preferably an alkylthio group having 1 to 20 carbon atoms, and further preferably an alkylthio group having 1 to 10 carbon atoms. Examples of the substituent include an ionic hydrophilic group. Examples of the alkylthio group include a methylthio group and an ethylthio group.

The arylthio group as a substituent in Formula (II) includes an arylthio group having a substituent and an unsubstituted arylthio group. The arylthio group is preferably an arylthio group having 6 to 30 carbon atoms, more preferably an arylthio group having 6 to 20 carbon atoms, and further preferably an arylthio group having 6 to 15 carbon atoms. Examples of the substituent include an alkyl group and an ionic hydrophilic group. Examples of the arylthio group include a phenylthio group and a p-tolylthio group.

The alkyloxycarbonylamino group as a substituent in Formula (II) includes an alkyloxycarbonylamino group having a substituent and an unsubstituted alkyloxycarbonylamino group. The alkyloxycarbonylamino group is preferably an alkyloxycarbonylamino group having 2 to 30 carbon atoms excluding the carbon atoms of the substituent, more preferably an alkyloxycarbonylamino group having 2 to 20 carbon atoms, and further preferably an alkyloxycarbonylamino group having 2 to 10 carbon atoms. Examples of the substituent include an ionic hydrophilic group. Examples of the alkyloxycarbonylamino group include an ethoxycarbonylamino group.

The alkylsulfonamido group or arylsulfonamido group (hereinafter may be simply referred to as the sulfonamido group) as a substituent in Formula (II) includes a sulfonamido group having a substituent and an unsubstituted sulfonamido group. The sulfonamido group is preferably a sulfonamido group having 1 to 30 carbon atoms excluding the carbon atoms of the substituent, more preferably a sulfonamido group having 1 to 20 carbon atoms, and further preferably a sulfonamido group having 1 to 10 carbon atoms. Examples of the substituent include an ionic hydrophilic group. Examples of the sulfonamido group include a methanesulfonamido group, a benzenesulfonamido group, and a 3-carboxybenzenesulfonamido group.

The carbamoyl group as a substituent in Formula (II) includes a carbamoyl group having a substituent and an unsubstituted carbamoyl group. The carbamoyl group having a substituent is preferably a carbamoyl group having 1 to 30 carbon atoms of the substituent, more preferably a carbamoyl group having 1 to 20 carbon atoms of the substituent, and further preferably a carbamoyl group having 1 to 10 carbon atoms of the substituent. Examples of the substituent include an alkyl group. Examples of the carbamoyl group include a methylcarbamoyl group and a dimethylcarbamoyl group.

The sulfamoyl group as a substituent in Formula (II) includes a sulfamoyl group having a substituent and an unsubstituted sulfamoyl group. The sulfamoyl group having a substituent is preferably a sulfamoyl group having 1 to 30 carbon atoms of the substituent, more preferably a sulfamoyl group having 1 to 20 carbon atoms of the substituent, and further preferably a sulfamoyl group having 1 to 10 carbon atoms of the substituent. Examples of the substituent include an alkyl group and an aryl group. Examples of the sulfamoyl group include a dimethylsulfamoyl group, a di-(2-hydroxyethyl)sulfamoyl group, and a phenylsulfamoyl group.

The alkylsulfonyl group or arylsulfonyl group (hereinafter may be simply referred to as the sulfonyl group) as a substituent in Formula (II) includes a sulfonyl group having a substituent and an unsubstituted sulfonyl group. The sulfonyl group is preferably a sulfonyl group having 1 to 30 carbon atoms excluding the carbon atoms of the substituent, more preferably a sulfonyl group having 1 to 20 carbon atoms, and further preferably a sulfonyl group having 1 to 10 carbon atoms. Examples of the sulfonyl group include a 3-sulfopropylsulfonyl group, and a 3-carboxypropylsulfonyl group.

The alkyloxycarbonyl group as a substituent in Formula (II) includes an alkyloxycarbonyl group having a substituent and an unsubstituted alkyloxycarbonyl group. The alkyloxycarbonyl group is preferably an alkyloxycarbonyl group having 2 to 30 carbon atoms excluding the carbon atoms of the substituent, more preferably an alkyloxycarbonyl group having 2 to 20 carbon atoms, and further preferably an alkyloxycarbonyl group having 2 to 10 carbon atoms. Examples of the substituent include an ionic hydrophilic group. Examples of the alkyloxycarbonyl group include a methoxycarbonyl group, and an ethoxycarbonyl group.

The heterocyclic oxy group as a substituent in Formula (II) includes a heterocyclic oxy group having a substituent and an unsubstituted heterocyclic oxy group. As the heterocyclic oxy group, a heterocyclic oxy group having a 5-membered or 6-membered heterocycle group is preferable. Examples of the substituent include a hydroxy group, and an ionic hydrophilic group. Examples of the heterocyclic oxy group include a tetrahydropyranyloxy group.

The alkylazo group or arylazo group (hereinafter may be simply referred to as the azo group) as a substituent in Formula (II) includes an azo group having a substituent and an unsubstituted azo group. The azo group is preferably an azo group having 1 to 30 carbon atoms excluding the carbon atoms of the substituent, more preferably an azo group having 1 to 20 carbon atoms, and further preferably an azo group having 1 to 10 carbon atoms. Examples of the azo group include a p-nitrophenylazo group.

The acyloxy group as a substituent in Formula (II) includes an acyloxy group having a substituent and an unsubstituted acyloxy group. The acyloxy group is preferably an acyloxy group having 1 to 30 carbon atoms excluding the carbon atoms of the substituent, more preferably an acyloxy group having 1 to 20 carbon atoms, and further preferably an acyloxy group having 1 to 10 carbon atoms. Examples of the substituent include an ionic hydrophilic group. Examples of the acyloxy group include an acetoxy group, and a benzoyl oxy group.

The carbamoyloxy group as a substituent in Formula (II) includes a carbamoyloxy group having a substituent and an unsubstituted carbamoyloxy group. The carbamoyloxy group having a substituent is preferably a carbamoyloxy group having 2 to 30 carbon atoms of the substituent, more preferably a carbamoyloxy group having 2 to 20 carbon atoms of the substituent, and further preferably a carbamoyloxy group having 2 to 10 carbon atoms of the substituent. Examples of the substituent include an alkyl group. Examples of the carbamoyloxy group include a N-methylcarbamoyloxy group.

The silyloxy group as a substituent in Formula (II) includes a silyloxy group having a substituent and an unsubstituted silyloxy group. The silyloxy group having a substituent is preferably a silyloxy group having 1 to 30 carbon atoms of the substituent, more preferably a silyloxy group having 1 to 20 carbon atoms of the substituent, and further preferably a silyloxy group having 1 to 10 carbon atoms of the substituent. Examples of the substituent include an alkyl group. Examples of the silyloxy group include a trimethysilyloxy group.

The aryloxycarbonyl group as a substituent in Formula (II) includes an aryloxycarbonyl group having a substituent and an unsubstituted aryloxycarbonyl group. The aryloxycarbonyl group is preferably an aryloxycarbonyl group having 7 to 30 carbon atoms, more preferably an aryloxycarbonyl group having 7 to 20 carbon atoms, and further preferably an aryloxycarbonyl group having 7 to 10 carbon atoms. Examples of the substituent include an ionic hydrophilic group. Examples of the aryloxycarbonyl group include a phenoxycarbonyl group.

The aryloxycarbonylamino group as a substituent in Formula (II) includes an aryloxycarbonylamino group having a substituent and an unsubstituted aryloxycarbonylamino group. The aryloxycarbonylamino group is preferably an aryloxycarbonylamino group having 7 to 30 carbon atoms, more preferably an aryloxycarbonylamino group having 7 to 20 carbon atoms, and further preferably an aryloxycarbonylamino group having 7 to 15 carbon atoms. Examples of the substituent include an ionic hydrophilic group. Examples of the aryloxycarbonylamino group include a phenoxycarbonylamino group.

The imido group as a substituent in Formula (II) includes an imido group having a substituent and an unsubstituted imido group. The imido group having a substituent is preferably an imido group having 2 to 30 carbon atoms of the substituent, more preferably an imido group having 2 to 20 carbon atoms of the substituent, and further preferably an imido group having 2 to 15 carbon atoms of the substituent. Examples of the imido group include a N-phthalimido group, and N-succinimido group.

The heterocyclic thio group as a substituent in Formula (II) includes a heterocyclic thio group having a substituent and an unsubstituted heterocyclic thio group. As the heterocyclic thio group, a heterocyclic thio group having a 5-membered or 6-membered heterocycle is preferable. The heterocyclic thio group is preferably a heterocyclic thio group having 1 to 20 carbon atoms, and more preferably a heterocyclic thio group having 1 to 10 carbon atoms. Examples of the substituent include an ionic hydrophilic group. Examples of the heterocyclic thio group include a pyridylthio group.

The alkylsulfinyl group or arylsulfinyl group (hereinafter may be simply referred to as the sulfinyl group) as a substituent in Formula (II) includes a sulfinyl group having a substituent and an unsubstituted sulfinyl group. The sulfinyl group is preferably a sulfinyl group having 1 to 30 carbon atoms excluding the carbon atoms of the substituent, more preferably a sulfinyl group having 1 to 20 carbon atoms, and further preferably a sulfinyl group having 1 to 15 carbon atoms. Examples of the sulfinyl group include a 3-sulfopropylsulfinyl group and a 3-carboxypropylsulfinyl group.

The phosphoryl group as a substituent in Formula (II) includes a phosphoryl group having a substituent and an unsubstituted phosphoryl group. The phosphoryl group having a substituent is preferably a phosphoryl group having 1 to 30 carbon atoms of the substituent, more preferably a phosphoryl group having 1 to 20 carbon atoms of the substituent, and further preferably a phosphoryl group having 1 to 15 carbon atoms of the substituent. Examples of the phosphoryl group include a phenoxyphosphoryl group and a phenylphosphoryl group.

The acyl group as a substituent in Formula (II) includes an acyl group having a substituent and an unsubstituted acyl group. The acyl group is preferably an acyl group having 3 to 30 carbon atoms excluding the carbon atoms of the substituent, more preferably an acyl group having 3 to 20 carbon atoms, and further preferably an acyl group having 3 to 10 carbon atoms. Examples of the substituent include an ionic hydrophilic group. Examples of the acyl group includes an acetyl group and a benzoyl group.

Examples of the ionic hydrophilic group as a substituent in Formula (II) include a sulfo group, a carboxy group, and a quaternary ammonium group. As the ionic hydrophilic group, a carboxy group and a sulfo group are preferable, and a sulfo group is particularly preferable. The carboxy group and sulfo group may be in a salt form, and examples of the counter ion forming the salt include an ammonium ion, alkaline metal ions (e.g., lithium ion, sodium ion and potassium ion) and organic cations (e.g., tetramethylguanidinium ion).

The phthalocyanine compound represented by Formula (II) may have an ionic hydrophilic group. The ionic hydrophilic group include a sulfo group, a carboxy group, a phosphono group, and a quaternary ammonium group. As the ionic hydrophilic group, a carboxy group, a phosphono group and a sulfo group are preferable, and a carboxy group and a sulfo group are particularly preferable. The carboxy group, phosphono group, and sulfo group may be in a salt form, and examples of the counter ion forming the salt include an ammonium ion, alkaline metal ions (e.g., lithium ion, sodium ion and potassium ion) and organic cations (e.g., tetramethylammonium ion, tetramethylguanidinium ion and tetramethylphosphonium ion). Among them alkaline metal ions are preferable as the counter ion.

$M_2$ in Formula (II) represents a hydrogen atom, a metal element, a metal oxide, a metal hydroxide, or a metal halide. Preferable examples of $M_2$ include in addition to a hydrogen atom, as the metal element, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi or the like other than a hydrogen atom. Among them, Fe, Cu, Ni, Zn, Al or Si are preferable, and Fe, Cu or Si are particularly preferable as $M_2$.

As the metal oxide, preferable examples of $M_2$ include VO, GeO, and the like. As the metal hydroxide, preferable examples of $M_2$ include $Si(OH)_2$, $Cr(OH)_2$, $Sn(OH)_2$, and the like. Further, as the metal halide, preferable examples of $M_2$ include AlCl, $SiCl_2$, VCl, $VCl_2$, VOCl, $FeCl_2$, GaCl, ZrCl, and the like.

Further, compounds represented by Formula (II) (hereinafter, occasionally abbreviated as "$Pc_2$-$M_2$") may form a polymer via L (divalent linking group) connecting to respective $M_2$s. For example, $Pc_2$ (phthalocyanine ring) may form a dimer (for example, $Pc_2$-$M_2$-L-$M_2$-$Pc_2$) or a trimer. $M_2$s on this occasion may be the same as or different from each other.

The divalent linking group represented by L is preferably an oxy group —O—, a thio group —S—, a carbonyl group —CO—, a sulfonyl group —$SO_2$—, an imino group —NH—, a methylene group —$CH_2$— or a group formed by combining them.

The above description is summarized as follows. In the invention, the embodiment of the compound represented by Formula (II) satisfies preferably at least two of the preferable embodiments described in (A2) to (D2) below, more preferably all of the preferable embodiments described in (A2) to (D2) below, furthermore preferably at least two of the more preferable embodiments described in (A2) to (D2) below, and particularly preferably all of the more preferable embodiments described in (A2) to (D2) below.

(A2) Regarding $G_1$ to $G_4$ and $Q_1$ to $Q_4$, preferably one is a carbon atom and the other is a nitrogen atom, and, more preferably, all of them are carbon atoms.

(B2) The groups of atoms represented by $A_1$ to $A_4$ each independently include preferably at least one atom selected from a carbon atom, a nitrogen atom and a sulfur atom. And, among the groups of atoms represented by $A_1$ to $A_4$, the group of atoms that forms the skeleton of the ring consists more preferably of three or four atoms selected from a carbon atom, a nitrogen atom and a sulfur atom.

(C2) When an aromatic ring or a heterocycle formed with $A_1$ to $A_4$, $G_1$ to $G_4$ and $Q_1$ to $Q_4$ has a substituent, preferable examples of the substituent include a halogen atom, an alkyl group, a cycloalkyl group, an alkenyl group, an aralkyl group, an aryl group, a heterocyclic group, a cyano group, an alkyloxy group, an acylamino group, a ureido group, an alkylsulfonamido group, an arylsulfonamido group, a carbamoyl group, a sulfamoyl group, an alkylsulfonyl group, an arylsulfonyl group, an alkyloxycarbonyl group and an ionic hydrophilic group, more preferable examples include a halogen atom, an alkyl group, a cycloalkyl group, an alkenyl group, an aralkyl group, an aryl group, a heterocyclic group, a cyano group, a carbamoyl group, a sulfamoyl group, an alkylsulfonyl group, an arylsulfonyl group, an alkyloxycarbonyl group and an ionic hydrophilic group, and particularly preferable examples include a substituted or unsubstituted sulfamoyl group, a substituted or unsubstituted alkyl- or aryl-sulfonyl group and an ionic hydrophilic group.

(D2) Preferable examples of $M_2$ include, in addition to a hydrogen atom, as the metal element, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi and the like. Among them, Fe, Cu, Ni, Zn, Al or Si are more preferable, and Fe, Cu and Si are particularly preferable.

Hereinafter, specific examples of the compound represented by Formula (I) are shown, but the invention is not limited to them. Meanwhile, the compounds represented by Formula (I) or Formula (II) can be synthesized by an ordinary method for synthesizing phthalocyanine derivatives, for example, by a method described in JP-A No. 17-41856.

In the following specific examples, when two or more Xs exist in Formula (I), each of them is represented by X, X', X" and the like, and respective numbers of substituents are represented by a, a', a" and the like.

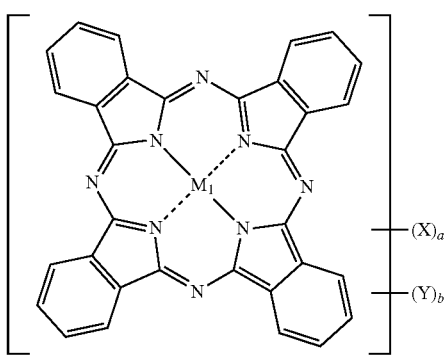

Formula (I)

TABLE 1

| Compound No. | $M_1$ | a = 0, b = 0 |
|---|---|---|
| 1 | Cu | X and Y are unsubstituted |
| 2 | Co | X and Y are unsubstituted |
| 3 | Ni | X and Y are unsubstituted |
| 4 | Zn | X and Y are unsubstituted |
| 5 | Fe | X and Y are unsubstituted |
| 6 | Si | X and Y are unsubstituted |
| 7 | $H_2$ | X and Y are unsubstituted |

TABLE 2

| CP* No. | $M_1$ | a | b | X |
|---|---|---|---|---|
| 101 | Cu | 1 | 0 | —$SO_3H$ |
| 102 | Cu | 1 | 0 | —$SO_3Na$ |
| 103 | Cu | 1 | 0 | —$SO_3Li$ |
| 104 | Cu | 1 | 0 | —$SO_3NH_4$ |
| 105 | Cu | 1 | 0 | —$SO_2NH_2$ |
| 106 | Cu | 1 | 0 | —COOH |
| 107 | Cu | 1 | 0 | —COOK |
| 108 | Cu | 1 | 0 | —COOLi |
| 109 | Fe | 1 | 0 | —$COONH_4$ |
| 110 | Cu | 1 | 0 | —$CONH_2$ |
| 111 | Zn | 1 | 0 | —$CONHCH_3$ |
| 112 | Cu | 1 | 0 | —$CON(C_6H_5)_2$ |
| 113 | Cu | 1 | 0 | —$CONH(C_6H_5)$ |
| 114 | Cu | 1 | 0 | —$CON(C_{16}H_{33})_2$ |
| 115 | Fe | 1 | 0 | —$COOC_6H_5$ |
| 116 | Cu | 1 | 0 | —$COOC_{10}H_{21}$ |
| 117 | Co | 1 | 0 | —$SOC_3H_7$ |
| 118 | Si | 1 | 0 | —$SO(t)C_4H_9$ |
| 119 | Cu | 1 | 0 | —$SOC_6H_5$ |
| 120 | Cu | 1 | 0 | —$SOC_3H_6SO_3Li$ |

CP* No.: Compound No.

TABLE 3

| CP* No. | $M_1$ | a | X |
|---|---|---|---|
| 121 | Cu | 1 | —$SO_2C_2H_5$ |
| 122 | Cu | 1 | —$SO_2(t)C_4H_9$ |
| 123 | Cu | 1 | —$SO_2C_6H_5$ |
| 124 | Cu | 1 | —$SO_2C_3H_6SO_3Li$ |
| 125 | Cu | 1 | —$SO_2C_3H_6SO_2NH_2$ |
| 126 | Cu | 1 | —$SO_2C_3H_6SO_2NHCH_2CH(OH)CH_3$ |
| 127 | Cu | 1 | —$SO_2C_{16}H_{33}$ |
| 128 | Cu | 1 | —$SO_2C_3H_6SO_2N(C_{16}H_{33})_2$ |
| 129 | Cu | 1 | —$SO_2C_3H_6SO_2NH$-(benzimidazol-2-yl) |
| 130 | Cu | 1 | —$SO_2C_3H_6SO_2NH$-(2-oxo-benzimidazol-5-yl) |
| 131 | Cu | 1 | —$SO_2NH_2$ |
| 132 | Cu | 1 | —$SO_2NH(t)C_4H_9$ |
| 133 | Cu | 1 | —$SO_2NHC_6H_5$ |
| 134 | Cu | 1 | —$SO_2NHC_2H_4SO_3Li$ |
| 135 | Cu | 1 | —$SO_2NHC_2H_4SO_2NH$-(benzimidazol-2-yl) |
| 136 | Cu | 1 | —$SO_2NH$-(2-oxo-benzimidazol-5-yl) |
| 137 | Cu | 1 | —$SO_2C_3H_6SO_2NH$-(2-oxo-benzimidazol-5-yl) |
| 138 | Cu | 1 | —$SO_2O(C_2H_4COO)_{10}C_8H_{17}$ |
| 139 | Fe | 1 | —$SO_2OC_6H_5$ |
| 140 | Cu | 1 | —$SO_2OC_3H_6SO_2NHCH_2CH(OH)CH_3$ |

CP* No.: Compound No.

TABLE 4

| CP* No. | $M_1$ | a | b | X |
|---|---|---|---|---|
| 141 | Cu | 2 | 0 | —$SO_3H$ |
| 142 | Cu | 2 | 0 | —$SO_3Na$ |
| 143 | Cu | 2 | 0 | —$SO_3Li$ |
| 144 | Cu | 2 | 0 | —$SO_3NH_4$ |
| 145 | Cu | 2 | 0 | —$SO_2NH_2$ |
| 146 | Cu | 2 | 0 | —COOH |
| 147 | Cu | 2 | 0 | —COOK |
| 148 | Cu | 2 | 0 | —COOLi |
| 149 | Cu | 2 | 0 | —$COONH_4$ |
| 150 | Cu | 2 | 0 | —$CONH_2$ |
| 151 | Cu | 2 | 0 | —$CON(C_6H_5)_2$ |
| 152 | Cu | 2 | 0 | —$CON(C_{16}H_{33})_2$ |
| 153 | Cu | 2 | 0 | —CONH-(2-oxo-benzimidazol-5-yl) |
| 154 | Cu | 2 | 0 | —$COOCH_3$ |
| 155 | Cu | 2 | 0 | —$COOC_6H_5$ |
| 156 | Cu | 2 | 0 | —$COOC_{10}H_{21}$ |
| 157 | Cu | 2 | 0 | —$SOC_3H_7$ |
| 158 | Si | 2 | 0 | —$SO(t)C_4H_9$ |
| 159 | Fe | 2 | 0 | —$SOC_6H_5$ |
| 160 | Cu | 2 | 0 | —$SOC_3H_6SO_3Li$ |

CP* No.: Compound No.

TABLE 5

| CP* No. | M₁ | a | X |
|---|---|---|---|
| 161 | Cu | 2 | —SO$_2$C$_2$H$_5$ |
| 162 | Cu | 2 | —SO$_2$(t)C$_4$H$_9$ |
| 163 | Cu | 2 | —SO$_2$C$_6$H$_5$ |
| 164 | Cu | 2 | —SO$_2$C$_3$H$_6$SO$_3$Li |
| 165 | Cu | 2 | —SO$_2$C$_3$H$_6$SO$_2$NH$_2$ |
| 166 | Cu | 2 | —SO$_2$C$_3$H$_6$SO$_2$NHCH$_2$CH(OH)CH$_3$ |
| 167 | Cu | 2 | —SO$_2$C$_16$H$_{33}$ |
| 168 | Cu | 2 | —SO$_2$C$_3$H$_6$SO$_2$N(C$_{16}$H$_{33}$)$_2$ |
| 169 | Cu | 2 | —SO$_2$C$_3$H$_6$SO$_2$NH-(benzimidazole) |
| 170 | Cu | 2 | —SO$_2$C$_3$H$_6$SO$_2$NH-(benzimidazolone) |
| 171 | Cu | 2 | —SO$_2$NH$_2$ |
| 172 | Cu | 2 | —SO$_2$NH(t)C$_4$H$_9$ |
| 173 | Cu | 2 | —SO$_2$NHC$_6$H$_5$ |
| 174 | Cu | 2 | —SO$_2$NHC$_2$H$_4$SO$_3$Li |
| 175 | Cu | 2 | —SO$_2$NHC$_2$H$_4$SO$_2$NH-(benzimidazole) |
| 176 | Cu | 2 | —SO$_2$NH-(benzimidazolone) |
| 177 | Cu | 2 | —SO$_2$C$_3$H$_6$SO$_2$NH-(benzimidazolone) |
| 178 | Si | 2 | —SO$_2$O(t)C$_4$H$_9$ |
| 179 | Fe | 2 | —SO$_2$OC$_6$H$_5$ |
| 180 | Cu | 2 | —SO$_2$OC$_3$H$_6$SO$_2$NHCH$_2$CH(OH)CH$_3$ |

CP* No.: Compound No.

TABLE 6

| CP* No. | M₁ | a | b | X |
|---|---|---|---|---|
| 181 | Cu | 3 | 0 | —SO$_3$H |
| 182 | Cu | 3 | 0 | —SO$_3$Na |
| 183 | Cu | 3 | 0 | —SO$_3$Li |
| 184 | Cu | 3 | 0 | —SO$_3$NH$_4$ |
| 185 | Cu | 3 | 0 | —SO$_2$NH$_2$ |
| 186 | Cu | 3 | 0 | —COOH |
| 187 | Cu | 3 | 0 | —COOK |
| 188 | Cu | 3 | 0 | —COOLi |
| 189 | Cu | 3 | 0 | —COONH$_4$ |
| 190 | Cu | 3 | 0 | —CONH$_2$ |
| 191 | Cu | 3 | 0 | —CON(C$_6$H$_5$)$_2$ |
| 192 | Cu | 3 | 0 | —CON(C$_{16}$H$_{33}$)$_2$ |
| 193 | Cu | 3 | 0 | —CONH-(benzimidazolone) |
| 194 | Cu | 3 | 0 | —COOCH$_3$ |
| 195 | Cu | 3 | 0 | —COOC$_6$H$_5$ |
| 196 | Cu | 3 | 0 | —COOC$_{10}$H$_{21}$ |
| 197 | Cu | 3 | 0 | —SOC$_3$H$_7$ |
| 198 | Si | 3 | 0 | —SO(t)C$_4$H$_9$ |
| 199 | Fe | 3 | 0 | —SOC$_6$H$_5$ |
| 200 | Cu | 3 | 0 | —SOC$_3$H$_6$SO$_3$Li |

CP* No.: Compound No.

TABLE 7

| CP* No. | M₁ | a | X |
|---|---|---|---|
| 201 | Cu | 3 | —SO$_2$C$_2$H$_5$ |
| 202 | Cu | 3 | —SO$_2$(t)C$_4$H$_9$ |
| 203 | Cu | 3 | —SO$_2$C$_6$H$_5$ |
| 204 | Cu | 3 | —SO$_2$C$_3$H$_6$SO$_3$Li |
| 205 | Cu | 3 | —SO$_2$C$_3$H$_6$SO$_2$NH$_2$ |
| 206 | Cu | 3 | —SO$_2$C$_3$H$_6$SO$_2$NHCH$_2$CH(OH)CH$_3$ |
| 207 | Cu | 3 | —SO$_2$C$_{16}$H$_{33}$ |
| 208 | Cu | 3 | —SO$_2$C$_3$H$_6$SO$_2$N(C$_{16}$H$_{33}$)$_2$ |
| 209 | Cu | 3 | —SO$_2$C$_3$H$_6$SO$_2$NH-(benzimidazole) |
| 210 | Cu | 3 | —SO$_2$C$_3$H$_6$SO$_2$NH-(benzimidazolone) |
| 211 | Cu | 3 | —SO$_2$NH$_2$ |
| 212 | Cu | 3 | —SO$_2$NH(t)C$_4$H$_9$ |
| 213 | Cu | 3 | —SO$_2$NHC$_6$H$_5$ |
| 214 | Cu | 3 | —SO$_2$NHC$_2$H$_4$SO$_3$Li |
| 215 | Cu | 3 | —SO$_2$NHC$_2$H$_4$SO$_2$NH-(benzimidazole) |
| 216 | Cu | 3 | —SO$_2$NH-(benzimidazolone) |
| 217 | Cu | 3 | —SO$_2$C$_3$H$_6$SO$_2$NH-(benzimidazolone) |
| 218 | Si | 3 | —SO$_2$O(t)C$_4$H$_9$ |
| 219 | Fe | 3 | —SO$_2$OC$_6$H$_5$ |
| 220 | Cu | 3 | —SO$_2$OC$_3$H$_6$SO$_2$NHCH$_2$CH(OH)CH$_3$ |

CP* No.: Compound No.

TABLE 8

| CP* No. | M₁ | a | X |
|---|---|---|---|
| 221 | Cu | 4 | —SO$_3$H |
| 222 | Cu | 4 | —SO$_3$Na |
| 223 | Cu | 4 | —SO$_3$Li |
| 224 | Cu | 4 | —SO$_3$NH$_4$ |
| 225 | Cu | 4 | —SO$_2$NH$_2$ |
| 226 | Cu | 4 | —COOH |

TABLE 8-continued

| CP* No. | M₁ | a | X |
|---|---|---|---|
| 227 | Cu | 4 | —COOK |
| 228 | Cu | 4 | —COOLi |
| 229 | Cu | 4 | —COONH₄ |
| 230 | Cu | 4 | —CONH₂ |
| 231 | Cu | 4 | —CON(C₆H₅)₂ |
| 232 | Cu | 4 | —CON(C₁₆H₃₃)₂ |
| 233 | Cu | 4 | 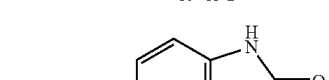 |
| 234 | Cu | 4 | —COOCH₃ |
| 235 | Cu | 4 | —COOC₆H₅ |
| 236 | Cu | 4 | —COOC₁₀H₂₁ |
| 237 | Cu | 4 | —SOC₃H₇ |
| 238 | Si | 4 | —SO(t)C₄H₉ |
| 239 | Fe | 4 | —SOC₆H₅ |
| 240 | Cu | 4 | —SOC₃H₆SO₃Li |

CP* No.: Compound No.

TABLE 9

| CP* No. | M₁ | a | X |
|---|---|---|---|
| 241 | Cu | 4 | —SO₂C₂H₅ |
| 242 | Cu | 4 | —SO₂(t)C₄H₉ |
| 243 | Cu | 4 | —SO₂C₆H₅ |
| 244 | Cu | 4 | —SO₂C₃H₆SO₃Li |
| 245 | Cu | 4 | —SO₂C₃H₆SO₂NH₂ |
| 246 | Cu | 4 | —SO₂C₃H₆SO₂NHCH₂CH(OH)CH₃ |
| 247 | Cu | 4 | —SO₂C₁₆H₃₃ |
| 248 | Cu | 4 | —SO₂C₃H₆SO₂N(C₁₆H₃₃)₂ |
| 249 | Cu | 4 | —SO₂C₃H₆SO₂NH-benzimidazole |
| 250 | Cu | 4 | —SO₂C₃H₆SO₂NH-benzimidazolone |
| 251 | Cu | 4 | —SO₂NH₂ |
| 252 | Cu | 4 | —SO₂NH(t)C₄H₉ |
| 253 | Cu | 4 | —SO₂NHC₆H₅ |
| 254 | Cu | 4 | —SO₂NHC₂H₄SO₃Li |
| 255 | Cu | 4 | —SO₂NHC₂H₄SO₂NH-benzimidazole |
| 256 | Cu | 4 | —SO₂NH-benzimidazolone |
| 257 | Cu | 4 | —SO₂C₃H₆SO₂NH-benzimidazolone |
| 258 | Si | 4 | —SO₂(C₂H₄COO)₁₀C₈H₁₇ |
| 259 | Fe | 4 | —SO₂OC₆H₅ |
| 260 | Cu | 4 | —SO₂OC₃H₆SO₂NHCH₂CH(OH)CH₃ |

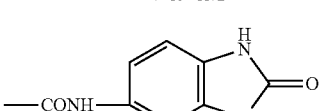

CP* No.: Compound No.

TABLE 10

| CP* No. | M₁ | a | a' | X | X' |
|---|---|---|---|---|---|
| 261 | Cu | 1 | 1 | —SO₃H | —SO₂NHC₂H₄SO₃H |
| 262 | Cu | 1 | 1 | —SO₃Na | —SO₂NHC₂H₄SO₃Na |
| 263 | Cu | 1 | 1 | —SO₃Li | —SO₂NHC₂H₄SO₃Li |
| 264 | Cu | 1 | 1 | —SO₃NH₄ | —SO₂NHC₂H₄SO₃NH₄ |
| 265 | Cu | 1 | 1 | —SO₂NH₂ | —SO₃NH₄ |
| 266 | Cu | 1 | 1 | —COOH | —CON(C₆H₅)₂ |
| 267 | Cu | 1 | 1 | —COOK | —CON(C₆H₅)₂ |
| 268 | Cu | 1 | 1 | —COOLi | —CON(C₁₆H₃₃)₂ |
| 269 | Cu | 1 | 1 | —COONH₄ | —COOH |
| 270 | Cu | 1 | 1 | —CONH₂ | —COONH₄ |
| 271 | Cu | 1 | 1 | —CON(C₆H₅)₂ | —COONH₂(C₆H₅)₂ |
| 272 | Cu | 1 | 1 | —CON(C₁₆H₃₃)₂ | —COONH₂(C₁₆H₃₃)₂ |
| 273 | Cu | 1 | 1 | —CONH-benzimidazolone | —COOH |
| 274 | Cu | 1 | 1 | —COOCH₃ | —COOH |
| 275 | Cu | 1 | 1 | —COOC₆H₅ | —COOH |
| 276 | Cu | 1 | 1 | —COOC₁₀H₂₁ | —COOH |
| 277 | Cu | 1 | 1 | —SOC₃H₇ | —SOC₃H₆SO₃Li |
| 278 | Si | 1 | 1 | —SO(t)C₄H₉ | —SOC₃H₆SO₃Li |
| 279 | Fe | 1 | 1 | —SOC₆H₅ | —SOC₃H₆SO₃Li |
| 280 | Cu | 1 | 1 | —SOC₃H₆SO₃Li | —SO₂NH₂ |

CP* No.: Compound No.

TABLE 11

| CP* No. | M₁ | a | a' | X | X' |
|---|---|---|---|---|---|
| 281 | Cu | 1 | 1 | —SO₂C₂H₅ | —SO₂C₆H₅ |
| 282 | Cu | 1 | 1 | —SO₂(t)C₄H₉ | —SO₂C₆H₅ |
| 283 | Cu | 1 | 1 | —SO₂C₆H₅ | —SO₂C₃H₆SO₃Li |
| 284 | Cu | 1 | 1 | —SO₂C₃H₆SO₃Li | —SO₂C₃H₆SO₃H |
| 285 | Cu | 1 | 1 | —SO₂C₃H₆SO₂NH₂ | —SO₂C₃H₆SO₃NH₄ |
| 286 | Cu | 1 | 1 | —SO₂C₃H₆SO₂NHCH₂CH(OH)CH₃ | —SO₂C₃H₆SO₃Li |
| 287 | Cu | 1 | 1 | —SO₂C₁₆H₃₃ | —SO₂C₆H₅ |
| 288 | Cu | 1 | 1 | —SO₂C₃H₆SO₂N(C₁₆H₃₃)₂ | —SO₂C₃H₆SO₃NH₂(C₁₆H₃₃)₂ |
| 289 | Cu | 1 | 1 | —SO₂C₃H₆SO₂NH-(benzimidazol-2-yl) | —SO₂NH₂ |
| 290 | Cu | 1 | 1 | —SO₂C₃H₆SO₂NH-(2-oxo-benzimidazol-5-yl) | —SO₂NH₂ |
| 291 | Cu | 1 | 1 | —SO₂NHC₃H₆ | —SO₂NH₂ |
| 292 | Cu | 1 | 1 | —SO₂NH(t)C₄H₉ | —SO₂NH₂ |
| 293 | Cu | 1 | 1 | —SO₂NHC₆H₅ | —SO₂NH₂ |
| 294 | Cu | 1 | 1 | —SO₂NHC₂H₄SO₃NH₄ | —SO₂NH₂ |
| 295 | Cu | 1 | 1 | —SO₂NHC₂H₄SO₂NH-(benzimidazol-2-yl) | —SO₂NH₂ |
| 296 | Cu | 1 | 1 | —SO₂NH-(2-oxo-benzimidazol-5-yl) | —SO₂NH₂ |
| 297 | Cu | 1 | 1 | —SO₂C₃H₆SO₂NH-(2-oxo-benzimidazol-5-yl) | —SO₂NH₂ |
| 298 | Si | 1 | 1 | —SO₂O(t)C₄H₉ | —SO₃H |
| 299 | Fe | 1 | 1 | —SO₂OC₆H₅ | —SO₃H |
| 300 | Cu | 1 | 1 | —SO₂OC₃H₆SO₂NHCH₂CH(OH)CH₃ | —SO₃H |

CP* No.: Compound No.

TABLE 12

| CP* No. | M₁ | a | a' | X | X' |
|---|---|---|---|---|---|
| 301 | Cu | 2 | 1 | —SO₃H | —SO₂NHC₂H₄SO₃H |
| 302 | Cu | 2 | 1 | —SO₃Na | —SO₂NHC₂H₄SO₃Na |
| 303 | Cu | 2 | 1 | —SO₃Li | —SO₂NHC₂H₄SO₃Li |
| 304 | Cu | 2 | 1 | —SO₃NH₄ | —SO₂NHC₂H₄SO₃NH₄ |
| 305 | Cu | 2 | 1 | —SO₂NH₂ | —SO₃NH₄ |
| 306 | Cu | 2 | 1 | —COOH | —CON(C₆H₅)₂ |
| 307 | Cu | 2 | 1 | —COOK | —CON(C₆H₅)₂ |
| 308 | Cu | 2 | 1 | —COOLi | —CON(C₁₆H₃₃)₂ |
| 309 | Cu | 2 | 1 | —COONH₄ | —COOH |
| 310 | Cu | 2 | 1 | —CONH₂ | —COONH₄ |
| 311 | Cu | 2 | 1 | —CON(C₆H₅)₂ | —COONH₂(C₆H₅)₂ |
| 312 | Cu | 2 | 1 | —CON(C₁₆H₃₃)₂ | —COONH₂(C₁₆H₃₃)₂ |
| 313 | Cu | 2 | 1 | —CONH-(2-oxo-benzimidazol-5-yl) | —COOH |

TABLE 12-continued

| CP* No. | M$_1$ | a | a' | X | X' |
|---|---|---|---|---|---|
| 314 | Cu | 2 | 1 | —COOCH$_3$ | —COOH |
| 315 | Cu | 2 | 1 | —COOC$_6$H$_5$ | —COOH |
| 316 | Cu | 2 | 1 | —COOC$_{10}$H$_{21}$ | —COOH |
| 317 | Cu | 2 | 1 | —SOC$_3$H$_7$ | —SOC$_3$H$_6$SO$_3$Li |
| 318 | Si | 2 | 1 | —SO(t)C$_4$H$_9$ | —SOC$_3$H$_6$SO$_3$Li |
| 319 | Fe | 2 | 1 | —SOC$_6$H$_5$ | —SOC$_3$H$_6$SO$_3$Li |
| 320 | Cu | 2 | 1 | —SOC$_3$H$_6$SO$_3$Li | —SO$_2$NH$_2$ |

CP*No.: Compound No.

TABLE 13

| CP* No. | M$_1$ | a | a' | X | X' |
|---|---|---|---|---|---|
| 321 | Cu | 2 | 1 | —SO$_2$C$_2$H$_5$ | —SO$_2$C$_6$H$_5$ |
| 322 | Cu | 2 | 1 | —SO$_2$(t)C$_4$H$_9$ | —SO$_2$C$_6$H$_5$ |
| 323 | Cu | 2 | 1 | —SO$_2$C$_6$H$_5$ | —SO$_2$C$_3$H$_6$SO$_3$Li |
| 324 | Cu | 2 | 1 | —SO$_2$C$_3$H$_6$SO$_3$Li | —SO$_2$C$_3$H$_6$SO$_3$H |
| 325 | Cu | 2 | 1 | —SO$_2$C$_3$H$_6$SO$_2$NH$_2$ | —SO$_2$C$_3$H$_6$SO$_3$NH$_4$ |
| 326 | Cu | 2 | 1 | —SO$_2$C$_3$H$_6$SO$_2$NHCH$_2$CH(OH)CH$_3$ | —SO$_2$C$_3$H$_6$SO$_3$Li |
| 327 | Cu | 2 | 1 | —SO$_2$C$_{16}$H$_{33}$ | —SO$_2$C$_6$H$_5$ |
| 328 | Cu | 2 | 1 | —SO$_2$C$_3$H$_6$SO$_2$N(C$_{16}$H$_{33}$)$_2$ | —SO$_2$C$_3$H$_6$SO$_3$NH$_2$(C$_{16}$H$_{33}$)$_2$ |
| 329 | Cu | 2 | 1 | —SO$_2$C$_3$H$_6$SO$_2$NH-(benzimidazol-2-yl) | —SO$_2$NH$_2$ |
| 330 | Cu | 2 | 1 | —SO$_2$C$_3$H$_6$SO$_2$NH-(2-oxo-benzimidazol-5-yl) | —SO$_2$NH$_2$ |
| 331 | Cu | 2 | 1 | —SO$_2$NHC$_3$H$_6$ | —SO$_2$NH$_2$ |
| 332 | Cu | 2 | 1 | —SO$_2$NH(t)C$_4$H$_5$ | —SO$_2$NH$_2$ |
| 333 | Cu | 2 | 1 | —SO$_2$NHC$_6$H$_5$ | —SO$_2$NH$_2$ |
| 334 | Cu | 2 | 1 | —SO$_2$NHC$_2$H$_4$SO$_3$Li | —SO$_2$NH$_2$ |
| 335 | Cu | 2 | 1 | —SO$_2$NHC$_2$H$_4$SO$_2$NH-(benzimidazol-2-yl) | —SO$_2$NH$_2$ |
| 336 | Cu | 2 | 1 | —SO$_2$NH-(2-oxo-benzimidazol-5-yl) | —SO$_2$NH$_2$ |
| 337 | Cu | 2 | 1 | —SO$_2$C$_3$H$_6$SO$_2$NH-(2-oxo-benzimidazol-5-yl) | —SO$_2$NH$_2$ |
| 338 | Si | 2 | 1 | —SO$_2$O(C$_2$H$_4$COO)$_{10}$C$_8$H$_{17}$ | —SO$_3$H |
| 339 | Fe | 2 | 1 | —SO$_2$OC$_6$H$_5$ | —SO$_3$H |
| 340 | Cu | 2 | 1 | —SO$_2$OC$_3$H$_6$SO$_2$NHCH$_2$CH(OH)CH$_3$ | —SO$_3$H |

CP*No.: Compound No.

TABLE 14

| CP* No. | M$_1$ | a | a' | X | X' |
|---|---|---|---|---|---|
| 341 | Cu | 1 | 3 | —SO$_3$H | —SO$_2$NHC$_2$H$_4$SO$_3$H |
| 342 | Cu | 1 | 3 | —SO$_3$Na | —SO$_2$NHC$_2$H$_4$SO$_3$Na |
| 343 | Cu | 1 | 3 | —SO$_3$Li | —SO$_2$NHC$_2$H$_4$SO$_3$Li |
| 344 | Cu | 1 | 3 | —SO$_3$NH$_4$ | —SO$_2$NHC$_2$H$_4$SO$_3$NH$_4$ |
| 345 | Cu | 3 | 1 | —SO$_2$NH$_2$ | —SO$_3$NH$_4$ |
| 346 | Cu | 1 | 3 | —COOH | —CON(C$_6$H$_5$)$_2$ |

TABLE 14-continued

| CP* No. | M₁ | a | a' | X | X' |
|---|---|---|---|---|---|
| 347 | Cu | 1 | 3 | —COOK | —CON($C_6H_5$)$_2$ |
| 348 | Cu | 1 | 3 | —COOLi | —CON($C_{16}H_{33}$)$_2$ |
| 349 | Cu | 3 | 1 | —COONH$_4$ | —COOH |
| 350 | Cu | 3 | 1 | —CONH$_2$ | —COONH$_4$ |
| 351 | Cu | 3 | 1 | —CON($C_6H_5$)$_2$ | —COONH$_2$($C_6H_5$)$_2$ |
| 352 | Cu | 3 | 1 | —CON($C_{16}H_{33}$)$_2$ | —COONH$_2$($C_{16}H_{33}$)$_2$ |
| 353 | Cu | 3 | 1 | —CONH—(benzimidazolone) | —COOH |
| 354 | Cu | 3 | 1 | —COOCH$_3$ | —COOH |
| 355 | Cu | 3 | 1 | —COOC$_6$H$_5$ | —COOH |
| 356 | Cu | 3 | 1 | —COOC$_{10}$H$_{21}$ | —COOH |
| 357 | Cu | 3 | 1 | —SOC$_3$H$_7$ | —SOC$_3$H$_6$SO$_3$Li |
| 358 | Si | 3 | 1 | —SO(t)C$_4$H$_9$ | —SOC$_3$H$_6$SO$_3$Li |
| 359 | Fe | 3 | 1 | —SOC$_6$H$_5$ | —SOC$_3$H$_6$SO$_3$Li |
| 360 | Cu | 3 | 1 | —SOC$_3$H$_6$SO$_3$Li | —SO$_2$NH$_2$ |

CP* No.: Compound No.

TABLE 15

| CP* No. | M₁ | a | a' | X | X' |
|---|---|---|---|---|---|
| 361 | Cu | 3 | 1 | —SO$_2$C$_2$H$_5$ | —SO$_2$C$_6$H$_5$ |
| 362 | Cu | 3 | 1 | —SO$_{2(t)}$C$_4$H$_9$ | —SO$_2$C$_6$H$_5$ |
| 363 | Cu | 3 | 1 | —SO$_2$C$_6$H$_5$ | —SO$_2$C$_3$H$_6$SO$_3$Li |
| 364 | Cu | 3 | 1 | —SO$_2$C$_3$H$_6$SO$_2$NHCH$_2$CH(OH)CH$_3$ | —SO$_2$C$_3$H$_6$SO$_3$Li |
| 365 | Cu | 2 | 2 | —SO$_2$C$_3$H$_6$SO$_2$NHCH$_2$CH(OH)CH$_3$ | —SO$_2$C$_3$H$_6$SO$_3$Li |
| 366 | Cu | 1 | 3 | —SO$_2$C$_3$H$_6$SO$_2$NHCH$_2$CH(OH)CH$_3$ | —SO$_2$C$_3$H$_6$SO$_3$Li |
| 367 | Cu | 3 | 1 | —SO$_2$C$_{16}$H$_{33}$ | —SO$_2$C$_6$H$_5$ |
| 368 | Cu | 3 | 1 | —SO$_2$C$_3$H$_6$SO$_2$N(C$_{16}$H$_{33}$)$_2$ | —SO$_2$C$_3$H$_6$SO$_3$NH$_2$(C$_{16}$H$_{33}$)$_2$ |
| 369 | Cu | 3 | 1 | —SO$_2$C$_3$H$_6$SO$_2$NH—(benzimidazole) | —SO$_2$NH$_2$ |
| 370 | Cu | 3 | 1 | —SO$_2$C$_3$H$_6$SO$_2$NH—(benzimidazolone) | —SO$_2$NH$_2$ |
| 371 | Cu | 3 | 1 | —SO$_2$NHC$_3$H$_6$ | —SO$_2$NH$_2$ |
| 372 | Cu | 3 | 1 | —SO$_2$NH(t)C$_4$H$_9$ | —SO$_2$NH$_2$ |
| 373 | Cu | 3 | 1 | —SO$_2$NHC$_6$H$_5$ | —SO$_2$NH$_2$ |
| 374 | Cu | 3 | 1 | —SO$_2$NHC$_2$H$_4$SO$_3$Li | —SO$_2$NH$_2$ |
| 375 | Cu | 3 | 1 | —SO$_2$NHC$_2$H$_4$SO$_2$NH—(benzimidazole) | —SO$_2$NH$_2$ |
| 376 | Cu | 3 | 1 | —SO$_2$NH—(benzimidazolone) | —SO$_2$NH$_2$ |
| 377 | Cu | 2 | 2 | —SO$_2$C$_3$H$_6$SO$_2$NH—(benzimidazolone) | —SO$_2$NH$_2$ |

TABLE 15-continued

| CP* No. | M₁ | a | a' | X | X' |
|---|---|---|---|---|---|
| 378 | Cu | 3 | 1 | —SO₂O(C₂H₄COO)₁₀C₈H₁₇ | —SO₃H |
| 379 | Fe | 3 | 1 | —SO₂OC₆H₅ | —SO₃H |
| 380 | Cu | 3 | 1 | —SO₂OC₃H₆SO₂NHCH₂CH(OH)CH₃ | —SO₃H |

CP* No.: Compound No.

TABLE 16

| CP* No. | M₁ | a | a' | a" | X | X' | X" |
|---|---|---|---|---|---|---|---|
| 381 | Cu | 1 | 2 | 1 | —SO₃NH₄ | —SO₂NHC₂H₄SO₃H | —SO₂NH₂ |
| 382 | Cu | 1 | 2 | 1 | —SO₃NH₄ | —SO₂NHC₂H₄SO₃Na | —SO₂NH₂ |
| 383 | Cu | 1 | 2 | 1 | —SO₃NH₄ | —SO₂NHC₂H₄SO₃Li | —SO₂NH₂ |
| 384 | Cu | 1 | 2 | 1 | —SO₃NH₄ | —SO₂NHC₂H₄SO₃NH₄ | —SO₂NH₂ |
| 385 | Cu | 1 | 2 | 1 | —SO₃NH₄ | —SO₂NHC₆H₅ | —SO₂NH₂ |
| 386 | Cu | 1 | 2 | 1 | —COONH₄ | —CONHC₆H₅ | —CONH₂ |
| 387 | Cu | 1 | 2 | 1 | —COONH₄ | —CON(CH₃)C₆H₅ | —CONH₂ |
| 388 | Cu | 1 | 2 | 1 | —COONH₄ | —CON(C₆H₅)₂ | —CONH₂ |
| 389 | Cu | 1 | 2 | 1 | —COONH₄ | —CONHC₁₆H₃₃ | —CONH₂ |
| 390 | Cu | 1 | 2 | 1 | —COONH₄ | —CON(C₁₆H₃₃)₂ | —CONH₂ |

CP* No.: Compound No.

TABLE 17

| CP* No. | M₁ | a | a' | a" | X | X' | X" |
|---|---|---|---|---|---|---|---|
| 391 | Cu | 2 | 1 | 1 | —CON(C₆H₅)₂ | —COONH₂(C₆H₅)₂ | —COOH |
| 392 | Cu | 2 | 1 | 1 | —CON(C₁₆H₃₃)₂ | —COONH₂(C₁₆H₃₃)₂ | —COOH |
| 393 | Cu | 2 | 1 | 1 | —CONH—(benzimidazolone) | —COONH₄ | —COOH |
| 394 | Cu | 2 | 1 | 1 | —COOCH₃ | —CONH₂ | —COOH |
| 395 | Cu | 2 | 1 | 1 | —COOC₆H₅ | —CONH₂ | —COOH |
| 396 | Cu | 2 | 1 | 1 | —COOC₁₀H₂₁ | —CONH₂ | —COOH |
| 397 | Cu | 2 | 1 | 1 | —SOC₃H₇ | —SOC₃H₆SO₃Li | —SO₃H |
| 398 | Cu | 2 | 1 | 1 | —SO(t)C₄H₉ | —SOC₃H₆SO₃Li | —SO₃H |
| 399 | Cu | 2 | 1 | 1 | —SOC₆H₅ | —SOC₃H₆SO₃Li | —SO₃H |
| 400 | Cu | 2 | 1 | 1 | —SOC₃H₆SO₃Li | —SO₂NH₂ | —SO₃H |

CP* No.: Compound No.

TABLE 18

| CP* No. | M₁ | a | a' | a" | X | X' | X" |
|---|---|---|---|---|---|---|---|
| 401 | Cu | 2 | 1 | 1 | —SO₂C₂H₅ | —SO₂C₆H₅ | —SO₃H |
| 402 | Cu | 2 | 1 | 1 | —SO₂(t)C₄H₉ | —SO₂C₆H₅ | —SO₃H |
| 403 | Cu | 2 | 1 | 1 | —SO₂C₆H₅ | —SO₂C₃H₆SO₃Li | —SO₃H |
| 404 | Cu | 2 | 1 | 1 | —SO₂C₃H₆SO₂Li | —SO₂C₃H₆SO₃H | —SO₃H |
| 405 | Cu | 2 | 1 | 1 | —SO₂C₃H₆SO₂NH₂ | —SO₂C₃H₆SO₃NH₄ | —SO₃NH₄ |
| 406 | Cu | 2 | 1 | 1 | —SO₂C₃H₆SO₂NHCH₂CH(OH)CH₃ | —SO₂C₃H₆SO₃Li | —SO₃H |
| 407 | Cu | 2 | 1 | 1 | —SO₂C₁₆H₃₃—SO₂C₆H₅ | —SO₂C₁₆H₃₃ | —SO₃H |
| 408 | Cu | 2 | 1 | 1 | —SO₂C₃H₆SO₂N(C₁₆H₃₃)₂ | —SO₂C₃H₆SO₃N(C₁₆H₃₃)₂ | —SO₂NH₂ |
| 409 | Cu | 2 | 1 | 1 | —SO₂C₃H₆SO₂NH—(benzimidazole) | —SO₂NH₂ | —SO₃H |
| 410 | Cu | 2 | 1 | 1 | —SO₂C₃H₆SO₂NH—(benzimidazolone) | —SO₂NH₂ | —SO₃H |

CP* No.: Compound No.

TABLE 19

| CP* No. | M₁ | a | a' | a" | X | X' | X" |
|---|---|---|---|---|---|---|---|
| 411 | Cu | 2 | 1 | 1 | —SO₃NH₄ | —SO₂NH₂ | —SO₃H |
| 412 | Cu | 2 | 1 | 1 | —SO₂NH(t)C₄H₉ | —SO₂NH₂ | —SO₃H |
| 413 | Cu | 2 | 1 | 1 | —SO₂NHC₆H₅ | —SO₂NH₂ | —SO₃H |
| 414 | Cu | 2 | 1 | 1 | —SO₂NHC₂H₄SO₃Li | —SO₂NH₂ | —SO₃H |
| 415 | Cu | 2 | 1 | 1 | —SO₂NHC₂H₄SO₂NH-(benzimidazole) | —SO₂NH₂ | —SO₃H |
| 416 | Cu | 2 | 1 | 1 | —SO₂NH-(benzimidazol-2-one) | —SO₂NH₂ | —SO₃H |
| 417 | Cu | 2 | 1 | 1 | —SO₂C₃H₆SO₂NH-(benzimidazol-2-one) | —SO₂NH₂ | —SO₃H |
| 418 | Cu | 2 | 1 | 1 | —SO₂O(C₂H₄COO)₁₀C₈H₁₇ | —SO₃H | —SO₂NH₂ |
| 419 | Cu | 2 | 1 | 1 | —SO₂OC₆H₅ | —SO₃H | —SO₃NH₄ |
| 420 | Cu | 2 | 1 | 1 | —SO₂OC₃H₆SO₂NHCH₂CH(OH)CH₃ | —SO₃H | —SO₃NH₄ |

CP* No.: Compound No.

TABLE 20

| CP* No. | M₁ | a | a' | a" | a''' | X | X' | X" | X''' |
|---|---|---|---|---|---|---|---|---|---|
| 421 | Cu | 1 | 2 | 1 | 1 | —SO₃NH₄ | —SO₂NHC₆ClH₄ | —SO₂NH₂ | —SO₃H |
| 422 | Cu | 1 | 2 | 1 | 1 | —SO₃NH₄ | —SO₂NHC₂H₄OC₂H₄SO₃NH₄ | —SO₂NH₂ | —SO₃H |
| 423 | Cu | 1 | 2 | 1 | 1 | —SO₃NH₄ | —SO₂O(C₂H₄O)₁₀C₂H₄OH | —SO₂NH₂ | —SO₃H |
| 424 | Cu | 1 | 2 | 1 | 1 | —SO₃NH₄ | —SO₂O(C₂H₄COO)₁₀H | —SO₂NH₂ | —SO₃H |
| 425 | Cu | 1 | 2 | 1 | 1 | —SO₃NH₄ | —SO₂NH(C₂H₄CONH)₁₀H | —SO₂NH₂ | —SO₃H |
| 426 | Cu | 1 | 2 | 1 | 1 | —COONH₄ | —CONH(C₂H₄CONH)₁₀H | —CONH₂ | —COOH |
| 427 | Cu | 1 | 2 | 1 | 1 | —COONH₄ | —CONH(C₂H₄O)₁₀H | —CONH₂ | —COOH |
| 428 | Cu | 1 | 2 | 1 | 1 | —COONH₄ | —CON(C₆H₅)₂ | —CONH₂ | —COOH |
| 429 | Cu | 1 | 2 | 1 | 1 | —COONH₄ | —CONHC₁₆H₃₃ | —CONH₂ | —COOH |
| 430 | Cu | 1 | 2 | 1 | 1 | —COONH₄ | —CON(C₁₆H₃₃)₂ | —CONH₂ | —COOH |

CP* No.: Compound No.

TABLE 21

| CP* No. | M₁ | a | a' | a" | a''' | X | X' | X" | X''' |
|---|---|---|---|---|---|---|---|---|---|
| 431 | Cu | 1 | 1 | 1 | 1 | —CONHC₆H₅ | —COONH₃C₆H₅ | —CONH₂ | —COONH₄ |
| 432 | Cu | 1 | 1 | 1 | 1 | —CON(C₁₆H₃₃)₂ | —COONH₂(C₁₆H₃₃)₂ | —CONH₂ | —COONH₄ |
| 433 | Cu | 1 | 1 | 1 | 1 | —CONH(C₂H₄O)₁₀H | —COONH₂(C₂H₄O)₁₀H | —CONH₄ | —COOH |
| 434 | Cu | 1 | 1 | 1 | 1 | —CONH-(benzimidazol-2-one) | —CONH(C₂H₄O)₁₀H | —CONH₄ | —COOH |
| 435 | Cu | 1 | 1 | 1 | 1 | —COOC₆H₅ | —CONH₂ | —COONH₄ | —COOH |
| 436 | Cu | 1 | 1 | 1 | 1 | —CO(OC₂H₄)₁₀OH | —CONH₂ | —COONH₄ | —COOH |
| 437 | Cu | 1 | 1 | 1 | 1 | —CO(OC₂H₄CO)₁₀ONH₄ | —CONH₂ | —COONH₄ | —COOH |
| 438 | Cu | 1 | 1 | 1 | 1 | —SO₂O(C₂H₄COO)₁₀ | —SOC₃H₆SO₃Li | —SO₃NH₄ | —COOH |
| 439 | Cu | 1 | 1 | 1 | 1 | —SOC₆H₅ | —SOC₃H₆SO₃Li | —SO₃NH₄ | —SO₃H |
| 440 | Cu | 1 | 1 | 1 | 1 | —SOC₃H₆SO₃Li | —SO₂NH₂ | —SO₃NH₄ | —SO₃H |

CP* No.: Compound No.

TABLE 22

| CP* No. | $M_1$ | a | a' | a" | a''' | X | X' | X" | X''' |
|---|---|---|---|---|---|---|---|---|---|
| 441 | Cu | 1 | 1 | 1 | 1 | $-SO_2(C_2H_4O)_{10}H$ | $-SO_2C_6H_5$ | $-SO_3NH_4$ | $-SO_3H$ |
| 442 | Cu | 1 | 1 | 1 | 1 | $-SO_2(C_2H_4OCO)_{10}ONH_4$ | $-SO_2C_6H_5$ | $-SO_3NH_4$ | $-SO_3H$ |
| 443 | Cu | 1 | 1 | 1 | 1 | $-SO_2C_6H_5$ | $-SO_2C_3H_6SO_3NH_4$ | $-SO_3NH_4$ | $-SO_3H$ |
| 444 | Cu | 1 | 1 | 1 | 1 | $-SO_2(C_2H_4O)_{10}H$ | $-SO_2C_3H_6SO_3Li$ | $-SO_3Li$ | $-SO_3H$ |
| 445 | Cu | 1 | 1 | 1 | 1 | $-SO_2(C_2H_4OCO)_{10}ONH_4$ | $-SO_2C_3H_6SO_3NH_4$ | $-SO_3NH_4$ | $-SO_3NH_4$ |
| 446 | Cu | 1 | 1 | 1 | 1 | $-SO_2C_3H_6SO_2NHCH_2CH(OH)CH_3$ | $-SO_2(C_2H_4O)_{10}H$ | $-SO_3NH_4$ | $-SO_3H$ |
| 447 | Cu | 1 | 1 | 1 | 1 | $-SO_2C_6H_5$ | $-SO_2C_{16}H_{33}$ | $-SO_3NH_4$ | $-SO_3H$ |
| 448 | Cu | 1 | 1 | 1 | 1 | $-SO_2C_3H_6SO_2N(C_{16}H_{33})_2$ | $-SO_2(C_2H_4O)_{10}H$ | $-SO_2NH_4$ | $-SO_3H$ |
| 449 | Cu | 1 | 1 | 1 | 1 | 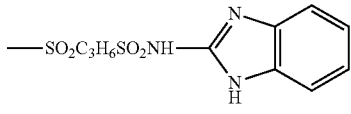 | $-SO_2(C_2H_4O)_{10}H$ | $-SO_3NH_4$ | $-SO_3H$ |
| 450 | Cu | 1 | 1 | 1 | 1 | 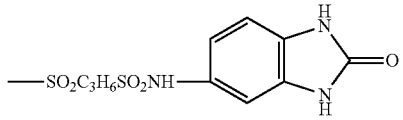 | $-SO_2(C_2H_4O)_{10}H$ | $-SO_2NH_2$ | $-SO_3H$ |

CP* No.: Compound No.

TABLE 23

| CP* No. | $M_1$ | a | a' | a" | a''' | X | X' | X" | X''' |
|---|---|---|---|---|---|---|---|---|---|
| 451 | Cu | 1 | 1 | 1 | 1 | $-SO_2(NHC_2H_4)_3NHC_2H_5$ | $-SO_2NHC_2H_5$ | $-SO_2NH_2$ | $-SO_3H$ |
| 452 | Cu | 1 | 1 | 1 | 1 | $-SO_2(N(CH_3)C_2H_4)_3N(C_2H_5)_2$ | $-SO_2N(C_2H_5)_2$ | $-SO_2NH_2$ | $-SO_3H$ |
| 453 | Cu | 2 | 1 | 1 | 1 | $-SO_2(NHC_2H_4)_3NHC_6H_5$ | $-SO_2NHC_6H_5$ | $-SO_2NH_2$ | $-SO_3H$ |
| 454 | Cu | 2 | 1 | 1 | 1 | $-SO_2(NHC_2H_4)_3NHC_2H_5$ | $-SO_2NHC_2H_4SO_3NH_4$ | $-SO_2NH_2$ | $-SO_3H$ |
| 455 | Cu | 1 | 1 | 1 | 1 | 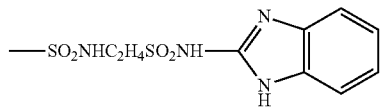 | $-SO_2NHC_2H_4SO_3NH_4$ | $-SO_2NH_2$ | $-SO_3H$ |
| 456 | Cu | 1 | 1 | 1 | 1 | 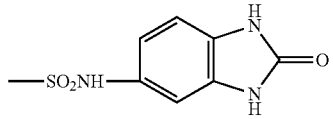 | $-SO_2NHC_2H_4SO_3NH_4$ | $-SO_2NH_2$ | $-SO_3H$ |
| 457 | Cu | 1 | 1 | 1 | 1 | 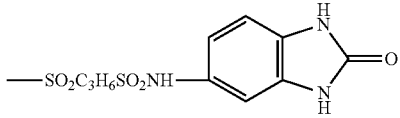 | $-SO_2NHC_2H_4SO_3NH_4$ | $-SO_2NH_2$ | $-SO_3H$ |
| 458 | Cu | 1 | 1 | 1 | 1 | $-SO_2(OC_2H_4)_{10}OC_2H_4$ | $-SO_2OC_6H_5$ | $-SO_3H$ | $-SO_3NH_4$ |
| 459 | Cu | 1 | 1 | 1 | 1 | $-SO_2(OC_2H_4CO)_{10}ONH_4$ | $-SO_2OC_6H_5$ | $-SO_3H$ | $-SO_3NH_4$ |
| 460 | Cu | 2 | 1 | 1 | 1 | $-SO_2OC_3H_6SO_2NH(C_2H_4O)_{10}H$ | $-SO_2NHC_2H_4SO_3NH_4$ | $-SO_3H$ | $-SO_3NH_4$ |

CP* No.: Compound No.

TABLE 24

| CP* No. | $M_1$ | a | a' | a" | b | X | X' | X" | Y |
|---|---|---|---|---|---|---|---|---|---|
| 461 | Cu | 1 | 2 | 1 | 4 | $-SO_3NH_4$ | $-SO_2NHC_2H_4SO_3H$ | $-SO_2NH_2$ | $-Cl$ |
| 462 | Cu | 1 | 2 | 1 | 2 | $-SO_3NH_4$ | $-SO_2NHC_2H_4SO_3Na$ | $-SO_2NH_2$ | $-CN$ |
| 463 | Cu | 1 | 2 | 1 | 4 | $-SO_3NH_4$ | $-SO_2NHC_2H_4SO_3Li$ | $-SO_2NH_2$ | $-Cl$ |
| 464 | Cu | 1 | 2 | 1 | 4 | $-SO_3NH_4$ | $-SO_2NHC_2H_4SO_3NH_4$ | $-SO_2NH_2$ | $-Cl$ |
| 465 | Cu | 1 | 2 | 1 | 4 | $-SO_3NH_4$ | $-SO_2NHC_5H_6$ | $-SO_2NH_2$ | $-Cl$ |
| 466 | Cu | 1 | 2 | 1 | 2 | $-COONH_4$ | $-CONHC_6H_5$ | $-CONH_2$ | $-CN$ |
| 467 | Cu | 1 | 2 | 1 | 2 | $-COONH_4$ | $-CON(CH_3)C_6H_5$ | $-CONH_2$ | $-CN$ |
| 468 | Cu | 1 | 2 | 1 | 4 | $-COONH_4$ | $-CON(C_6H_5)_2$ | $-CONH_2$ | $-CN$ |
| 469 | Cu | 1 | 2 | 1 | 4 | $-COONH_4$ | $-CONHC_{16}H_{33}$ | $-CONH_2$ | $-CN$ |
| 470 | Cu | 1 | 2 | 1 | 4 | $-COONH_4$ | $-CON(C_{16}H_{33})_2$ | $-CONH_2$ | $-CN$ |

CP* No.: Compound No.

TABLE 25

| CP* No. | M₁ | a | a' | a" | b | X | X' | X" | Y |
|---|---|---|---|---|---|---|---|---|---|
| 471 | Cu | 2 | 1 | 1 | 4 | —CON($C_6H_5$)$_2$ | —COONH$_2$($C_6H_5$)$_2$ | —COOH | —NHC$_6$H$_5$ |
| 472 | Cu | 2 | 1 | 1 | 4 | —CON($C_{16}H_{33}$)$_2$ | —COONH$_2$($C_{16}H_{33}$)$_2$ | —COOH | —N($C_{16}H_{33}$)$_2$ |
| 473 | Cu | 2 | 1 | 1 | 4 | —CONH-(benzimidazol-2-one) | —COONH$_4$ | —COOH | —Cl |
| 474 | Cu | 2 | 1 | 1 | 4 | —COOCH$_3$ | —CONH$_2$ | —COOH | —Cl |
| 475 | Cu | 2 | 1 | 1 | 3 | —COOC$_6$H$_5$ | —CONH$_2$ | —COOH | —OC$_6$H$_5$ |
| 476 | Cu | 2 | 1 | 1 | 4 | —COOC$_{10}$H$_{21}$ | —CONH$_2$ | —COOH | —CN |
| 477 | Cu | 2 | 1 | 1 | 4 | —SOC$_3$H$_7$ | —SOC$_3$H$_6$SO$_3$Li | —SO$_3$H | —OH |
| 478 | Cu | 2 | 1 | 1 | 4 | —SO$_2$(OC$_2$H$_4$)$_{10}$OC$_2$H$_4$ | —SOC$_3$H$_6$SO$_3$Li | —SO$_3$H | —OH |
| 479 | Cu | 2 | 1 | 1 | 4 | —SOC$_6$H$_5$ | —SOC$_3$H$_6$SO$_3$Li | —SO$_3$H | —OH |
| 480 | Cu | 2 | 1 | 1 | 4 | —SOC$_3$H$_6$SO$_3$Li | —SO$_2$NH$_2$ | —SO$_3$H | —OH |

CP* No.: Compound No.

TABLE 26

| CP* No. | M₁ | a | a' | a" | b | X | X' | X" | Y |
|---|---|---|---|---|---|---|---|---|---|
| 481 | Cu | 2 | 1 | 1 | 4 | —SO$_2$C$_6$H$_5$ | —SO$_2$C$_6$H$_5$ | —SO$_3$H | —OH |
| 482 | Cu | 2 | 1 | 1 | 4 | —SO$_2$(t)C$_4$H$_9$ | —SO$_2$C$_6$H$_5$ | —SO$_3$H | —OH |
| 483 | Cu | 2 | 1 | 1 | 4 | —SO$_2$C$_6$H$_5$ | —SO$_2$C$_3$H$_5$SO$_3$Li | —SO$_3$H | —OC$_6$H$_5$ |
| 484 | Cu | 2 | 1 | 1 | 4 | —SO$_2$C$_3$H$_6$SO$_3$Li | —SO$_2$C$_3$H$_6$SO$_3$H | —SO$_3$H | —Cl |
| 485 | Cu | 2 | 1 | 1 | 4 | —SO$_2$C$_3$H$_6$SO$_3$NH$_2$ | —SO$_2$C$_3$H$_6$SO$_3$NH$_4$ | —SO$_3$NH$_4$ | —OH |
| 486 | Cu | 2 | 1 | 1 | 4 | —SO$_2$C$_3$H$_6$SO$_2$NHCH$_2$CH(OH)CH$_3$ | —SO$_2$C$_3$H$_5$SO$_3$Li | —SO$_3$H | —OH |
| 487 | Cu | 2 | 1 | 1 | 4 | —SO$_2$C$_{16}$H$_{33}$ | —SO$_2$C$_3$H$_5$SO$_3$Li | —SO$_3$H | —CN |
| 488 | Cu | 2 | 1 | 1 | 4 | —SO$_2$C$_3$H$_6$SO$_2$N(C$_{16}$H$_{33}$)$_2$ | —SO$_2$C$_3$H$_6$SO$_3$NH$_2$(C$_{16}$H$_{33}$)$_2$ | —SO$_2$NH$_2$ | —CN |
| 489 | Cu | 2 | 1 | 1 | 4 | —SO$_2$C$_3$H$_6$SO$_2$NH-(benzimidazole) | —SO$_2$NH$_2$ | —SO$_3$H | —Cl |
| 490 | Cu | 2 | 1 | 1 | 4 | —SO$_2$C$_3$H$_6$SO$_2$NH-(benzimidazol-2-one) | —SO$_2$NH$_2$ | —SO$_3$H | —Cl |

CP* No.: Compound No.

TABLE 27

| CP* No. | M₁ | a | a' | a" | b | X | X' | X" | Y |
|---|---|---|---|---|---|---|---|---|---|
| 491 | Cu | 2 | 1 | 1 | 4 | —SO$_2$NHC$_3$H$_6$ | —SO$_2$NH$_2$ | —SO$_3$H | —Cl |
| 492 | Cu | 2 | 1 | 1 | 2 | —SO$_2$NH(t)C$_4$H$_9$ | —SO$_2$NH$_2$ | —SO$_3$H | —CN |
| 493 | Cu | 2 | 1 | 1 | 2 | —SO$_2$NHC$_6$H$_5$ | —SO$_2$NH$_2$ | —SO$_3$H | —CN |
| 494 | Cu | 2 | 1 | 1 | 2 | —SO$_2$NHC$_2$H$_4$SO$_3$Li | —SO$_2$NH$_2$ | —SO$_3$H | —CN |
| 495 | Cu | 2 | 1 | 1 | 2 | —SO$_2$NHC$_2$H$_4$SO$_2$NH-(benzimidazole) | —SO$_2$NH$_2$ | —SO$_3$H | —CN |
| 496 | Cu | 2 | 1 | 1 | 2 | —SO$_2$NH-(benzimidazol-2-one) | —SO$_2$NH$_2$ | —SO$_3$H | —CN |

TABLE 27-continued

| CP* No. | $M_1$ | a | a' | a'' | b | X | X' | X'' | Y |
|---|---|---|---|---|---|---|---|---|---|
| 497 | Cu | 2 | 1 | 1 | 2 | 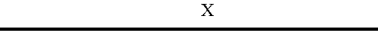 | —SO$_2$NH$_2$ | —SO$_3$H | —CN |
| 498 | Cu | 2 | 1 | 1 | 2 | —SO$_2$O(t)C$_4$H$_9$ | —SO$_3$H | —SO$_3$NH$_4$ | —CN |
| 499 | Cu | 2 | 1 | 1 | 2 | —SO$_2$OC$_6$H$_5$ | —SO$_3$H | —SO$_3$NH$_4$ | —CN |
| 500 | Cu | 2 | 1 | 1 | 2 | —SO$_2$OC$_3$H$_6$SO$_2$NHCH$_2$CH(OH)CH$_3$ | —SO$_3$H | —SO$_3$NH$_4$ | —CN |

CP* No.: Compound No.

Next, specific examples of the compound represented by Formula (II) in the invention are shown below, but the invention is not limited to them.

TABLE 28

| CP* No. | | $M_2$ |
|---|---|---|
| 501 | 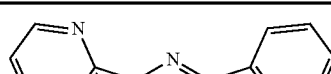 | Cu |
| 502 | | Fe |
| 503 | | Sn |
| 504 | | Co |
| 505 | | Zn |
| 506 | | Ni |

TABLE 28-continued

| CP* No. | Structure | M₂ |
|---|---|---|
| 507 | | Cu |
| 508 | | Fe |
| 509 | | Sn |
| 510 | | Co |
| 511 | | Zn |
| 512 | | Ni |
| 513 | | Cu |
| 514 | | Fe |

TABLE 28-continued
| CP* No. | | M₂ |
|---|---|---|
| 515 | 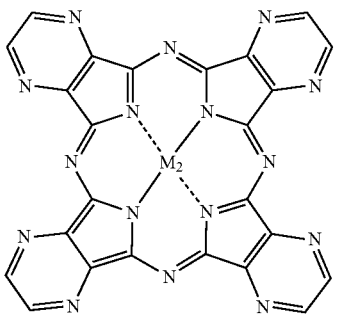 | Sn |
| 516 | | Co |
CP* No.: Compound No.
TABLE 29
| CP* No. | | M₂ |
|---|---|---|
| 517 | 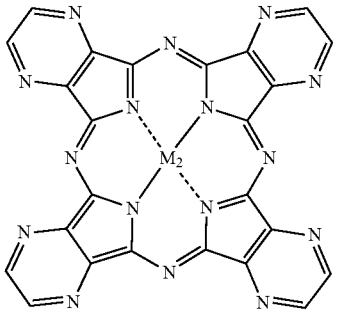 | Zn |
| 518 | | Ni |
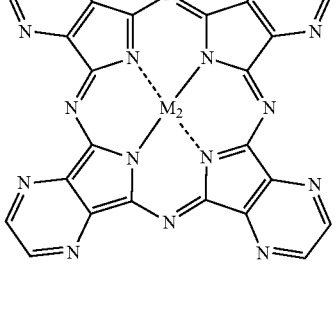
TABLE 29-continued
| CP* No. | | M₂ |
|---|---|---|
| 519 | 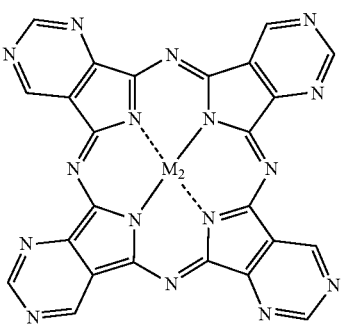 | Cu |
| 520 | 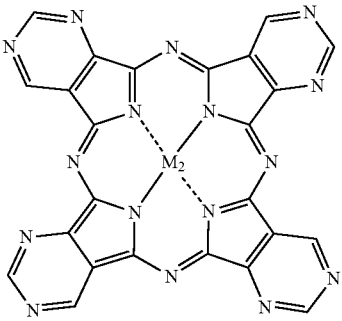 | Fe |
| 521 | 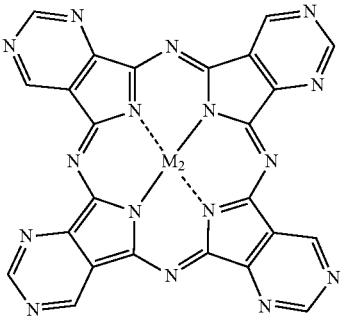 | Sn |
| 522 | 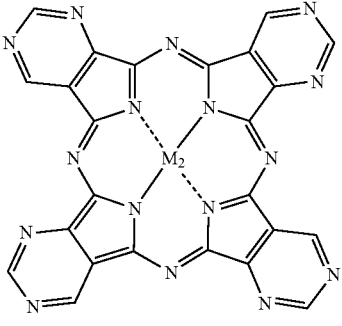 | Co |

TABLE 29-continued
| CP* No. | | M₂ |
|---|---|---|
| 523 | 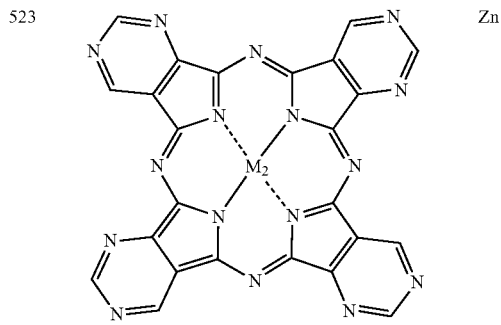 | Zn |
| 524 | 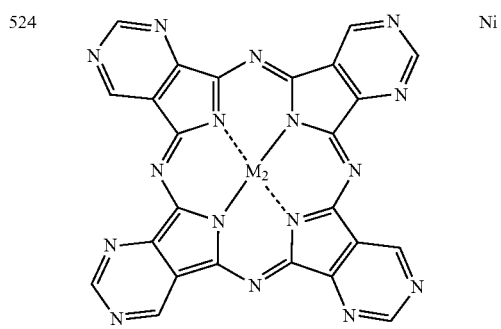 | Ni |
| 525 | 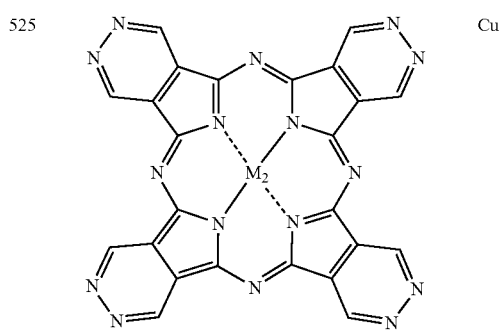 | Cu |
| 526 | 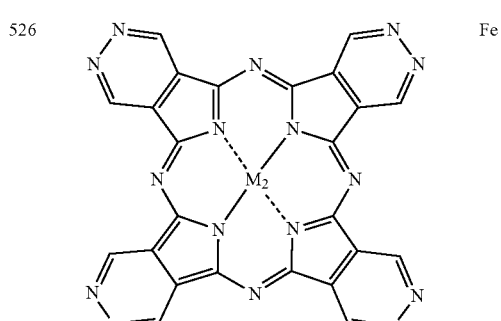 | Fe |
TABLE 29-continued
| CP* No. | | M₂ |
|---|---|---|
| 527 | 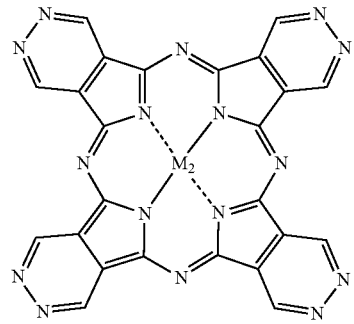 | Sn |
| 528 | 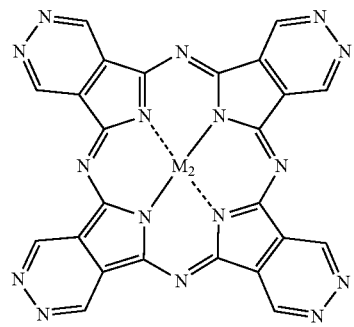 | Co |
| 529 | 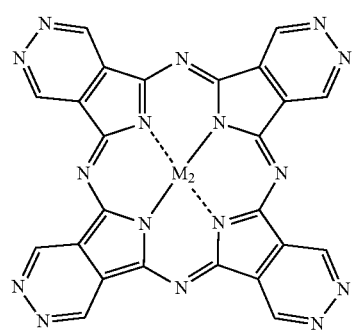 | Zn |
| 530 | 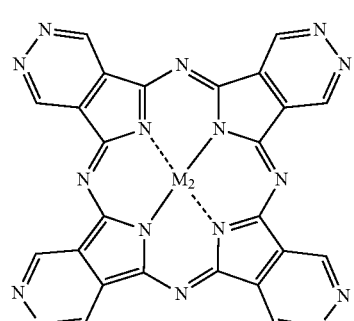 | Ni |

TABLE 29-continued

| CP* No. | Structure | M₂ |
|---|---|---|
| 531 | [structure] | Cu |
| 532 | [structure] | Co |

CP* No.: Compound No.

TABLE 30

| CP* No. | Structure | M₂ |
|---|---|---|
| 533 | [structure] | Fe |
| 534 | [structure] | Si |
| 535 | [structure with C₁₆H₃₃ groups] | Cu |
| 536 | [structure with C₁₆H₃₃ groups] | Co |
| 537 | [structure with C₁₆H₃₃ groups] | Fe |

TABLE 30-continued

| CP* No. | | M₂ |
|---|---|---|
| 538 | [structure] | Si |
| 539 | [structure] | Cu |
| 540 | [structure] | Fe |
| 541 | [structure] | Si |
| 542 | [structure] | Ni |
| 543 | [structure] | Si |
| 544 | [structure] | Fe |
| 545 | [structure] | Ni |

TABLE 30-continued
| CP* No. | | M₂ |
|---|---|---|
| 546 | 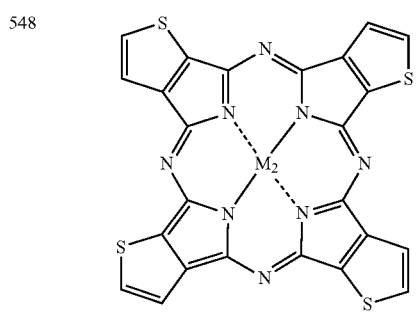 | Cu |
CP* No.: Compound No.
TABLE 31
| CP* No. | | M₂ |
|---|---|---|
| 547 | 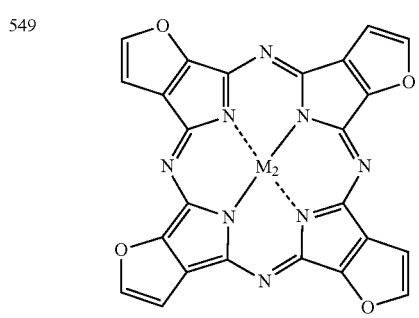 | Cu |
| 548 | | Fe |
| 549 | | Cu |
TABLE 31-continued
| CP* No. | | M₂ |
|---|---|---|
| 550 | 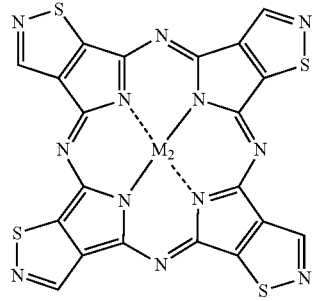 | Cu |
| 551 | 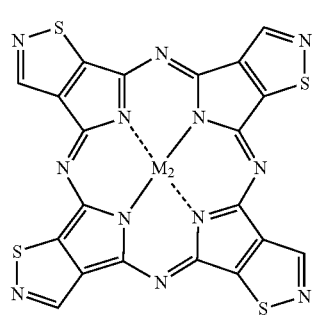 | Fe |
| 552 | 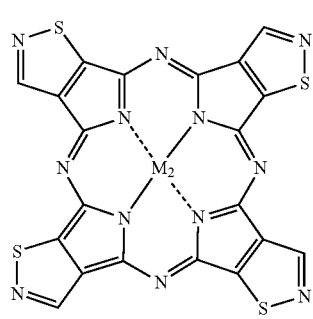 | Si |
| 553 | 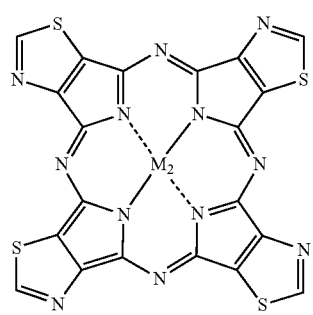 | Cu |
| 554 | 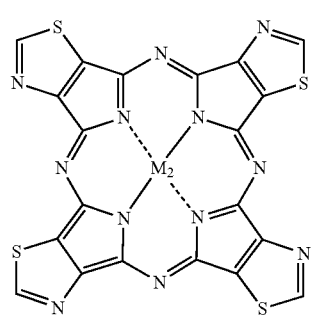 | Fe |

TABLE 31-continued

| CP* No. | Structure | M₂ |
|---|---|---|
| 555 | | Si |
| 556 | | Fe |
| 557 | | Cu |
| 558 | | Cu |
| 559 | | Fe |
| 560 | | Cu |
| 561 | | Si |
| 562 | | Si |

CP* No.: Compound No.

TABLE 32

| CP* No. | | M₂ |
|---|---|---|
| 563 | [structure] | Cu |
| 564 | [structure] | Fe |
| 565 | [structure] | Si |
| 566 | [structure] | Co |

TABLE 32-continued

| CP* No. | | M₂ |
|---|---|---|
| 567 | | Cu |
| 568 | | Fe |
| 569 | | Cu |
| 570 | | Ni |

TABLE 32-continued
| CP* No. | | $M_2$ |
|---|---|---|
| 571 | 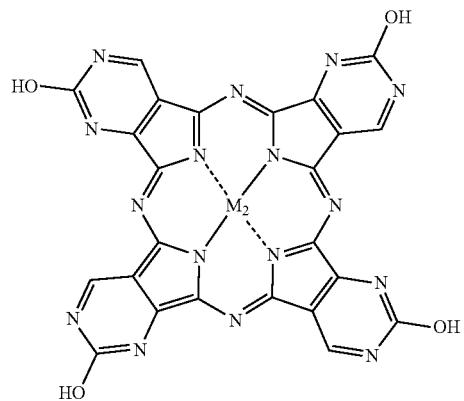 | Cu |
| 572 | 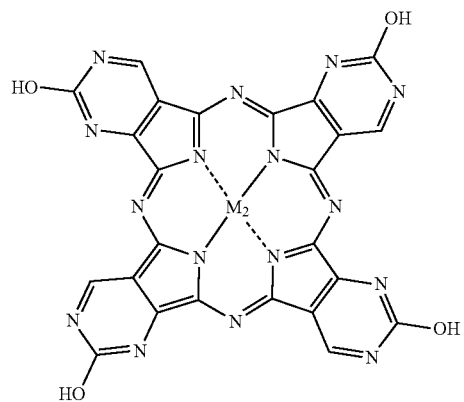 | Fe |
| 573 | 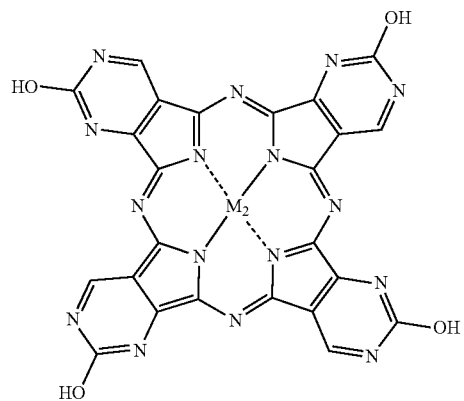 | Si |

TABLE 32-continued
| CP* No. | | M₂ |
|---|---|---|
| 574 | NaO₃S(H₂C)₃ | Cu |
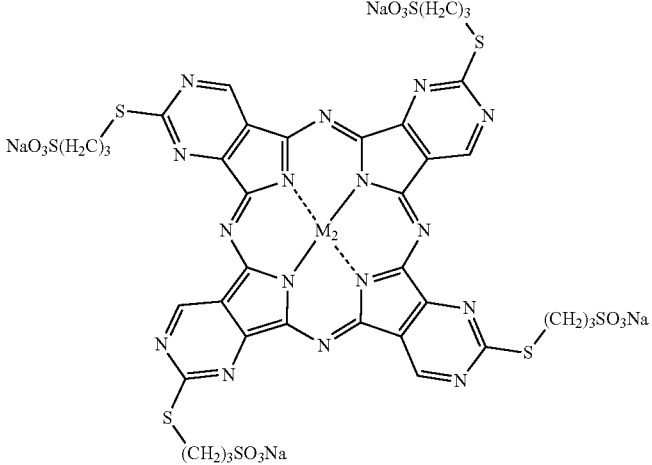
| 575 | NaO₃S(H₂C)₃ | Fe |
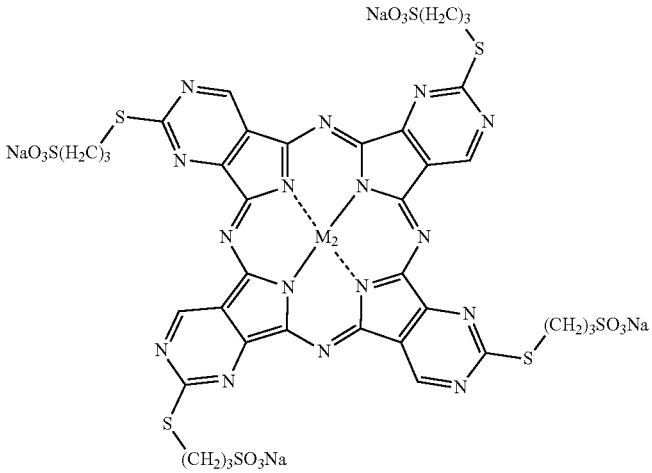
| 576 | | Cu |
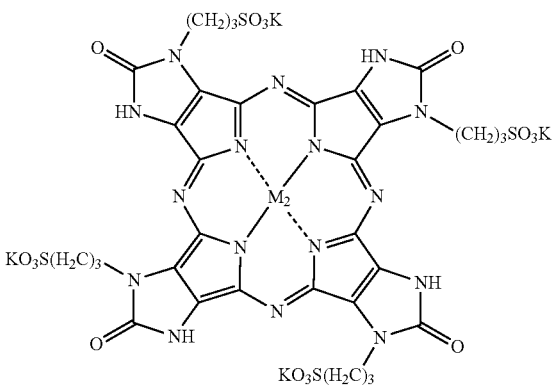
CP* No.: Compound No.

TABLE 33
| CP* No. | | M₂ |
|---|---|---|
| 577 | | Fe |
| 578 | | Cu |
| 579 | | Si |
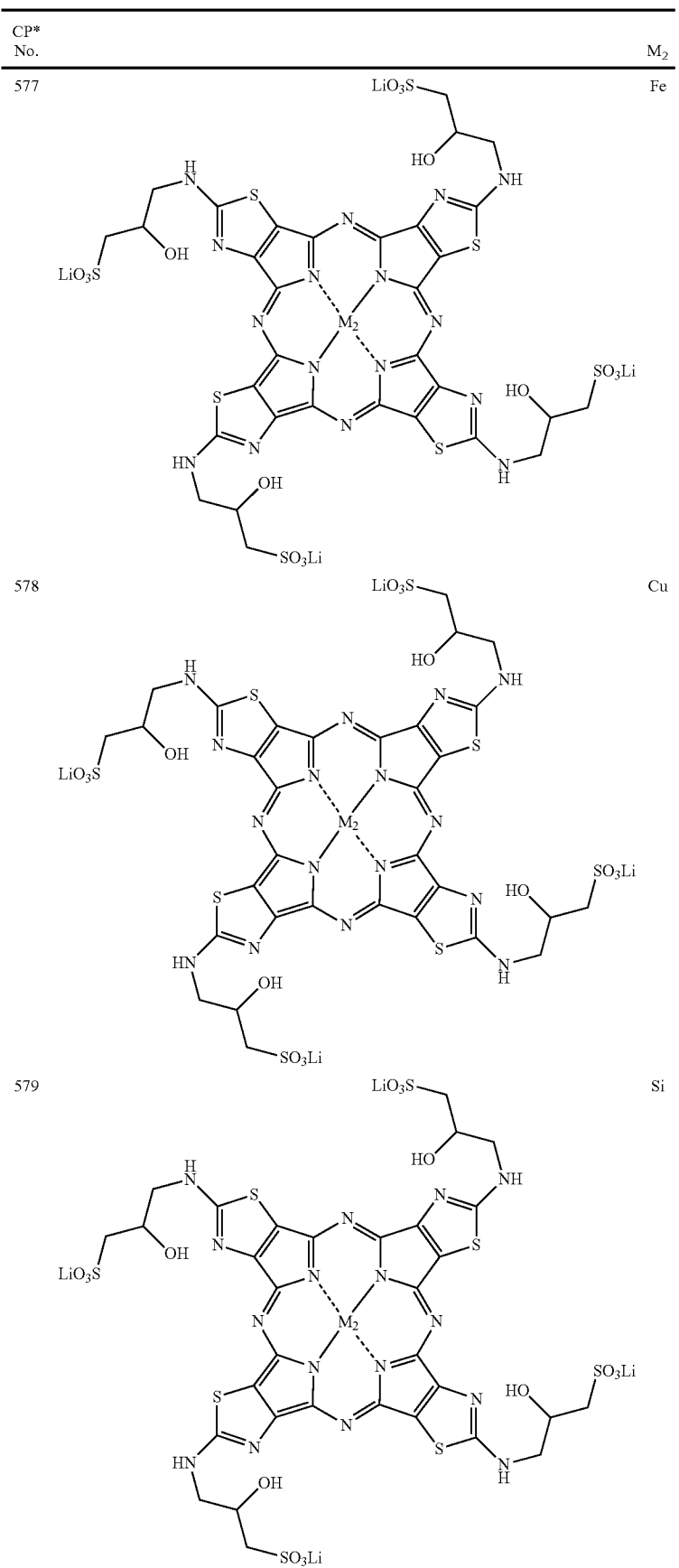

TABLE 33-continued

| CP* No. | | M₂ |
|---|---|---|
| 580 | [structure] | Cu |
| 581 | [structure] | Fe |
| 582 | [structure] | Co |
| 583 | [structure] | Cu |

TABLE 33-continued

| CP* No. | | M₂ |
|---|---|---|
| 584 | [structure] | Fe |
| 585 | [structure] | Si |
| 586 | [structure] | Ni |

CP* No.: Compound No.

TABLE 34

| CP* No. | | M₂ |
|---|---|---|
| 587 | (structure) | Fe |
| 588 | (structure) | Cu |
| 589 | (structure) | Si |

TABLE 34-continued

| CP* No. | | M₂ |
|---|---|---|
| 590 | | Fe |
| 591 | | Cu |
| 592 | | Si |

CP* No.: Compound No.

| TABLE 35 | | | TABLE 35-continued | | |
|---|---|---|---|---|---|
| CP* No. | | M₂ | CP* No. | | M₂ |
| 593 | | Fe | 594 | | Cu |

TABLE 35-continued

| CP* No. | Structure | M₂ |
|---|---|---|
| 595 | | Si |
| 596 | | Cu |
| 597 | | Fe |
| 598 | | Co |
| 599 | | Cu |
| 600 | | Fe |
| 601 | | Zn |
| 602 | | Fe |
| 603 | | Cu |

TABLE 35-continued

| CP* No. | M₂ |
|---|---|
| 604 | Ni |

CP* No.: Compound No.

Hereinafter, there are specifically exemplified the combination and the constitution ratio of two or more kinds of different compounds including a compound represented by Formula (I) and a compound represented by Formula (II) being constitutional components of the mixed crystal of the invention.

TABLE 36

| | Constituent | | Ratio by Mass |
|---|---|---|---|
| Mixed Crystal 701 | Compound 1 | Compound 501 | 99.1:0.9 |
| Mixed Crystal 702 | Compound 1 | Compound 501 | 99:1 |
| Mixed Crystal 703 | Compound 1 | Compound 501 | 98:2 |
| Mixed Crystal 704 | Compound 1 | Compound 501 | 95:5 |
| Mixed Crystal 705 | Compound 1 | Compound 501 | 90:10 |
| Mixed Crystal 706 | Compound 1 | Compound 501 | 80:20 |
| Mixed Crystal 707 | Compound 1 | Compound 501 | 75:25 |
| Mixed Crystal 708 | Compound 1 | Compound 501 | 67:33 |
| Mixed Crystal 709 | Compound 1 | Compound 501 | 50:50 |
| Mixed Crystal 710 | Compound 2 | Compound 501 | 90:10 |
| Mixed Crystal 711 | Compound 3 | Compound 501 | 90:10 |
| Mixed Crystal 712 | Compound 4 | Compound 501 | 90:10 |
| Mixed Crystal 713 | Compound 5 | Compound 501 | 90:10 |
| Mixed Crystal 714 | Compound 6 | Compound 501 | 90:10 |
| Mixed Crystal 715 | Compound 7 | Compound 501 | 90:10 |
| Mixed Crystal 716 | Compound 1 | Compound 507 | 99.1:0.9 |
| Mixed Crystal 717 | Compound 1 | Compound 507 | 99:1 |
| Mixed Crystal 718 | Compound 1 | Compound 507 | 98:2 |
| Mixed Crystal 719 | Compound 1 | Compound 507 | 95:5 |
| Mixed Crystal 720 | Compound 1 | Compound 507 | 90:10 |
| Mixed Crystal 721 | Compound 1 | Compound 507 | 80:20 |
| Mixed Crystal 722 | Compound 1 | Compound 507 | 75:25 |
| Mixed Crystal 723 | Compound 1 | Compound 507 | 67:33 |
| Mixed Crystal 724 | Compound 1 | Compound 507 | 50:50 |
| Mixed Crystal 725 | Compound 2 | Compound 507 | 90:10 |

TABLE 37

| | Constituent | | Ratio by Mass |
|---|---|---|---|
| Mixed Crystal 726 | Compound 3 | Compound 507 | 90:10 |
| Mixed Crystal 727 | Compound 4 | Compound 507 | 90:10 |
| Mixed Crystal 728 | Compound 5 | Compound 507 | 90:10 |
| Mixed Crystal 729 | Compound 6 | Compound 507 | 90:10 |
| Mixed Crystal 730 | Compound 7 | Compound 507 | 90:10 |
| Mixed Crystal 731 | Compound 1 | Compound 513 | 99.1:0.9 |
| Mixed Crystal 732 | Compound 1 | Compound 513 | 99:1 |
| Mixed Crystal 733 | Compound 1 | Compound 513 | 98:2 |
| Mixed Crystal 734 | Compound 1 | Compound 513 | 95:5 |
| Mixed Crystal 735 | Compound 1 | Compound 513 | 90:10 |
| Mixed Crystal 736 | Compound 1 | Compound 513 | 80:20 |
| Mixed Crystal 737 | Compound 1 | Compound 513 | 75:25 |
| Mixed Crystal 738 | Compound 1 | Compound 513 | 67:33 |
| Mixed Crystal 739 | Compound 1 | Compound 513 | 50:50 |

TABLE 37-continued

| | Constituent | | Ratio by Mass |
|---|---|---|---|
| Mixed Crystal 740 | Compound 2 | Compound 513 | 90:10 |
| Mixed Crystal 741 | Compound 3 | Compound 513 | 90:10 |
| Mixed Crystal 742 | Compound 4 | Compound 513 | 90:10 |
| Mixed Crystal 743 | Compound 5 | Compound 513 | 99.1:0.9 |
| Mixed Crystal 744 | Compound 6 | Compound 513 | 90:10 |
| Mixed Crystal 745 | Compound 7 | Compound 513 | 90:10 |
| Mixed Crystal 746 | Compound 1 | Compound 531 | 99.1:0.9 |
| Mixed Crystal 747 | Compound 1 | Compound 534 | 90:10 |
| Mixed Crystal 748 | Compound 1 | Compound 535 | 90:10 |
| Mixed Crystal 749 | Compound 1 | Compound 546 | 90:10 |
| Mixed Crystal 750 | Compound 1 | Compound 547 | 90:10 |

TABLE 38

| | Constituent | | Ratio by Mass |
|---|---|---|---|
| Mixed Crystal 751 | Compound 3 | Compound 549 | 90:10 |
| Mixed Crystal 752 | Compound 4 | Compound 550 | 90:10 |
| Mixed Crystal 753 | Compound 5 | Compound 551 | 90:10 |
| Mixed Crystal 754 | Compound 6 | Compound 553 | 90:10 |
| Mixed Crystal 755 | Compound 7 | Compound 557 | 90:10 |
| Mixed Crystal 756 | Compound 1 | Compound 558 | 90:10 |
| Mixed Crystal 757 | Compound 1 | Compound 560 | 90:10 |
| Mixed Crystal 758 | Compound 1 | Compound 561 | 90:10 |
| Mixed Crystal 759 | Compound 1 | Compound 562 | 90:10 |
| Mixed Crystal 760 | Compound 1 | Compound 563 | 90:10 |
| Mixed Crystal 761 | Compound 1 | Compound 564 | 90:10 |
| Mixed Crystal 762 | Compound 1 | Compound 565 | 90:10 |
| Mixed Crystal 763 | Compound 1 | Compound 566 | 99.1:0.9 |
| Mixed Crystal 764 | Compound 1 | Compound 567 | 90:10 |
| Mixed Crystal 765 | Compound 2 | Compound 569 | 90:10 |
| Mixed Crystal 766 | Compound 3 | Compound 571 | 90:10 |
| Mixed Crystal 767 | Compound 4 | Compound 573 | 99.1:0.9 |
| Mixed Crystal 768 | Compound 5 | Compound 574 | 90:10 |
| Mixed Crystal 769 | Compound 6 | Compound 576 | 90:10 |
| Mixed Crystal 770 | Compound 7 | Compound 577 | 90:10 |
| Mixed Crystal 771 | Compound 1 | Compound 578 | 90:10 |
| Mixed Crystal 772 | Compound 1 | Compound 580 | 90:10 |
| Mixed Crystal 773 | Compound 1 | Compound 583 | 95:5 |
| Mixed Crystal 774 | Compound 1 | Compound 584 | 90:10 |
| Mixed Crystal 775 | Compound 1 | Compound 588 | 90:10 |

TABLE 39

| | Constituent | | Ratio by Mass |
|---|---|---|---|
| Mixed Crystal 776 | Compound 3 | Compound 591 | 90:10 |
| Mixed Crystal 777 | Compound 4 | Compound 592 | 90:10 |
| Mixed Crystal 778 | Compound 5 | Compound 594 | 90:10 |
| Mixed Crystal 779 | Compound 6 | Compound 595 | 90:10 |
| Mixed Crystal 780 | Compound 7 | Compound 596 | 99.1:0.9 |
| Mixed Crystal 781 | Compound 1 | Compound 597 | 90:10 |
| Mixed Crystal 782 | Compound 1 | Compound 599 | 90:10 |
| Mixed Crystal 783 | Compound 1 | Compound 601 | 90:10 |
| Mixed Crystal 784 | Compound 1 | Compound 602 | 90:10 |
| Mixed Crystal 785 | Compound 1 | Compound 603 | 90:10 |
| Mixed Crystal 786 | Compound 101 | Compound 501 | 90:10 |
| Mixed Crystal 787 | Compound 102 | Compound 507 | 90:10 |
| Mixed Crystal 788 | Compound 104 | Compound 535 | 90:10 |
| Mixed Crystal 789 | Compound 106 | Compound 507 | 90:10 |
| Mixed Crystal 790 | Compound 113 | Compound 501 | 99.1:0.9 |
| Mixed Crystal 791 | Compound 115 | Compound 501 | 90:10 |
| Mixed Crystal 792 | Compound 124 | Compound 592 | 90:10 |
| Mixed Crystal 793 | Compound 126 | Compound 507 | 90:10 |
| Mixed Crystal 794 | Compound 130 | Compound 535 | 90:10 |
| Mixed Crystal 795 | Compound 131 | Compound 591 | 90:10 |
| Mixed Crystal 796 | Compound 134 | Compound 501 | 90:10 |
| Mixed Crystal 797 | Compound 136 | Compound 501 | 95:5 |
| Mixed Crystal 798 | Compound 138 | Compound 535 | 90:10 |
| Mixed Crystal 799 | Compound 140 | Compound 588 | 90:10 |
| Mixed Crystal 800 | Compound 142 | Compound 501 | 90:10 |

TABLE 40

|  | Constituent | | Ratio by Mass |
| --- | --- | --- | --- |
| Mixed Crystal 801 | Compound 150 | Compound 584 | 90:10 |
| Mixed Crystal 802 | Compound 153 | Compound 507 | 90:10 |
| Mixed Crystal 803 | Compound 164 | Compound 583 | 90:10 |
| Mixed Crystal 804 | Compound 170 | Compound 507 | 90:10 |
| Mixed Crystal 805 | Compound 171 | Compound 535 | 90:10 |
| Mixed Crystal 806 | Compound 176 | Compound 580 | 99.1:0.9 |
| Mixed Crystal 807 | Compound 180 | Compound 507 | 90:10 |
| Mixed Crystal 808 | Compound 182 | Compound 507 | 90:10 |
| Mixed Crystal 809 | Compound 186 | Compound 578 | 90:10 |
| Mixed Crystal 810 | Compound 190 | Compound 501 | 90:10 |
| Mixed Crystal 811 | Compound 193 | Compound 577 | 80:20 |
| Mixed Crystal 812 | Compound 211 | Compound 501 | 90:10 |
| Mixed Crystal 813 | Compound 216 | Compound 501 | 90:10 |
| Mixed Crystal 814 | Compound 220 | Compound 507 | 90:10 |
| Mixed Crystal 815 | Compound 226 | Compound 507 | 90:10 |
| Mixed Crystal 816 | Compound 230 | Compound 513 | 95:5 |
| Mixed Crystal 817 | Compound 233 | Compound 576 | 90:10 |
| Mixed Crystal 818 | Compound 244 | Compound 501 | 90:10 |
| Mixed Crystal 819 | Compound 244 | Compound 501 | 95:5 |
| Mixed Crystal 820 | Compound 244 | Compound 507 | 99.1:0.9 |
| Mixed Crystal 821 | Compound 244 | Compound 507 | 90:10 |
| Mixed Crystal 822 | Compound 270 | Compound 535 | 90:10 |
| Mixed Crystal 823 | Compound 273 | Compound 507 | 50:50 |
| Mixed Crystal 824 | Compound 284 | Compound 573 | 90:10 |
| Mixed Crystal 825 | Compound 289 | Compound 571 | 90:10 |

TABLE 41

|  | Constituent | | Ratio by Mass |
| --- | --- | --- | --- |
| Mixed Crystal 826 | Compound 305 | Compound 569 | 90:10 |
| Mixed Crystal 827 | Compound 310 | Compound 507 | 90:10 |
| Mixed Crystal 828 | Compound 313 | Compound 501 | 90:10 |
| Mixed Crystal 829 | Compound 338 | Compound 567 | 90:10 |
| Mixed Crystal 830 | Compound 343 | Compound 501 | 90:10 |
| Mixed Crystal 831 | Compound 345 | Compound 507 | 90:10 |
| Mixed Crystal 832 | Compound 350 | Compound 566 | 90:10 |
| Mixed Crystal 833 | Compound 353 | Compound 535 | 90:10 |
| Mixed Crystal 834 | Compound 364 | Compound 501 | 90:10 |
| Mixed Crystal 835 | Compound 364 | Compound 507 | 95:5 |
| Mixed Crystal 836 | Compound 365 | Compound 501 | 80:20 |
| Mixed Crystal 837 | Compound 365 | Compound 507 | 99.1:0.9 |
| Mixed Crystal 838 | Compound 366 | Compound 501 | 90:10 |
| Mixed Crystal 839 | Compound 366 | Compound 507 | 95:5 |
| Mixed Crystal 840 | Compound 368 | Compound 546 | 90:10 |
| Mixed Crystal 841 | Compound 369 | Compound 538 | 90:10 |
| Mixed Crystal 842 | Compound 370 | Compound 565 | 90:10 |
| Mixed Crystal 843 | Compound 378 | Compound 501 | 90:10 |
| Mixed Crystal 844 | Compound 392 | Compound 564 | 90:10 |
| Mixed Crystal 845 | Compound 406 | Compound 563 | 90:10 |
| Mixed Crystal 846 | Compound 411 | Compound 547 | 50:50 |
| Mixed Crystal 847 | Compound 418 | Compound 562 | 95:5 |
| Mixed Crystal 848 | Compound 421 | Compound 546 | 90:10 |
| Mixed Crystal 849 | Compound 422 | Compound 507 | 90:10 |
| Mixed Crystal 850 | Compound 423 | Compound 501 | 90:10 |

TABLE 42

|  | Constituent | | Ratio by Mass |
| --- | --- | --- | --- |
| Mixed Crystal 851 | Compound 424 | Compound 535 | 90:10 |
| Mixed Crystal 852 | Compound 425 | Compound 501 | 80:20 |
| Mixed Crystal 853 | Compound 427 | Compound 561 | 90:10 |
| Mixed Crystal 854 | Compound 429 | Compound 560 | 90:10 |
| Mixed Crystal 855 | Compound 431 | Compound 558 | 90:10 |
| Mixed Crystal 856 | Compound 434 | Compound 501 | 90:10 |
| Mixed Crystal 857 | Compound 438 | Compound 501 | 90:10 |
| Mixed Crystal 858 | Compound 441 | Compound 535 | 90:10 |
| Mixed Crystal 859 | Compound 442 | Compound 507 | 90:10 |
| Mixed Crystal 860 | Compound 443 | Compound 546 | 90:10 |
| Mixed Crystal 861 | Compound 444 | Compound 501 | 90:10 |
| Mixed Crystal 862 | Compound 445 | Compound 557 | 95:5 |
| Mixed Crystal 863 | Compound 449 | Compound 507 | 90:10 |
| Mixed Crystal 864 | Compound 450 | Compound 507 | 90:10 |
| Mixed Crystal 865 | Compound 455 | Compound 553 | 90:10 |
| Mixed Crystal 866 | Compound 456 | Compound 501 | 99.1:0.9 |
| Mixed Crystal 867 | Compound 464 | Compound 501 | 90:10 |
| Mixed Crystal 868 | Compound 466 | Compound 551 | 90:10 |
| Mixed Crystal 869 | Compound 473 | Compound 550 | 90:10 |
| Mixed Crystal 870 | Compound 478 | Compound 535 | 90:10 |
| Mixed Crystal 871 | Compound 486 | Compound 546 | 90:10 |
| Mixed Crystal 872 | Compound 487 | Compound 549 | 90:10 |
| Mixed Crystal 873 | Compound 488 | Compound 501 | 90:10 |
| Mixed Crystal 874 | Compound 489 | Compound 513 | 90:10 |
| Mixed Crystal 875 | Compound 496 | Compound 547 | 90:10 |

TABLE 43

|  | Constituent | | | Ratio by Mass |
| --- | --- | --- | --- | --- |
| Mixed Crystal 876 | Compound 1 | Compound 244 | Compound 501 | 90:5:5 |
| Mixed Crystal 877 | Compound 1 | Compound 244 | Compound 507 | 98:1:1 |
| Mixed Crystal 878 | Compound 1 | Compound 244 | Compound 513 | 80:10:10 |
| Mixed Crystal 879 | Compound 1 | Compound 244 | Compound 501 | 95:3:2 |
| Mixed Crystal 880 | Compound 1 | Compound 244 | Compound 513 | 95:1:4 |
| Mixed Crystal 881 | Compound 1 | Compound 244 | Compound 507 | 95:2:3 |
| Mixed Crystal 882 | Compound 1 | Compound 244 | Compound 507 | 95:3:2 |
| Mixed Crystal 883 | Compound 1 | Compound 244 | Compound 501 | 95:4:1 |
| Mixed Crystal 884 | Compound 1 | Compound 244 | Compound 501 | 90:2:8 |
| Mixed Crystal 885 | Compound 2 | Compound 244 | Compound 501 | 90:3:7 |
| Mixed Crystal 886 | Compound 3 | Compound 364 | Compound 501 | 90:4:6 |
| Mixed Crystal 887 | Compound 4 | Compound 364 | Compound 513 | 90:8:2 |
| Mixed Crystal 888 | Compound 5 | Compound 364 | Compound 507 | 80:15:5 |
| Mixed Crystal 889 | Compound 6 | Compound 364 | Compound 501 | 92:4:4 |
| Mixed Crystal 890 | Compound 7 | Compound 364 | Compound 501 | 96:2:2 |
| Mixed Crystal 891 | Compound 1 | Compound 364 | Compound 501 | 93:3:4 |
| Mixed Crystal 892 | Compound 1 | Compound 364 | Compound 507 | 96:3:1 |
| Mixed Crystal 893 | Compound 1 | Compound 364 | Compound 513 | 98:1:1 |
| Mixed Crystal 894 | Compound 1 | Compound 364 | Compound 501 | 90:8:2 |
| Mixed Crystal 895 | Compound 1 | Compound 364 | Compound 507 | 80:15:5 |
| Mixed Crystal 896 | Compound 1 | Compound 365 | Compound 501 | 90:2:8 |
| Mixed Crystal 897 | Compound 1 | Compound 365 | Compound 513 | 90:3:7 |
| Mixed Crystal 898 | Compound 1 | Compound 365 | Compound 507 | 90:4:6 |
| Mixed Crystal 899 | Compound 1 | Compound 365 | Compound 501 | 90:8:2 |
| Mixed Crystal 900 | Compound 2 | Compound 365 | Compound 501 | 80:15:5 |

TABLE 44

| | Constituent | | | Ratio by Mass |
|---|---|---|---|---|
| Mixed Crystal 901 | Compound 1 | Compound 365 | Compound 501 | 96:2:2 |
| Mixed Crystal 902 | Compound 1 | Compound 365 | Compound 501 | 98:1:1 |
| Mixed Crystal 903 | Compound 1 | Compound 365 | Compound 513 | 80:18:2 |
| Mixed Crystal 904 | Compound 1 | Compound 365 | Compound 507 | 95:3:2 |
| Mixed Crystal 905 | Compound 1 | Compound 365 | Compound 507 | 92:4:4 |
| Mixed Crystal 906 | Compound 1 | Compound 366 | Compound 513 | 96:2:2 |
| Mixed Crystal 907 | Compound 1 | Compound 366 | Compound 501 | 93:3:4 |
| Mixed Crystal 908 | Compound 1 | Compound 366 | Compound 507 | 96:3:1 |
| Mixed Crystal 909 | Compound 1 | Compound 366 | Compound 501 | 90:5:5 |
| Mixed Crystal 910 | Compound 1 | Compound 366 | Compound 507 | 90:3:7 |
| Mixed Crystal 911 | Compound 1 | Compound 366 | Compound 501 | 90:4:6 |
| Mixed Crystal 912 | Compound 1 | Compound 366 | Compound 507 | 90:8:2 |
| Mixed Crystal 913 | Compound 1 | Compound 366 | Compound 501 | 80:15:5 |
| Mixed Crystal 914 | Compound 1 | Compound 366 | Compound 507 | 90:5:5 |
| Mixed Crystal 915 | Compound 1 | Compound 368 | Compound 549 | 98:1:1 |
| Mixed Crystal 916 | Compound 1 | Compound 369 | Compound 550 | 93:3:4 |
| Mixed Crystal 917 | Compound 1 | Compound 370 | Compound 551 | 96:3:1 |
| Mixed Crystal 918 | Compound 1 | Compound 378 | Compound 553 | 90:8:2 |
| Mixed Crystal 919 | Compound 1 | Compound 392 | Compound 557 | 90:8:2 |
| Mixed Crystal 920 | Compound 1 | Compound 406 | Compound 558 | 80:15:5 |
| Mixed Crystal 921 | Compound 1 | Compound 411 | Compound 560 | 90:2:8 |
| Mixed Crystal 922 | Compound 1 | Compound 418 | Compound 561 | 90:3:7 |
| Mixed Crystal 923 | Compound 1 | Compound 421 | Compound 562 | 90:4:6 |
| Mixed Crystal 924 | Compound 1 | Compound 422 | Compound 563 | 98:1.5:0.5 |
| Mixed Crystal 925 | Compound 1 | Compound 423 | Compound 564 | 90:4:6 |

TABLE 45

| | Constituent | | | Ratio by Mass |
|---|---|---|---|---|
| Mixed Crystal 926 | Compound 1 | Compound 424 | Compound 565 | 96:1:3 |
| Mixed Crystal 927 | Compound 1 | Compound 425 | Compound 566 | 80:15:5 |
| Mixed Crystal 928 | Compound 1 | Compound 427 | Compound 567 | 70:20:10 |
| Mixed Crystal 929 | Compound 1 | Compound 429 | Compound 569 | 95:3:2 |
| Mixed Crystal 930 | Compound 1 | Compound 431 | Compound 571 | 98:1:1 |
| Mixed Crystal 931 | Compound 1 | Compound 434 | Compound 573 | 96:2:2 |
| Mixed Crystal 932 | Compound 1 | Compound 438 | Compound 574 | 93:3:4 |
| Mixed Crystal 933 | Compound 1 | Compound 441 | Compound 576 | 80:15:5 |
| Mixed Crystal 934 | Compound 1 | Compound 442 | Compound 577 | 90:8:2 |
| Mixed Crystal 935 | Compound 1 | Compound 443 | Compound 578 | 90:3:7 |
| Mixed Crystal 936 | Compound 1 | Compound 444 | Compound 580 | 90:4:6 |
| Mixed Crystal 937 | Compound 1 | Compound 445 | Compound 583 | 90:8:2 |
| Mixed Crystal 938 | Compound 1 | Compound 449 | Compound 584 | 80:15:5 |
| Mixed Crystal 939 | Compound 1 | Compound 450 | Compound 588 | 90:5:5 |
| Mixed Crystal 940 | Compound 1 | Compound 455 | Compound 591 | 96:1:3 |
| Mixed Crystal 941 | Compound 1 | Compound 456 | Compound 592 | 93:3:4 |
| Mixed Crystal 942 | Compound 1 | Compound 464 | Compound 594 | 96:3:1 |
| Mixed Crystal 943 | Compound 1 | Compound 466 | Compound 595 | 99:0.5:0.5 |
| Mixed Crystal 944 | Compound 1 | Compound 473 | Compound 596 | 90:8:2 |
| Mixed Crystal 945 | Compound 1 | Compound 478 | Compound 597 | 80:15:5 |
| Mixed Crystal 946 | Compound 1 | Compound 486 | Compound 599 | 90:2:8 |
| Mixed Crystal 947 | Compound 1 | Compound 487 | Compound 601 | 98:1:1 |
| Mixed Crystal 948 | Compound 1 | Compound 488 | Compound 602 | 90:4:6 |
| Mixed Crystal 949 | Compound 1 | Compound 489 | Compound 603 | 90:8:2 |
| Mixed Crystal 950 | Compound 1 | Compound 496 | Compound 501 | 80:15:5 |

TABLE 46

| | Constituent | | | Ratio by Mass |
|---|---|---|---|---|
| Mixed Crystal 951 | Compound 1 | Compound 150 | Compound 507 | 98:1:1 |
| Mixed Crystal 952 | Compound 1 | Compound 153 | Compound 535 | 98:1:1 |
| Mixed Crystal 953 | Compound 1 | Compound 164 | Compound 507 | 80:10:10 |
| Mixed Crystal 954 | Compound 1 | Compound 170 | Compound 501 | 95:3:2 |
| Mixed Crystal 955 | Compound 1 | Compound 171 | Compound 501 | 92:4:4 |
| Mixed Crystal 956 | Compound 1 | Compound 176 | Compound 592 | 96:2:2 |
| Mixed Crystal 957 | Compound 1 | Compound 180 | Compound 507 | 93:3:4 |
| Mixed Crystal 958 | Compound 1 | Compound 182 | Compound 535 | 80:15:5 |
| Mixed Crystal 959 | Compound 1 | Compound 186 | Compound 591 | 99:0.5:0.5 |
| Mixed Crystal 960 | Compound 1 | Compound 190 | Compound 501 | 90:3:7 |
| Mixed Crystal 961 | Compound 1 | Compound 193 | Compound 501 | 90:4:6 |
| Mixed Crystal 962 | Compound 1 | Compound 211 | Compound 535 | 98:1:1 |
| Mixed Crystal 963 | Compound 1 | Compound 216 | Compound 588 | 80:15:5 |

TABLE 46-continued

|  |  | Constituent |  | Ratio by Mass |
| --- | --- | --- | --- | --- |
| Mixed Crystal 964 | Compound 1 | Compound 220 | Compound 501 | 90:5:5 |
| Mixed Crystal 965 | Compound 1 | Compound 226 | Compound 584 | 96:1:3 |
| Mixed Crystal 966 | Compound 1 | Compound 230 | Compound 507 | 98:1:1 |
| Mixed Crystal 967 | Compound 1 | Compound 233 | Compound 583 | 96:3:1 |
| Mixed Crystal 968 | Compound 1 | Compound 244 | Compound 507 | 99:0.5:0.5 |
| Mixed Crystal 969 | Compound 1 | Compound 244 | Compound 535 | 90:8:2 |
| Mixed Crystal 970 | Compound 1 | Compound 244 | Compound 580 | 80:15:5 |
| Mixed Crystal 971 | Compound 1 | Compound 244 | Compound 507 | 90:2:8 |
| Mixed Crystal 972 | Compound 1 | Compound 270 | Compound 507 | 90:3:7 |
| Mixed Crystal 973 | Compound 1 | Compound 273 | Compound 578 | 90:4:6 |
| Mixed Crystal 974 | Compound 1 | Compound 284 | Compound 501 | 90:8:2 |
| Mixed Crystal 975 | Compound 1 | Compound 289 | Compound 577 | 93:3:4 |

TABLE 47

|  |  | Constituent |  | Ratio by Mass |
| --- | --- | --- | --- | --- |
| Mixed Crystal 976 | Compound 6 | Compound 244 | Compound 549 | 99:0.5:0.5 |
| Mixed Crystal 977 | Compound 2 | Compound 364 | Compound 550 | 98:1:1 |
| Mixed Crystal 978 | Compound 6 | Compound 365 | Compound 551 | 95:4:1 |
| Mixed Crystal 979 | Compound 7 | Compound 366 | Compound 553 | 95:3:2 |
| Mixed Crystal 980 | Compound 2 | Compound 244 | Compound 557 | 92:4:4 |
| Mixed Crystal 981 | Compound 3 | Compound 364 | Compound 558 | 80:15:5 |
| Mixed Crystal 982 | Compound 2 | Compound 365 | Compound 560 | 93:3:4 |
| Mixed Crystal 983 | Compound 7 | Compound 366 | Compound 561 | 96:3:1 |
| Mixed Crystal 984 | Compound 2 | Compound 244 | Compound 562 | 90:8:2 |
| Mixed Crystal 985 | Compound 2 | Compound 364 | Compound 563 | 80:15:5 |
| Mixed Crystal 986 | Compound 4 | Compound 365 | Compound 564 | 90:4:6 |
| Mixed Crystal 987 | Compound 2 | Compound 366 | Compound 565 | 90:8:2 |
| Mixed Crystal 988 | Compound 7 | Compound 244 | Compound 566 | 98:1:1 |
| Mixed Crystal 989 | Compound 2 | Compound 364 | Compound 567 | 93:3:4 |
| Mixed Crystal 990 | Compound 6 | Compound 365 | Compound 569 | 96:1:3 |
| Mixed Crystal 991 | Compound 4 | Compound 366 | Compound 571 | 93:3:4 |
| Mixed Crystal 992 | Compound 6 | Compound 244 | Compound 573 | 99:0.5:0.5 |
| Mixed Crystal 993 | Compound 6 | Compound 364 | Compound 574 | 90:8:2 |
| Mixed Crystal 994 | Compound 4 | Compound 365 | Compound 576 | 90:8:2 |
| Mixed Crystal 995 | Compound 7 | Compound 366 | Compound 577 | 80:15:5 |
| Mixed Crystal 996 | Compound 5 | Compound 244 | Compound 578 | 90:2:8 |
| Mixed Crystal 997 | Compound 7 | Compound 364 | Compound 580 | 90:3:7 |
| Mixed Crystal 998 | Compound 6 | Compound 365 | Compound 583 | 90:4:6 |
| Mixed Crystal 999 | Compound 5 | Compound 366 | Compound 584 | 90:8:2 |
| Mixed Crystal 1000 | Compound 4 | Compound 244 | Compound 588 | 96:1:3 |

TABLE 48

|  |  | Constituent |  | Ratio by Mass |
| --- | --- | --- | --- | --- |
| Mixed Crystal 1001 | Compound 3 | Compound 244 | Compound 591 | 90:5:5 |
| Mixed Crystal 1002 | Compound 7 | Compound 364 | Compound 592 | 98:1:1 |
| Mixed Crystal 1003 | Compound 2 | Compound 365 | Compound 594 | 80:10:10 |
| Mixed Crystal 1004 | Compound 6 | Compound 366 | Compound 595 | 95:3:2 |
| Mixed Crystal 1005 | Compound 7 | Compound 244 | Compound 596 | 92:4:4 |
| Mixed Crystal 1006 | Compound 5 | Compound 364 | Compound 597 | 96:2:2 |
| Mixed Crystal 1007 | Compound 7 | Compound 365 | Compound 599 | 93:3:4 |
| Mixed Crystal 1008 | Compound 3 | Compound 366 | Compound 601 | 96:3:1 |
| Mixed Crystal 1009 | Compound 5 | Compound 244 | Compound 602 | 90:8:2 |
| Mixed Crystal 1010 | Compound 7 | Compound 364 | Compound 603 | 90:3:7 |
| Mixed Crystal 1011 | Compound 2 | Compound 365 | Compound 501 | 90:4:6 |
| Mixed Crystal 1012 | Compound 7 | Compound 366 | Compound 507 | 99:0.5:0.5 |
| Mixed Crystal 1013 | Compound 7 | Compound 244 | Compound 535 | 80:15:5 |
| Mixed Crystal 1014 | Compound 6 | Compound 364 | Compound 507 | 90:5:5 |
| Mixed Crystal 1015 | Compound 5 | Compound 365 | Compound 501 | 96:1:3 |
| Mixed Crystal 1016 | Compound 5 | Compound 366 | Compound 501 | 80:15:5 |
| Mixed Crystal 1017 | Compound 7 | Compound 244 | Compound 592 | 96:3:1 |
| Mixed Crystal 1018 | Compound 3 | Compound 364 | Compound 507 | 90:8:2 |
| Mixed Crystal 1019 | Compound 7 | Compound 365 | Compound 535 | 98:1:1 |
| Mixed Crystal 1020 | Compound 2 | Compound 366 | Compound 591 | 80:15:5 |
| Mixed Crystal 1021 | Compound 7 | Compound 244 | Compound 501 | 90:2:8 |
| Mixed Crystal 1022 | Compound 2 | Compound 364 | Compound 501 | 90:3:7 |
| Mixed Crystal 1023 | Compound 6 | Compound 365 | Compound 535 | 90:4:6 |
| Mixed Crystal 1024 | Compound 2 | Compound 366 | Compound 588 | 90:8:2 |
| Mixed Crystal 1025 | Compound 5 | Compound 244 | Compound 501 | 80:15:5 |

In the invention, from the standpoints of the hue and color reproducibility of the mixed crystal, preferable is a mixed crystal constituted of a compound in which X represents —SO$_2$—Z, —SO$_2$NR$_1$R$_2$ or —SO$_3$R$_1$, in which Z is a substituted alkyl group, a substituted aryl group or a substituted heterocyclic group; R$_1$ and R$_2$ are each independently a hydrogen atom, a substituted alkyl group, a substituted aryl group or a substituted heterocyclic group; Y is a halogen atom or a cyano group; a and b are from 0 to 4; and M$_1$ is Fe, Cu or Si among compounds represented by Formula (I), and a compound in which G$_1$ to G$_4$ and Q$_1$ to Q$_4$ are carbon atoms, or a ring formed with A$_1$ to A$_4$, G$_1$ to G$_4$ and Q$_1$ to Q$_4$ is a 5-membered or a 6-membered heterocycle among compounds represented by Formula (II). More preferable is a mixed crystal obtained by precipitating a compound represented by Formula (I) and a compound represented by Formula (II) from a solvent containing an acid.

The absorption property of the mixed crystal of the invention is evaluated by UV-V is spectrum measurement in a dispersion state of the mixed crystal. The spectrum measurement was performed as follows. 200 µL of an aqueous dispersion of the mixed crystal were put in a 10 mL measuring flask and measured up to 10 mL with ultrapure water, which was then transferred to a quartz cell having a light path length of 1 cm and the spectrum was measured using UV-3100PC manufactured by Shimadzu at 25° C.

When the mixed crystal of the invention is a pigment exhibiting an intended blue, the pigment dispersion thereof favorably has a maximum absorption wavelength in the range from 570 nm to 630 nm, in the region of 400 nm or greater in the absorption spectrum. More preferably, the dispersion has the maximum absorption wavelength in the range from 575 nm to 625 nm, and, particularly preferably the dispersion has the maximum absorption wavelength in the range from 580 nm to 620 nm. The maximum absorption wavelength of 570 nm or greater suppresses the expression of a red-violet color and allows a good blue hue to be shown. On the other hand, that of 630 nm or less can suppress the expression of a cyan color to be too strong and the lowering of the vividness of a blue hue due to the broadening.

Further, in the absorption spectrum of a colored pigment dispersion, the half width of the absorption band showing the maximum absorption wavelength in a region of 400 nm or greater is preferably from 170 nm to 70 nm, more preferably from 150 nm to 75 nm, particularly preferably from 130 nm to 80 nm. An absorption band having a half-width of 170 nm or less can express vivid blue color. On the other hand, an absorption band having a half width of 70 nm or greater can suppress the sharpness to be too much to result in a good color reproduction when being combined with a green or red color.

In a dispersion state, the absorption spectrum of the mixed crystal of the invention preferably has a maximum absorption wavelength of 630 nm or less in a region of 400 nm or greater, and has an absorption wavelength that is shorter than the maximum absorption wavelength and gives half-absorbance of the absorbance at the maximum absorption wavelength is 560 nm or less.

The half-absorbance in the invention means an absorbance obtained by dividing the maximum absorbance in a certain absorption band into halves. For example, when the maximum absorbance in a certain absorption band is 1.0, the half-absorbance is 0.5. There are two wavelengths that give the half-absorbance on a shorter wavelength side and a longer wavelength side of the maximum absorption wavelength, but, in the invention, it means the wavelength on the shorter wavelength side.

In the invention, a wavelength that gives the half-absorbance lies more preferably in a region from 530 nm to 560 nm, furthermore preferably from 533 nm to 559 nm, and particularly preferably from 535 nm to 558 nm. The wavelength being 530 nm or greater suppresses the broadening of the absorption band derived from blue color to give vivid blue. On the other hand, the wavelength being 560 nm or less suppresses the lowering of a reddish hue to result in better blue color as the color expression of blue.

In the invention, the aforementioned preferable absorption spectrum property can be obtained by being a mixed crystal precipitated from a solvent containing an acid while using a compound represented by Formula (I) and a compound represented by Formula (II).

The mixed crystal of the invention shows a different X-ray diffraction spectrum from the simple sum of X-ray diffraction spectra shown by respective pigments that constitute the mixed crystal. Here, the X-ray diffraction spectrum in the invention means a powder X-ray diffraction spectrum for which the measurement is performed with a powder X-ray diffraction apparatus according to Japanese Industrial Standard (JIS) K0131-1996 (General Principle of X-ray Diffraction Analysis) and the X-ray diffraction peak by the CuKα characteristic X-ray (wavelength: 0.1541 nm) is shown. From a measured X-ray diffraction spectrum, a Bragg angle 2θ can be obtained. The details of the measuring apparatus and conditions are as follows.

(Measuring Apparatus and Conditions)
Name of the apparatus: RINT2000, vertical type goniometer
Power used: 55 kV, 280 mA
Sampling step: 0.1°
Diverging slit: 2°
Scattering slit: 2°
Receiving slit: 0.60 mm
Monochromatic receiving slit: 0.8 mm
Scanning speed: 2°

The mixed crystal of the invention preferably has four or more diffraction peaks that give a diffraction peak intensity of 10% or more of a maximum diffraction peak intensity in a range of the Bragg angle (2θ±0.2°) of from 23.5° to 29.0° in the X-ray diffraction spectrum by the CuKα characteristic X-ray (wavelength: 0.1541 nm). It is preferable that the mixed crystal of the invention is characterized by having the distinctive diffraction peak pattern in the above Bragg angle range.

[Colored Pigment Dispersion]

The colored pigment dispersion in the invention includes at least one mixed crystal including the compound represented by Formula (I) and the compound represented by Formula (II), and at least one medium. The inclusion of the mixed crystal can give a colored pigment dispersion having an absorption property with excellent color reproducibility as a blue pigment and good dispersion stability.

By the aforementioned method for producing a mixed crystal, the mixed crystal including the compound represented by Formula (I) and the compound represented by Formula (II) can be obtained as a crude pigment, but, when it is used as the colored pigment dispersion in the invention, the crude pigment is desirably subjected to a post-treatment.

Examples of the post-treatment include a pigment particle regulating process by grinding treatment such as solvent salt milling, salt milling, dry milling, solvent milling or acid pasting, or by solvent heating treatment, and a surface treatment process by a resin, a surfactant or a dispersing agent.

The mixed crystal including the compound represented by Formula (I) and the compound represented by Formula (II) is preferably subjected to a solvent heating treatment as the post-treatment. Examples of the solvent used in the solvent heating treatment include, water; an aromatic hydrocarbon-based solvent such as toluene or xylene; a halogenated hydrocarbon solvent such as chlorobenzene or o-dichlorobenzene; an alcohol-based solvent such as isopropanol or isobutanol; a polar aprotic organic solvent such as N,N-dimethylformamide, N,N-dimethylacetamide or N-methyl-2-pyrrolidone; glacial acetic acid; pyridine; and mixtures thereof. By the post-treatment with these solvents, the average particle diameter of the pigment is preferably regulated in the range of from 0.01 µm to 1 µm.

In the colored pigment dispersion in the invention, the medium may be either an aqueous medium or a nonaqueous medium.

In the invention, as the aqueous medium dispersing the mixed crystal (pigment), a mixture containing water as a main component and a hydrophilic organic solvent added to the water according to need can be used. By dispersing the mixed crystal in the aqueous medium, an aqueous colored pigment dispersion can be obtained.

Examples of the hydrophilic organic solvent include an alcohol such as methanol, ethanol, propanol, isopropanol, butanol, isobutanol, sec-butanol, tert-butanol, pentanol, hexanol, cyclohexanol, or benzyl alcohol; a polyhydric alcohol such as ethylene glycol, diethylene glycol, triethylene glycol, polyethylene glycol, propylene glycol, dipropylene glycol, polypropylene glycol, butylene glycol, hexanediol, pentanediol, glycerol, hexanetriol, or thiodiglycol; a glycol derivative such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether, or ethylene glycol monophenyl ether; an amine such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, or tetramethylpropylenediamine; and other organic solvents such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone.

In addition, the aqueous colored pigment dispersion in the invention may contain an aqueous resin. Examples of the aqueous resin include water-soluble resins that dissolve in water, water-dispersible resins that disperse in water, colloidal dispersion resins and mixtures thereof. Specific examples of the aqueous resin include acrylic-based, styrene-acrylic-based, polyester-based, polyamide-based, polyurethane-based and fluorine-containing resins, and the like.

Further, at least one of a surfactant or a dispersing agent may be used for the purpose of improving the dispersibility of the pigment and the quality of images. Examples of the surfactant include anionic, nonionic, cationic and amphoteric surfactants. Although any of the surfactants may be used, the use of an anionic or nonionic surfactant is preferable.

Examples of the anionic surfactant include fatty acid salt, alkylsulfuric acid ester salt, alkylbenzene sulfonate, alkylnaphthalene sulfonate, dialkyl sulfosuccinate, alkyldiaryl ether disulfonate, alkyl phosphonate, polyoxyethylene alkyl ether sulfate, polyoxyethylene alkylaryl ether sulfate, naphthalene sulfonate formalin condensate, polyoxyethylene alkyl phosphoric acid ester salt, glycerol borate fatty acid ester, polyoxyethylene glycerol fatty acid ester, and the like.

Examples of the nonionic surfactant include polyoxyethylene alkyl ether, polyoxyethylene alkylaryl ether, polyoxyethylene oxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene alkylamine, fluorocarbon surfactants, silicon-based surfactants, and the like.

As the dispersing agent, a compound suitably selected from the aforementioned aqueous resin and surfactant can be used.

The nonaqueous colored pigment dispersion in the invention is obtained by dispersing a mixed crystal including the compound represented by Formula (I) and the compound represented by Formula (II) in a nonaqueous vehicle (nonaqueous medium). Examples of the resin for use as the nonaqueous vehicle include petroleum resin, casein, shellac, rosin-modified maleic acid resin, rosin-modified phenol resin, nitrocellulose, cellulose acetate butyrate, cyclized rubber, chlorinated rubber, oxidized rubber, hydrochloric acid rubber, phenol resin, alkyd resin, polyester resin, unsaturated polyester resin, amino resin, epoxy resin, vinyl resin, vinyl chloride, vinyl chloride-vinyl acetate copolymer, acrylic resin, methacrylic resin, polyurethane resin, silicon resin, fluorine-containing resin, drying oil, synthetic drying oil, styrene/maleic acid resin, styrene/acrylic resin, polyamide resin, polyimide resin, benzoguanamine resin, melamine resin, urea resin, chlorinated polypropylene, butyral resin, vinylidene chloride resin, and the like. As the nonaqueous vehicle, photocurable resin may be used.

Examples of solvents used for the nonaqueous vehicle include aromatic solvents such as toluene, xylene and methoxybenzene, acetic acid ester-based solvents such as ethyl acetate, butyl acetate, propylene glycol monomethyl ether acetate and propylene glycol monoethyl ether acetate, propionate-based solvents such as ethoxyethyl propionate, alcohol-based solvents such as methanol and ethanol, ether-based solvents such as butyl cellosolve, propylene glycol monomethyl ether, diethylene glycol ethyl ether and diethylene glycol dimethyl ether, ketone-based solvent such as methyl ethyl ketone, methyl isobutyl ketone and cyclohexanone, aliphatic hydrocarbon-based solvents such as hexane, nitrogen-containing solvents such as N,N-dimethylformamide, γ-butyrolactam, N-methyl-2-pyrrolidone, aniline and pyridine, lactone-based solvents such as γ-butyrolactone, carbamic acid ester such as a 48:52 mixture of methyl carbamate and ethyl carbamate, and the like.

The colored pigment dispersion in the invention can be obtained by dispersing the aforementioned mixed crystal and an aqueous or nonaqueous medium using a dispersing apparatus. Example of the usable dispersing apparatus include a ball mill, a sand mill, a bead mill, a roll mill, a jet mill, a paint shaker, an attriter, an ultrasonic dispersing machine, a disper, and the like.

In the invention, the volume average particle diameter of the pigment (mixed crystal) is preferably from 10 nm to 250 nm. The volume average particle diameter of pigment particles means the particle diameter of the pigment itself, or, when an additive such as a dispersing agent adheres to a coloring material, the diameter of a particle to which the additive has adhered. In the invention, as an apparatus for measuring the volume average particle diameter of the pigment, a nano track UPA grain size analyzer (UPA-EX150; manufactured by Nikkiso) was used. The measurement was performed by placing 3 ml of a pigment dispersion in a measurement cell according to a prescribed measuring method. Meanwhile, as parameters input at the measurement, the viscosity of the colored pigment dispersion was used as the viscosity, and the density of the pigment was used as the density of the dispersed particle.

A more preferable volume average particle diameter is from 20 nm to 250 nm, and further preferable one is from 30 nm to 230 nm. That the volume average particle diameter of particles in the colored pigment dispersion is 10 nm or more results in good storage stability. On the other hand, the volume average particle diameter being 250 nm or less gives good optical density.

The concentration of the pigment included in the colored pigment dispersion in the invention is preferably in the range from 1% to 35% by mass, and more preferably from 2% to 25% by mass. A concentration of 1% by mass or more can give sufficient image density when the colored pigment dispersion is used alone, for example, as an ink. On the other hand, a concentration of 35% by mass or less can give better dispersion stability.

The application of the mixed crystal and the colored pigment composition of the invention includes an image recording material for forming images, particularly color images. Specific examples include, starting from ink-jet system recording materials, heat-sensitive recording materials, pressure-sensitive recording materials, recording materials using an electrophotographic system, transfer system silver halide photosensitive materials, printing inks, recording pens, and the like.

Further, they can also be applied to color filters for recording/reproducing color images used in solid-state image sensing devices such as CCD and displays such as LCD and PDP, and to stain solutions for staining various kinds of fibers. The present application claims the benefit of priority from Japanese Patent Application No. 2008-088764 filed on Mar. 28, 2008, which is incorporated herein as the reference document in its entirety.

EXAMPLES

Hereinafter, the present invention is described in more detail by examples thereof, but the invention is not limited to these examples. Unless otherwise noted, all the "parts" and "percents" are by mass.

Synthetic Example

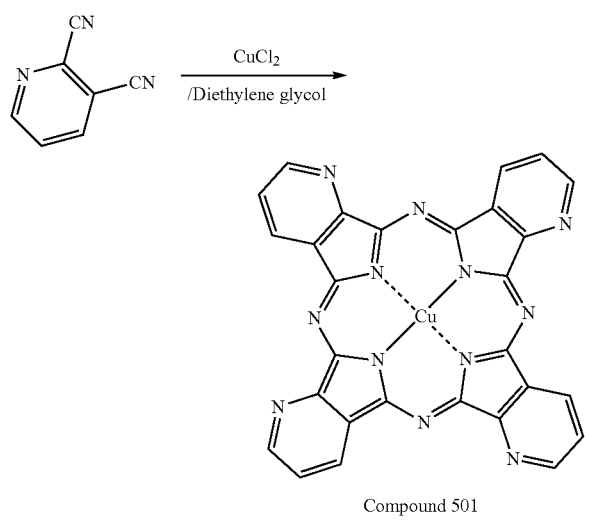

Compound 501

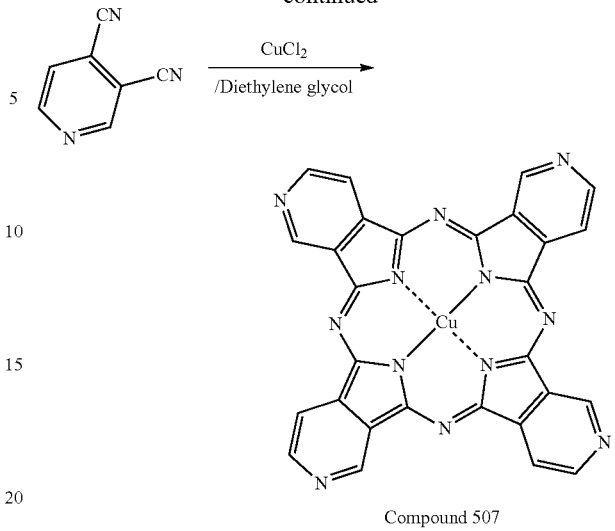

Compound 507

(Synthesis of Compound 501)

To 250 mL of diethylene glycol, 50 g of 2,3-dicyanopyridine (manufactured by Tokyo Chemical Industry) was added, the inside temperature of which was raised to 55° C. with stirring to complete the dissolution. To the solution, 13.01 g of cupper chloride was added, which was heated to 115° C. After 2 hours, the system was cooled to room temperature, and precipitated crystals were filtered. The crystal was washed twice with 200 mL of methanol and, then, was added to 500 mL of acetone, which was refluxed for 30 minutes. After cooling to room temperature, filtration was performed followed by washing with 200 mL of acetone. The product had a dry weight of 42 g.

(Synthesis of Compound 507)

To 250 mL of diethylene glycol, 50 g of 3,4-dicyanopyridine (manufactured by Tokyo Chemical Industry) was added, the inner temperature of which was raised to 55° C. with stirring to complete the dissolution. To the solution, 13.01 g of cupper chloride was added, which was heated to 115° C. After 2 hours, the system was cooled to room temperature, and precipitated crystals were filtered. The crystal was washed twice with 200 mL of methanol, and, then, was added to 500 mL of acetone, which was refluxed for 30 minutes. After cooling to room temperature, filtration was performed followed by washing with 200 mL of acetone. The product had a dry weight of 39 g.

Example 1

Production of Mixed Crystal A 50 mL of sulfuric acid was stirred at an inside temperature of 4° C., to which 1.0 g of Compound 501 and 3.0 g of Compound 1 (manufactured by Tokyo Chemical Industry) were dividedly added so that the inside temperature did not exceed 10° C. After the addition, the system was stirred at 4° C. for 30 minutes, which was then added to 1000 mL of water with ice over 3 minutes. The system was stirred at the inside temperature of 10° C. for 30 minutes, from which crystal was filtrated by suction filtration. The crystal was stirred in 100 mL of ultrapure water for 60 minutes, and, after filtration, the resulting crystal was washed with 100 mL of ultrapure water. The crystal was suspended in 100 mL of diethylene glycol, which was then stirred at the inside temperature of 110° C. for 2 hours. After cooling the system to room temperature, precipitated solid was filtrated, which was washed with 20 mL of isopropanol followed by the washing with 500 mL of ultrapure water. Wet mixed crystal A 16.7 g (3.2 g in terms of dried product). The mixed crystal was dissolved in methanesulfonic acid to measure an absorption spectrum. It was revealed that the mixing ratio of Compound 501 to relative to Compound 1 in the mixed crystal, which was calculated from each of individual spectrum of Compound 501 and Compound 1, was approximately Compound 501/Compound 1=1/3.

Examples 2 to 4

Production of Mixed Crystal B to Mixed Crystal D

Mixed crystals B to D were produced in a manner substantially similar to that in Example 1, except for replacing Compound 501 and Compound 1 with the compounds described in Table 49, the addition amounts thereof being described in Table 49.

TABLE 49

| | | | Amount | | Amount |
|---|---|---|---|---|---|
| Example 1 | Mixed Crystal A | Compound 501 | 1.0 g | Compound 1 | 3.0 g |
| Example 2 | Mixed Crystal B | Compound 501 | 0.4 g | Compound 1 | 3.6 g |
| Example 3 | Mixed Crystal C | Compound 507 | 0.2 g | Compound 1 | 3.8 g |

TABLE 49-continued

| | | | Amount | | Amount |
|---|---|---|---|---|---|
| Example 4 | Mixed Crystal D | Compound 507 | 0.4 g | Compound 1 | 3.6 g |

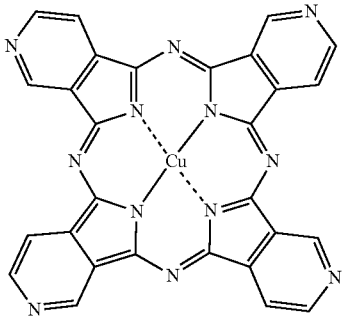

Example 5

Production of Aqueous Pigment Dispersion A 1.30 g of wet mixed crystal A obtained above were mixed with 0.05 g of sodium oleate, 0.5 g of glycerin and 3.13 g of ultrapure water, which was subjected to dispersion with 10 g of zirconia beads having a diameter of 0.1 mm using a planet type ball mill at 300 rpm for 6 hours. After the dispersion was finished, the zirconia beads were separated to give an aqueous pigment dispersion A as a deep blue colored pigment dispersion composition.

Examples 6 to 8

Production of Aqueous Pigment Dispersions B to D

Aqueous pigment dispersions B to D were produced as colored pigment dispersion compositions in a manner substantially similar to that in Example 5, except for changing the wet mixed crystal A to the wet mixed crystals described in Table 50 below, the addition amounts thereof being described in Table 50 below, and further changing the addition amount of ultrapure water.

TABLE 50

| | | Mixed Crystal | Amount of wet mixed crystal | Water content | Amount of ultrapure water |
|---|---|---|---|---|---|
| Example 5 | Aqueous pigment dispersion A | A | 1.30 g | 80.80% | 3.13 g |
| Example 6 | Aqueous pigment dispersion B | B | 1.16 g | 78.50% | 3.29 g |
| Example 7 | Aqueous pigment dispersion C | C | 1.03 g | 75.70% | 3.42 g |
| Example 8 | Aqueous pigment dispersion D | D | 1.30 g | 79.80% | 3.13 g |

Comparative Example 1

Aqueous pigment dispersion E was tried to be produced in a manner substantially similar to that in Example 5, except for using 0.25 g of Compound 501 and 4.20 g of ultrapure water instead of the mixed crystal A. However, the aqueous pigment dispersion E had poor dispersion stability not to allow the dispersion state to be maintained.

Comparative Examples 2 to 6

Aqueous pigment dispersions F to J were produced in a manner substantially similar to that in Example 5, except for changing the mixed crystal A to the compounds described in Tables 51 and 52 below, the addition amounts thereof being described in Tables 51 and 52 below, and further changing the addition amount of ultrapure water.

TABLE 51

| | | | Amount | Amount of ultrapure water |
|---|---|---|---|---|
| Comparative Example 1 | Aqueous pigment dispersion E | Compound 501 | 0.25 g | 4.20 g |

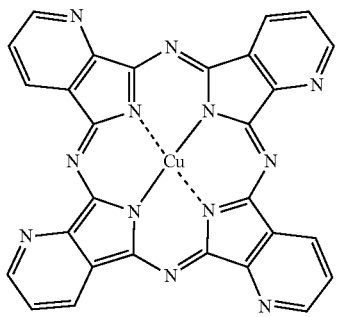

TABLE 51-continued

| | | | Amount | Amount of ultrapure water |
|---|---|---|---|---|
| Comparative Example 2 | Aqueous pigment dispersion F | Compound 507 | 0.25 g | 4.20 g |
| Comparative Example 3 | Aqueous pigment dispersion G | Compound 1 | 0.25 g | 4.20 g |
| Comparative Example 4 | Aqueous pigment dispersion H | P. B. 15: 6 | 0.25 g | 4.20 g |

In Table 51, P.B. 15:6 represents C.I. Pigment Blue 15:6.

TABLE 52

| | | | Amount | | Amount | Amount of ultrapure water |
|---|---|---|---|---|---|---|
| Comparative Example 5 | Aqueous pigment dispersion I | Compound 501 | 0.025 g (in solid) | Compound 1 | 0.225 g | 4.20 g |

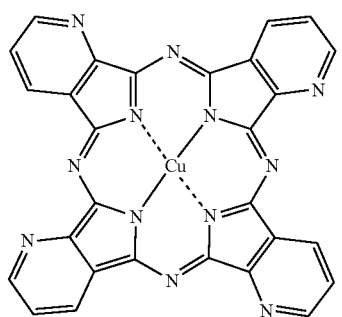

TABLE 52-continued

| | | | Amount | | Amount | Amount of ultrapure water |
|---|---|---|---|---|---|---|
| Comparative Example 6 | Aqueous pigment dispersion J | 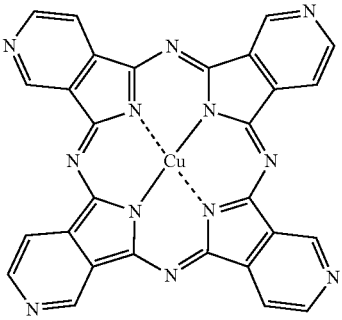<br>Compound 507 | 0.025 g (in solid) | 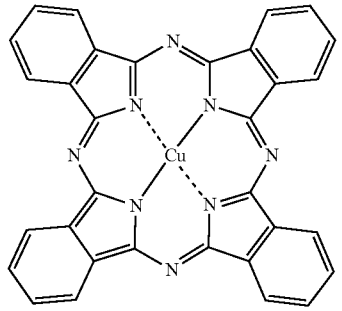<br>Compound 1 | 0.225 g | 4.20 g |

<Measurement of Absorption Spectrum of Aqueous Pigment Dispersions>

Figure 2:
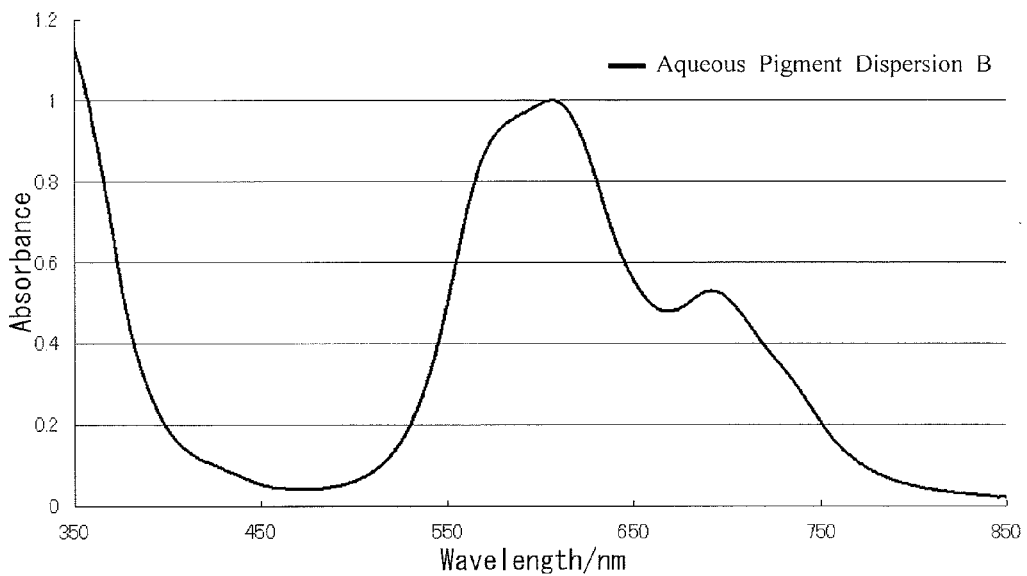
FIG. 2 is a UV-Vis absorption spectrum of an aqueous pigment dispersion B.
Figure 3:
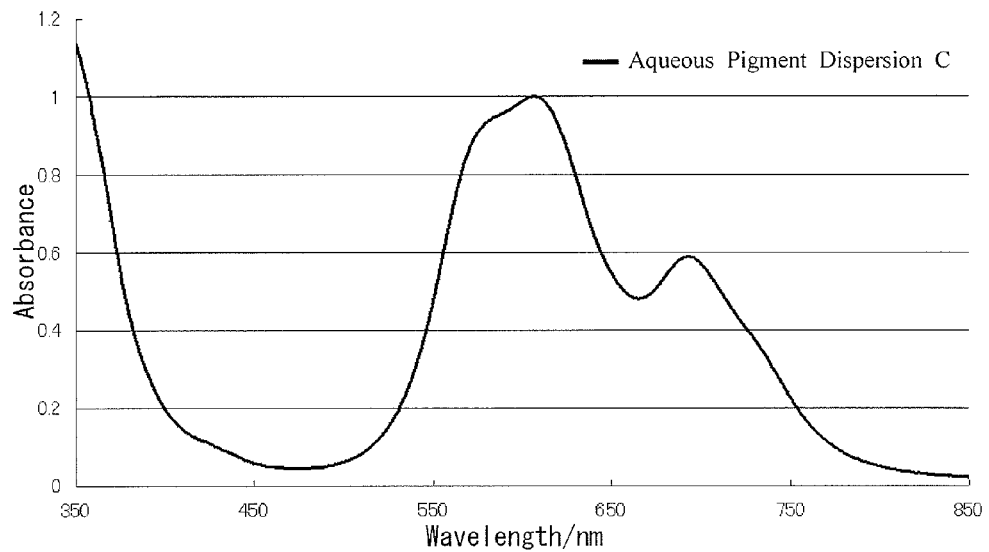
FIG. 3 is a UV-Vis absorption spectrum of an aqueous pigment dispersion C.
Figure 4:
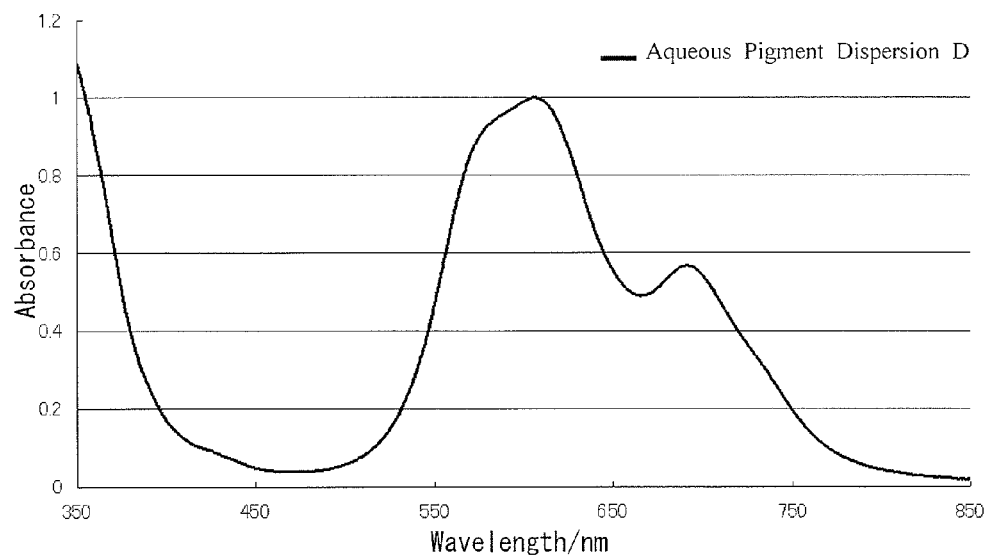
FIG. 4 is a UV-Vis absorption spectrum of an aqueous pigment dispersion D.
Figure 5:
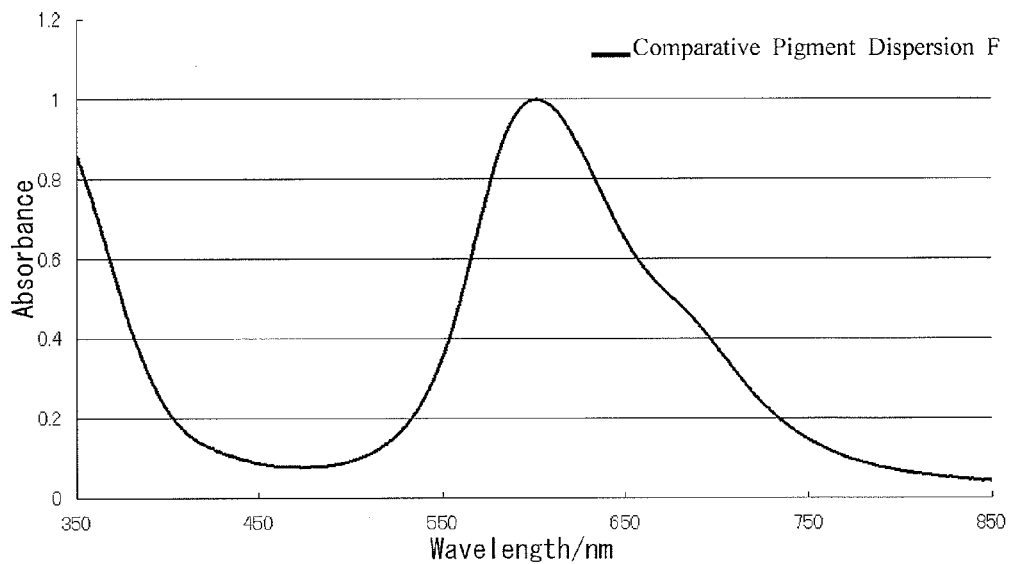
FIG. 5 is a UV-Vis absorption spectrum of an aqueous pigment dispersion F.
Figure 6:
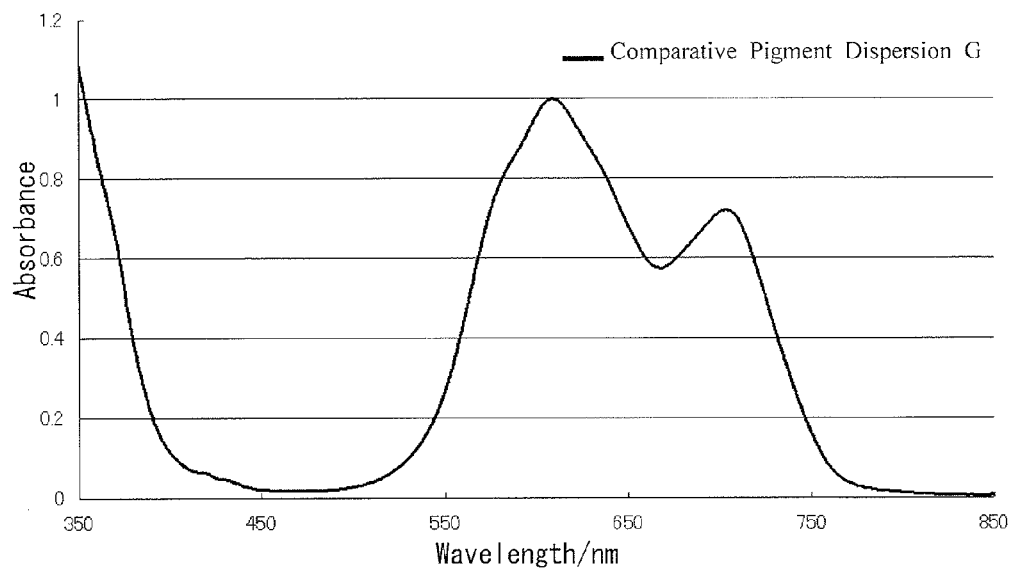
FIG. 6 is a UV-Vis absorption spectrum of an aqueous pigment dispersion G.
Figure 7:
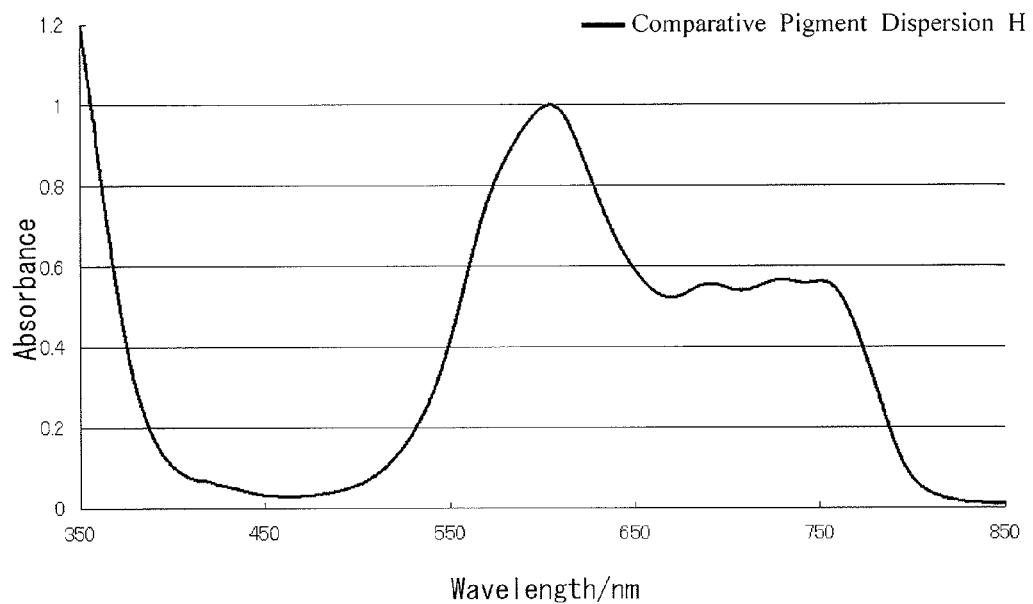
FIG. 7 is a UV-Vis absorption spectrum of an aqueous pigment dispersion H.
Figure 8:
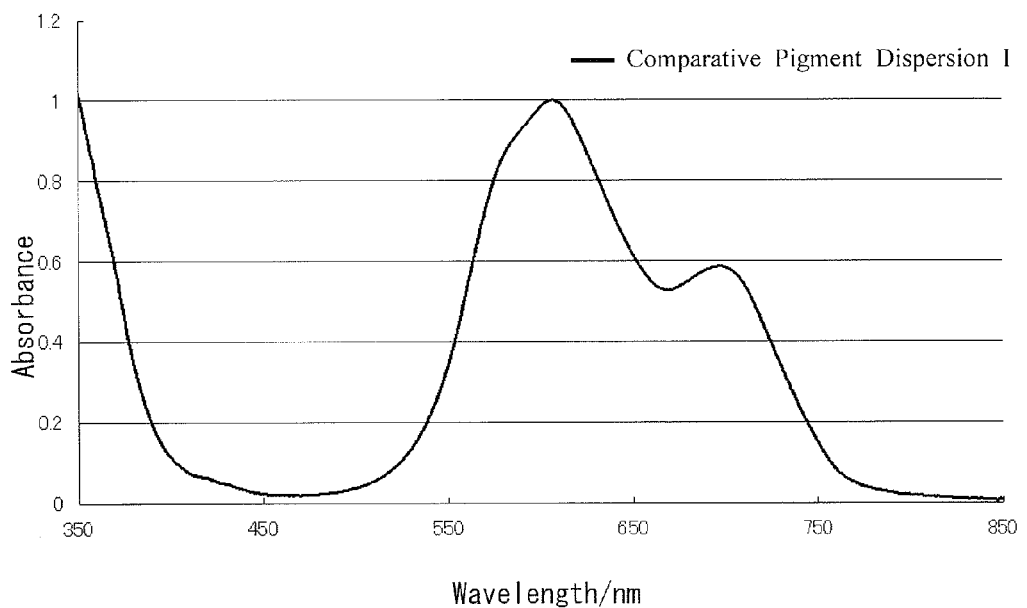
FIG. 8 is a UV-Vis absorption spectrum of an aqueous pigment dispersion I.
Figure 9:
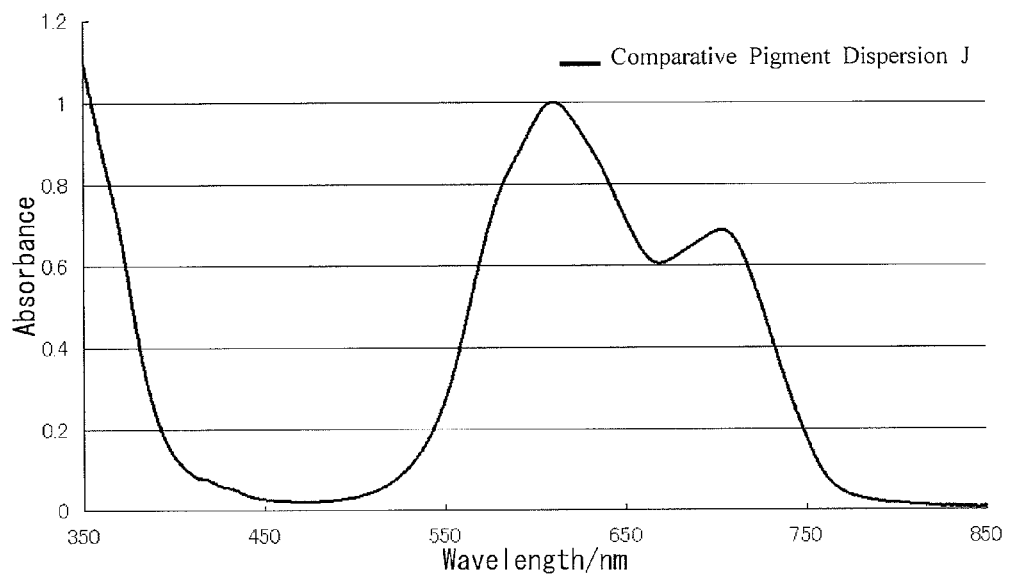
FIG. 9 is a UV-Vis absorption spectrum of an aqueous pigment dispersion J.

Each 200 μL of aqueous pigment dispersions A to D and F to J was put in 10 mL measuring flasks, respectively, which was measured up to 10 mL with ultrapure water. Then, each of which was moved to a quartz cell having a light path length of 1 cm and measured with a UV-Vis spectrum measuring apparatus (at 25° C.). FIGS. 1 to 9 show obtained charts. Further, Table 53 shows absorption wavelengths showing the maximum absorption wavelength ($\lambda_{max}$) or the half-absorbance, in a region of 400 nm or greater.

TABLE 53

| | | Maximum absorption wavelength (λmax) | Wavelength showing Half-absorbance |
|---|---|---|---|
| Example 5 | Aqueous pigment dispersion A | 608 nm | 548 nm |
| Example 6 | Aqueous pigment dispersion B | 606 nm | 550 nm |
| Example 7 | Aqueous pigment dispersion C | 606 nm | 551 nm |
| Example 8 | Aqueous pigment dispersion D | 607 nm | 551 nm |
| Comparative Example 1 | Aqueous pigment dispersion E | unable to measure | |
| Comparative Example 2 | Aqueous pigment dispersion F | 606 nm | 559 nm |
| Comparative Example 3 | Aqueous pigment dispersion G | 609 nm | 564 nm |
| Comparative Example 4 | Aqueous pigment dispersion H | 604 nm | 564 nm |
| Comparative Example 5 | Aqueous pigment dispersion I | 608 nm | 562 nm |
| Comparative Example 6 | Aqueous pigment dispersion J | 610 nm | 564 nm |

<Measurement of Powder X-Ray Diffraction Spectrum>

Figure 10:
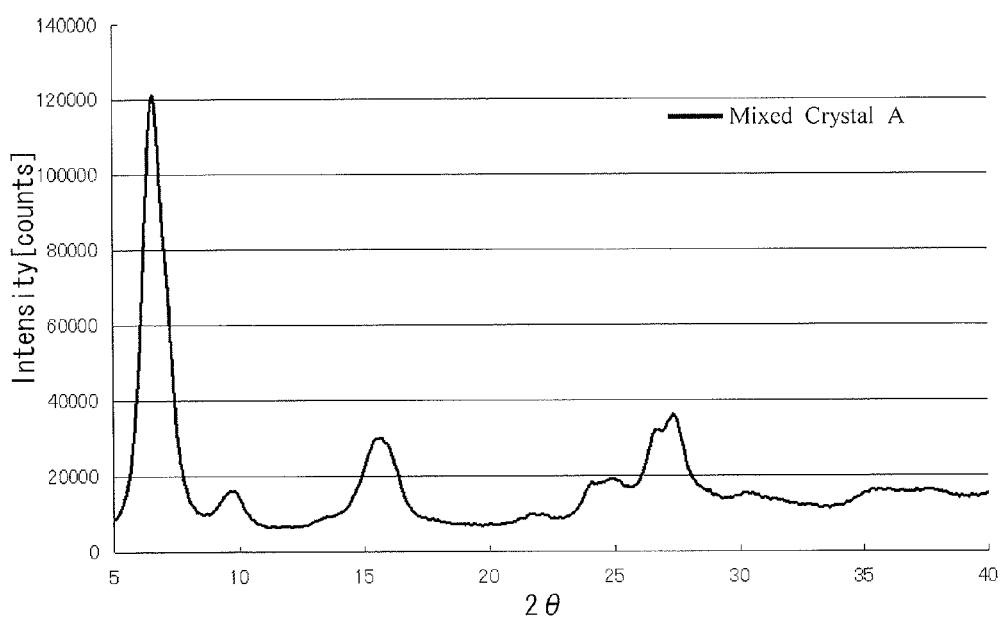
FIG. 10 is a powder X-ray diffraction spectrum of a mixed crystal A.
Figure 11:
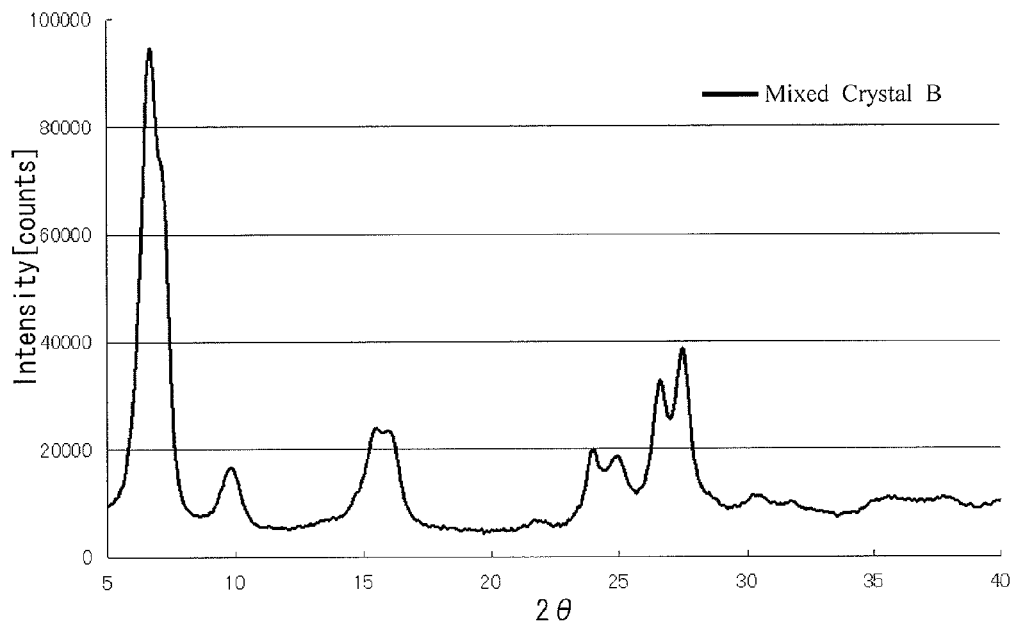
FIG. 11 is a powder X-ray diffraction spectrum of a mixed crystal B.
Figure 12:
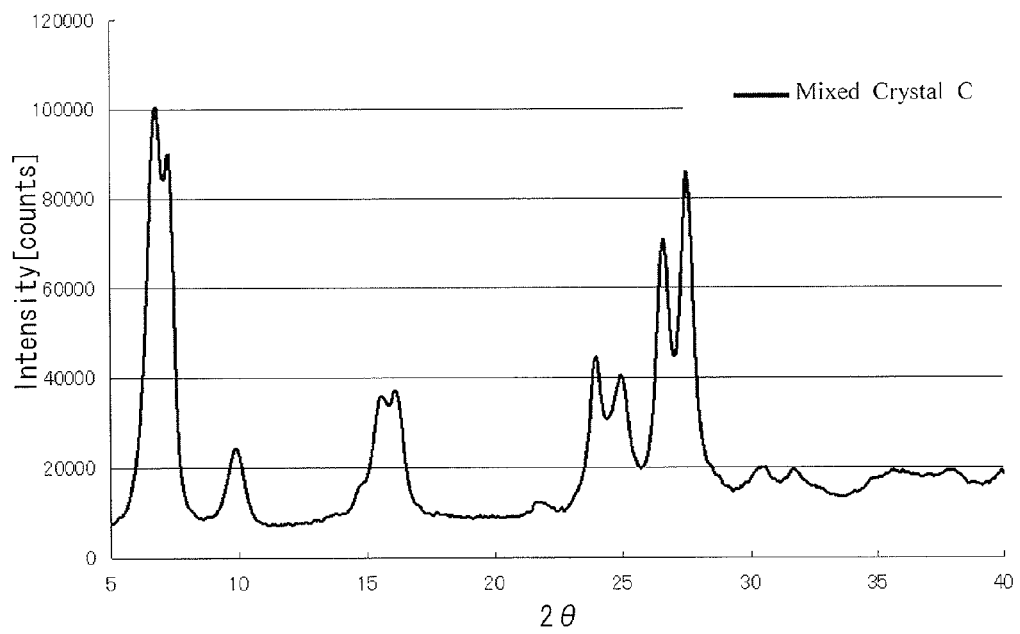
FIG. 12 is a powder X-ray diffraction spectrum of a mixed crystal C.
Figure 13:
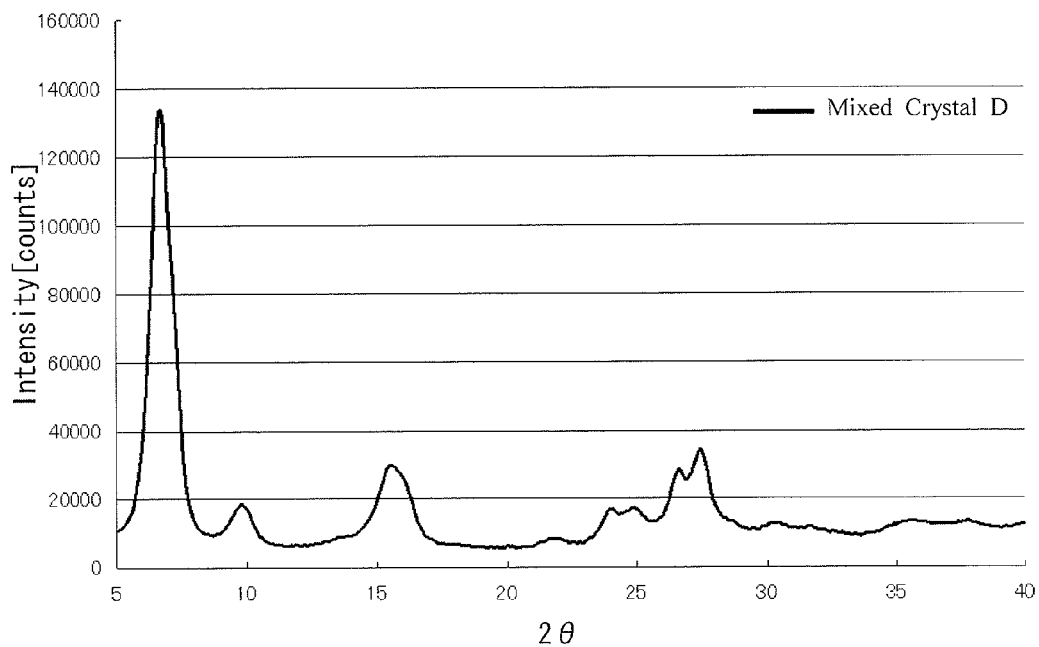
FIG. 13 is a powder X-ray diffraction spectrum of a mixed crystal D.
Figure 14:
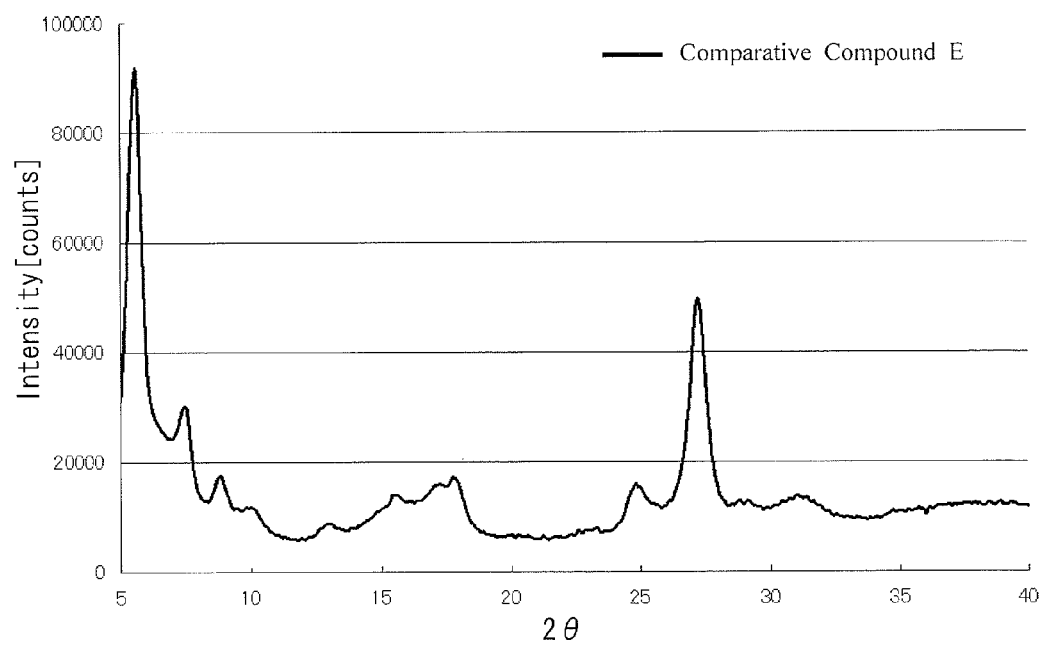
FIG. 14 is a powder X-ray diffraction spectrum of a comparative compound E.
Figure 15:
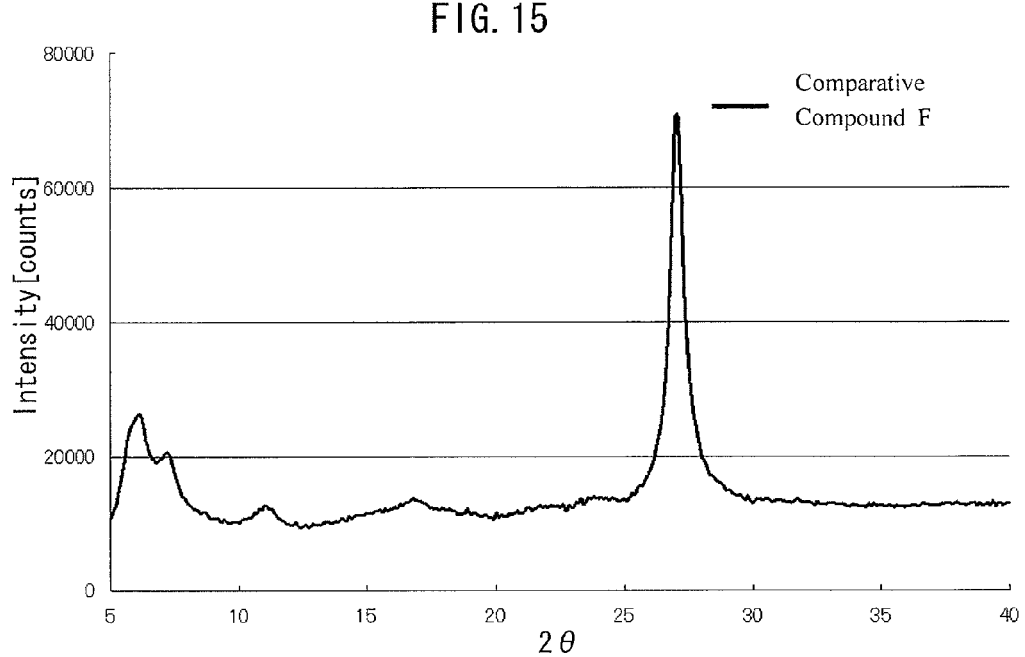
FIG. 15 is a powder X-ray diffraction spectrum of a comparative compound F.
Figure 16:
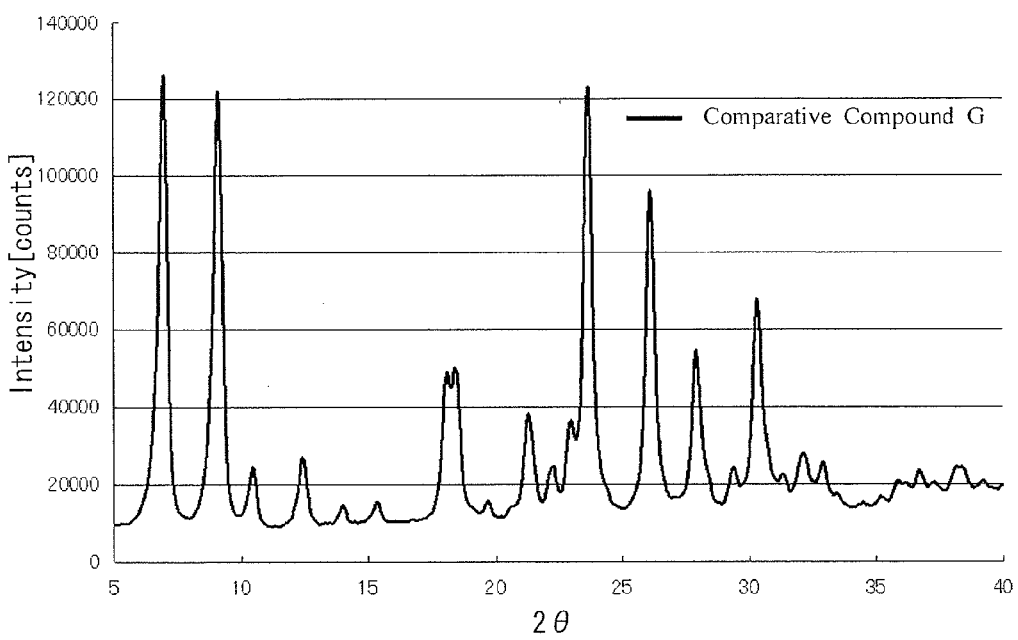
FIG. 16 is a powder X-ray diffraction spectrum of a comparative compound G.
Figure 17:
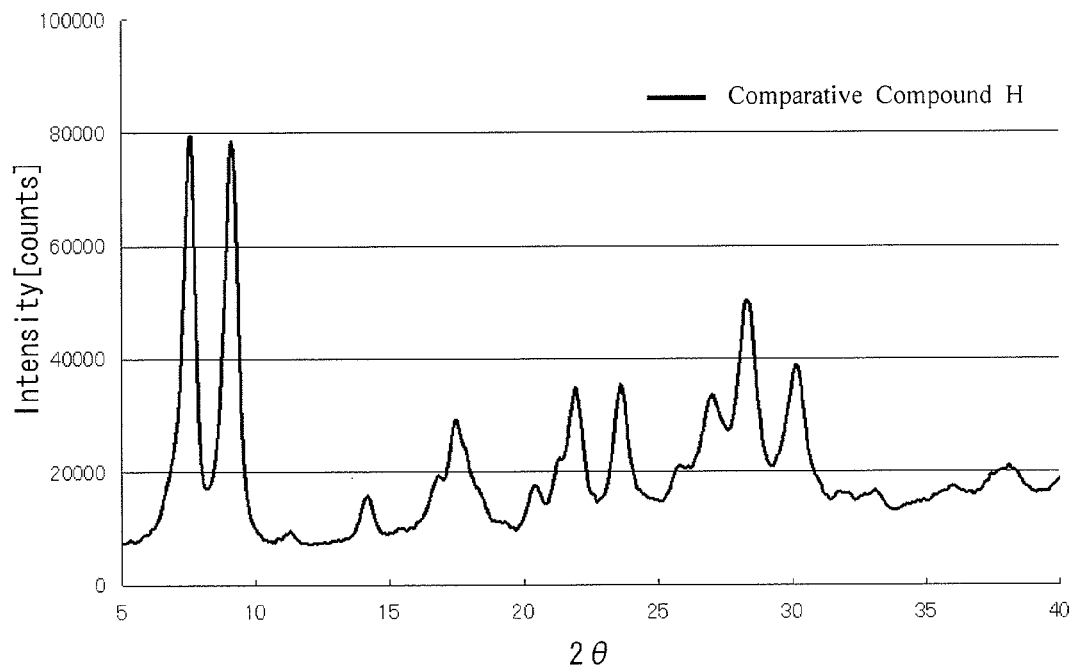
FIG. 17 is a powder X-ray diffraction spectrum of a comparative compound H.
Figure 18:
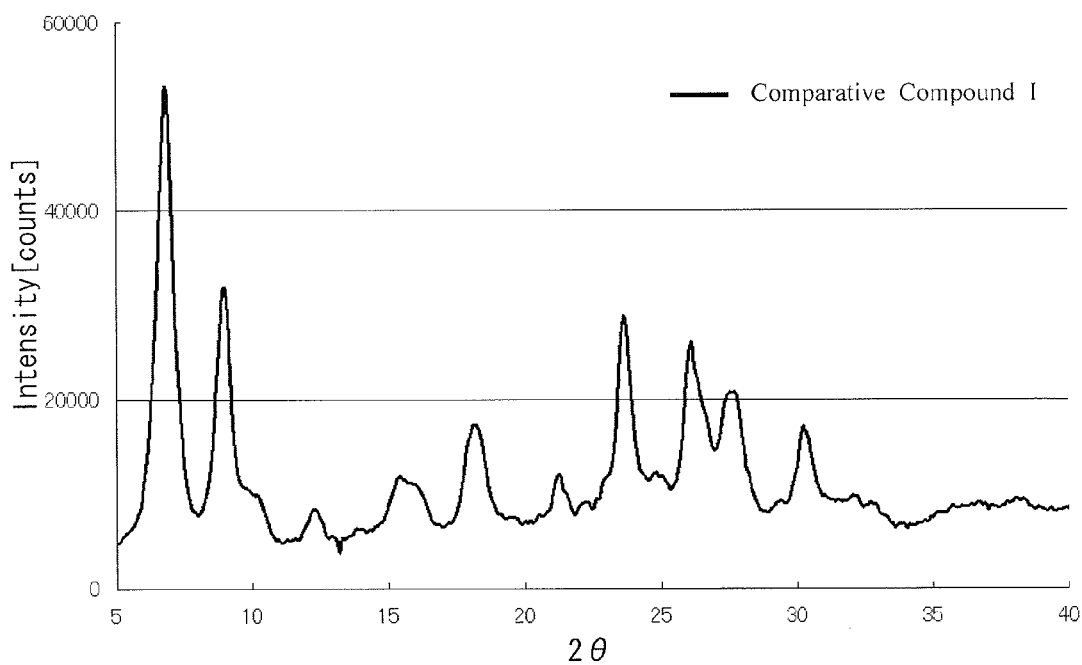
FIG. 18 is a powder X-ray diffraction spectrum of a comparative compound I.
Figure 19:
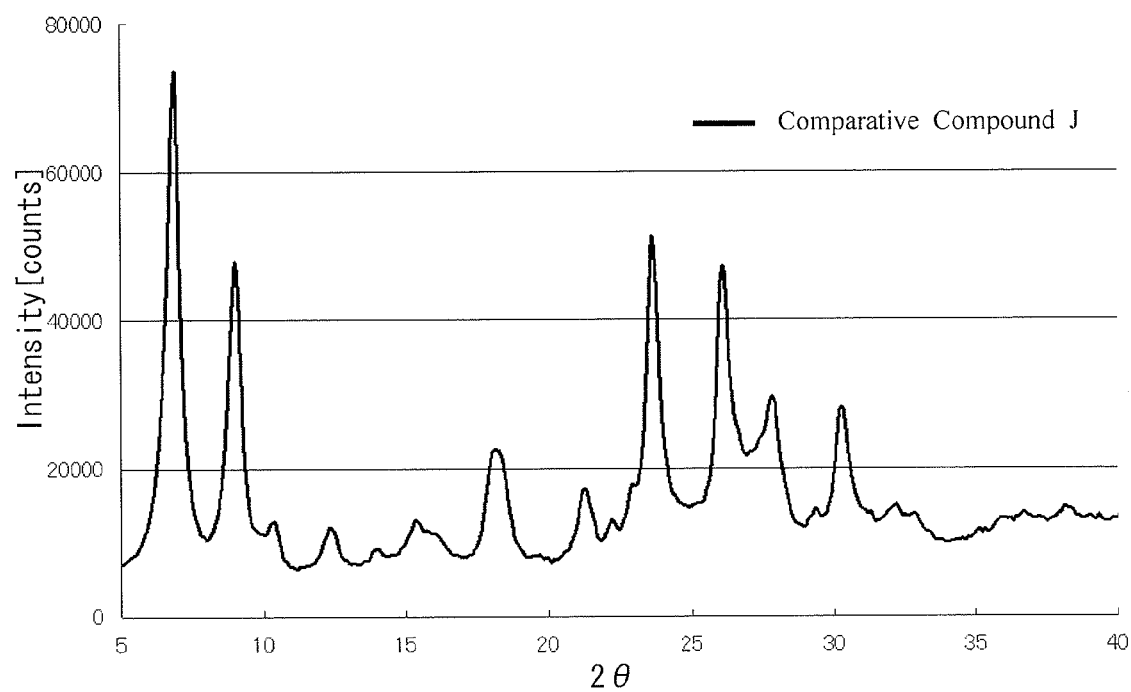
FIG. 19 is a powder X-ray diffraction spectrum of a comparative compound J.

For respective pigments of mixed crystals A to D and comparative compounds E to J, the powder X-ray diffraction spectrum by the irradiation of the CuKα line was measured using RINT2000 manufactured by Rigaku under measurement conditions described below. Meanwhile, concerning the mixed crystals A to D and comparative compounds E to H, dried crystals before dispersion were used for the measurement. Concerning the comparative compounds I and J, crystals obtained by concentrating and drying the dispersed aqueous pigment dispersions I and J were used for the measurement. FIGS. 10 to 19 show respective powder X-ray diffraction spectra. Further, Table 54 shows the number of diffraction peaks giving a diffraction peak intensity of 10% or greater of a maximum diffraction peak intensity in the range of a Bragg angle (2θ±0.2°) of from 23.5° to 29.0°.

—Measuring Apparatus and Measuring Conditions—
Apparatus name: RINT2000, vertical type goniometer
Power used: 55 kV, 280 mA
Sampling step: 0.1°
Diverging slit: 2°
Scattering slit: 2°
Receiving slit: 0.60 mm
Monochromatic receiving slit: 0.8 mm
Scanning speed: 2°

TABLE 54

| | Number of peaks in powder X-ray diffraction (2θ = 23.5° to 29.0°) |
|---|---|
| Mixed Crystal A | 4 |
| Mixed Crystal B | 4 |
| Mixed Crystal C | 4 |
| Mixed Crystal D | 4 |
| Compound 501 | 2 |
| Compound 507 | 1 |
| Compound 1 | 3 |
| C.I. Pigment Blue 15:6 | 4 |
| Compound 501/Compound 1 (Aqueous pigment dispersion I) | 3 |
| Compound 501/Compound 1 (Aqueous pigment dispersion J) | 3 |

As shown in Table 53, it is clear that the comparative pigment dispersions have the wavelength showing half-absorbance of 559 nm or more, but that, in contrast, dispersions including the mixed crystal of the invention have such significantly short wavelength as from 548 nm to 551 nm.

Further, since the powder X-ray diffraction spectrum shows different diffraction patterns from conventional ones, the mixed crystal has a novel crystal form, and the transfer to the crystal form makes the hue adjustment possible.

From the above results, it is clear that the mixed crystal of the invention gives a short wavelength hue, which has not existed conventionally. Therefore, the colored pigment dispersion composition of the mixed crystal has very high utility value in a wide variety of fields.

According to the invention, it is possible to provide a mixed crystal having an absorption property excellent in color reproducibility as a blue pigment, and a colored pigment dispersion composition including the mixed crystal, which shows an excellent dispersion stability.

Namely, the present invention provides the following items <1> to <12>.

<1>. A mixed crystal comprising a compound represented by the following Formula (I) and a compound represented by the following Formula (II):

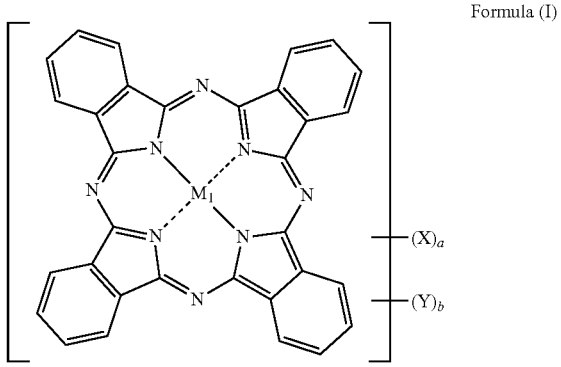

Formula (I)

wherein, in Formula (I), X represents —SO—Z, —SO$_2$—Z, —SO$_2$NR$_1$R$_2$, —SO$_3$R$_1$, —CONR$_1$R$_2$) or —CO$_2$R$_1$; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; R$_1$ and R$_2$ each independently represent a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; Y represents a monovalent substituent; a and b represent the number of substituents of X and Y, respectively, wherein a represents an integer from 0 to 16, b represents an integer from 0 to 16, while satisfying the relationship of 0≦a+b≦16, and, when a or b is 2 or greater two or more Xs or Ys may be the same as or different from each other; and M$_1$ represents a hydrogen atom, a metal element, a metal oxide, a metal hydroxide or a metal halide;

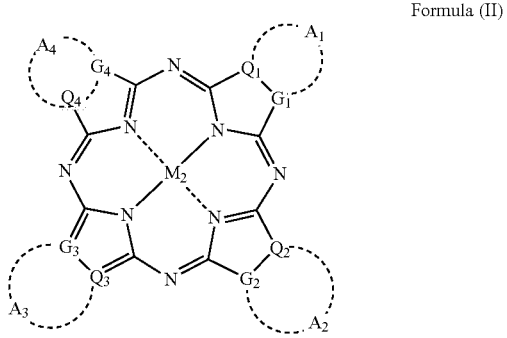

Formula (II)

wherein, in Formula (II), G$_1$ to G$_4$ and Q$_1$ to Q$_4$ each independently represent a carbon atom or a nitrogen atom; and A$_1$ to A$_4$ each independently represent a group of atoms necessary for forming an aromatic ring or a heterocycle with the respective G1 to G$_4$ and Q$_1$ to Q$_4$ to which A$_1$ to A$_4$ are bonded, wherein at least one of the four rings to be formed is a heterocycle, and each aromatic ring or the heterocycle may have a substituent selected from a halogen atom, an alkyl group, a cycloalkyl group, an alkenyl group, an alkynyl group, an aralkyl group, an aryl group, a heterocyclic group, a cyano group, a hydroxy group, a nitro group, an amino group, an alkylamino group, an alkyloxy group, an aryloxy group, an acylamino group, an arylamino group, a ureido group, a sulfamoylamino group, an alkylthio group, an arylthio group, an alkyloxycarbonylamino group, an alkylsulfonamido group, an arylsulfonamido group, a carbamoyl group, a sulfamoyl group, an alkylsulfonyl group, an arylsulfonyl group, an alkyloxycarbonyl group, a heterocyclic oxy group, an alkylazo group, an arylazo group, an acyloxy group, a carbamoyloxy group, a silyloxy group, an aryloxycarbonyl group, an aryloxycarbonylamino group, an imido group, a heterocyclic thio group, an alkylsulfinyl group, an arylsulfinyl group, a phosphoryl group, an acyl group, or an ionic hydrophilic group; and M$_2$ represents a hydrogen atom, a metal element, a metal oxide, a metal hydroxide or a metal halide.

<2>. The mixed crystal according to item <1>, wherein X represents —SO$_2$—Z, —SO$_2$NR$_1$R$_2$ or —SO$_3$R$_1$; wherein, Z, R$_1$ and R$_2$ have the same meaning as those in Formula (I).

<3>. The mixed crystal according to item <2>, wherein Z is a substituted or unsubstituted alkyl group, a substituted or unsubstituted aryl group, or a substituted or unsubstituted heterocyclic group; and R$_1$ and R$_2$ are each independently a hydrogen atom, a substituted or unsubstituted alkyl group, a substituted or unsubstituted aryl group, or a substituted or unsubstituted heterocyclic group.

<4>. The mixed crystal according to any one of items <1> to <3>, wherein Y is a halogen atom, an alkyl group, an aryl group, a cyano group, an alkyloxy group, an acylamino group, a ureido group or an alkyloxycarbonyl group.

<5>. The mixed crystal according to any one of items <1> to <4>, wherein M$_1$ is Fe, Cu, Ni, Zn, Al or Si.

<6>. The mixed crystal according to any one of items <1> to <5>, wherein the groups of atoms represented by A$_1$ to A$_4$ each independently comprise at least one atom selected from a carbon atom, a nitrogen atom, an oxygen atom or a sulfur atom.

<7>. The mixed crystal according to any one of items <1> to <6>, wherein all of G$_1$ to G$_4$ and Q$_1$ to Q$_4$ are carbon atoms.

<8>. The mixed crystal according to any one of items <1> to <7>, wherein the M$_2$ is a copper atom, an iron atom, a zinc atom, a nickel atom or a cobalt atom.

<9>. The mixed crystal according to any one of items <1> to <8>, wherein a mixing ratio of the compound represented by Formula (II) relative to the compound represented by Formula (I) is from 0.1% to 50% by mass.

<10>. The mixed crystal according to any one of items <1> to <9>, having 4 or more diffraction peaks that give a diffraction peak intensity of 10% or greater of a maximum diffraction peak intensity in the range of a Bragg angle (2θ±0.2°) of from 23.5° to 29.0° in an X-ray diffraction spectrum by the CuKα line.

<11>. The mixed crystal according to any one of items <1> to <10>, wherein an absorption spectrum in a dispersion state gives the maximum absorption wavelength of 630 nm or less in a region of 400 nm or more, and an absorption wavelength that is shorter than the maximum absorption wavelength and gives half-absorbance of the absorbance at the maximum absorption wavelength is 560 nm or less.

<12>. A colored pigment dispersion composition comprising the mixed crystal according to any one of items <1> to <11>, and a medium.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

The invention claimed is:

1. A mixed crystal comprising a compound represented by the following Formula (I) and a compound represented by the following Formula (II):

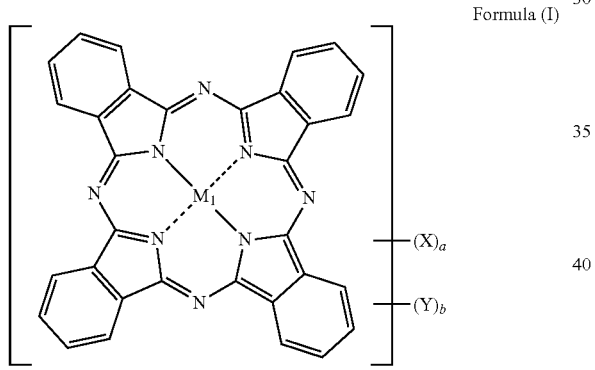

Formula (I)

wherein, in Formula (I), X represents —SO—Z, —SO$_2$—Z, —SO$_2$NR$_1$R$_2$, —SO$_3$R$_1$, —CONR$_1$R$_2$ or —CO$_2$R$_1$; Z represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; R$_1$ and R$_2$ each independently represents a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group; Y represents a monovalent substituent; a and b represent the number of substituents of X and Y, respectively, wherein a represents an integer from 0 to 16, b represents an integer from 0 to 16, while satisfying the relationship of 0≦a+b≦16, and, when a or b is 2 or greater, two or more Xs or Ys may be the same as or different from each other; and M$_1$ represents a hydrogen atom, a metal element, a metal oxide, a metal hydroxide or a metal halide;

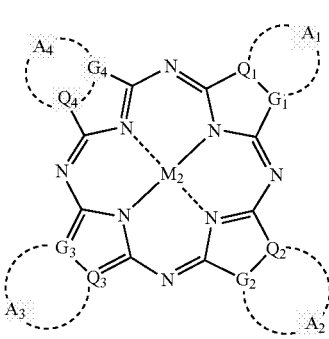

Formula (II)

wherein, in Formula (II), G$_1$ to G$_4$ and Q$_1$ to Q$_4$ each independently represents a carbon atom or a nitrogen atom; A$_1$ to A$_4$ each independently represents a group of atoms necessary for forming an aromatic ring or a heterocycle with the respective G$_1$ to G$_4$ and Q$_1$ to Q$_4$ to which A$_1$ to A$_4$ are bonded, wherein at least one of the four rings to be formed is a heterocycle, and each aromatic ring or heterocycle may have a substituent selected from a halogen atom, an alkyl group, a cycloalkyl group, an alkenyl group, an alkynyl group, an aralkyl group, an aryl group, a heterocyclic group, a cyano group, a hydroxy group, a nitro group, an amino group, an alkylamino group, an alkyloxy group, an aryloxy group, an acylamino group, an arylamino group, a ureido group, a sulfamoylamino group, an alkylthio group, an arylthio group, an alkyloxycarbonylamino group, an alkylsulfonamido group, an arylsulfonamido group, a carbamoyl group, a sulfamoyl group, an alkylsulfonyl group, an arylsulfonyl group, an alkyloxycarbonyl group, a heterocyclic oxy group, an alkylazo group, an arylazo group, an acyloxy group, a carbamoyloxy group, a silyloxy group, an aryloxycarbonyl group, an aryloxycarbonylamino group, an imido group, a heterocyclic thio group, an alkylsulfinyl group, an arylsulfinyl group, a phosphoryl group, an acyl group, or an ionic hydrophilic group; and M$_2$ represents a hydrogen atom, a metal element, a metal oxide, a metal hydroxide or a metal halide, wherein the mixed crystal has 4 or more diffraction peaks that give a diffraction peak intensity of 10% or greater of a maximum diffraction peak intensity in the range of a Bragg angle (2θ±0.2°) of from 23.5 to 29.0° in an X-ray diffraction spectrum by the CuKα line.

2. The mixed crystal according to claim 1, wherein X represents —SO$_2$—Z, —SO$_2$NR$_1$R$_2$ or —SO$_3$R$_1$, in which Z, R$_1$ and R$_2$ have the same meaning as those in Formula (I).

3. The mixed crystal according to claim 2, wherein Z is a substituted or unsubstituted alkyl group, a substituted or unsubstituted aryl group, or a substituted or unsubstituted heterocyclic group; and R$_1$ and R$_2$ are each independently a hydrogen atom, a substituted or unsubstituted alkyl group, a substituted or unsubstituted aryl group, or a substituted or unsubstituted heterocyclic group.

4. The mixed crystal according to claim 1, wherein Y is a halogen atom, an alkyl group, an aryl group, a cyano group, an alkyloxy group, an acylamino group, a ureido group or an alkyloxycarbonyl group.

5. The mixed crystal according to claim 1, wherein M$_1$ is Fe, Cu, Ni, Zn, Al or Si.

6. The mixed crystal according to claim 1, wherein the groups of atoms represented by $A_1$ to $A_4$ each independently comprises at least one atom selected from a carbon atom, a nitrogen atom, an oxygen atom or a sulfur atom.

7. The mixed crystal according to claim 1, wherein all of $G_1$ to $G_4$ and $Q_1$ to $Q_4$ are carbon atoms.

8. The mixed crystal according to claim 1, wherein $M_2$ is a copper atom, an iron atom, a zinc atom, a nickel atom or a cobalt atom.

9. The mixed crystal according to claim 1, wherein a mixing ratio of the compound represented by Formula (II) relative to the compound represented by Formula (I) is from 0.1% to 50% by mass.

10. The mixed crystal according to claim 1, wherein an absorption spectrum in a dispersion state gives a maximum absorption wavelength of 630 nm or less in a region of 400 nm or more, and an absorption wavelength that is shorter than the maximum absorption wavelength and gives half-absorbance of the absorbance at the maximum absorption wavelength is 560 nm or less.

11. A colored pigment dispersion composition comprising the mixed crystal according to claim 1, and a medium.

\* \* \* \* \*